US008169169B2

(12) United States Patent
Hass et al.

(10) Patent No.: US 8,169,169 B2

(45) Date of Patent: May 1, 2012

(54) DOOR OPERATOR FOR CONTROLLING A DOOR AND METHOD OF SAME

(76) Inventors: Brian Hass, Torrington, CT (US); Eric Dube, Quebec (CA)

( * ) Notice: Subject to any disclaimer, the term of this patent is extended or adjusted under 35 U.S.C. 154(b) by 548 days.

(21) Appl. No.: 12/370,819

(22) Filed: Feb. 13, 2009

(65) Prior Publication Data

US 2009/0265992 A1 Oct. 29, 2009

Related U.S. Application Data

(63) Continuation-in-part of application No. 11/403,490, filed on Apr. 13, 2006.

(60) Provisional application No. 60/751,623, filed on Apr. 13, 2005.

(51) Int. Cl.
*H02P 7/00* (2006.01)

(52) U.S. Cl. ........ 318/286; 318/461; 318/257; 318/266; 318/261; 318/282; 361/84; 361/82; 361/87; 700/56; 700/41; 700/42; 49/28; 49/32; 49/138; 49/139; 49/334

(58) Field of Classification Search .................. 318/461, 318/286, 18, 257, 266, 261, 282, 265, 445, 318/466; 361/87, 84, 82, 78; 49/324, 334, 49/264, 138, 340, 139, 28, 32; 700/56, 41, 700/42

See application file for complete search history.

(56) References Cited

U.S. PATENT DOCUMENTS

| | | | |
|---|---|---|---|
| 1,543,935 | A | 6/1925 | McGee |
| 1,941,454 | A | 1/1934 | Ainsworth |
| 2,013,418 | A | 9/1935 | Moore |
| 2,032,724 | A | 3/1936 | Sharpe |
| 2,138,521 | A | 11/1938 | Ellis |
| 2,170,014 | A | 8/1939 | Ellis |
| 2,243,914 | A | 6/1941 | Martin et al. |
| 2,758,835 | A | 8/1956 | Wikkerink |
| 2,820,241 | A | 1/1958 | Schlage |
| 2,874,960 | A | 2/1959 | Durbin et al. |
| 3,114,541 | A | 12/1963 | Coffey |
| 3,284,950 | A | 11/1966 | Gute |
| 3,425,161 | A | 2/1969 | Catlett et al. |
| 3,645,042 | A | 2/1972 | Bolli |
| 3,934,306 | A | 1/1976 | Farris |
| 3,996,698 | A | 12/1976 | Rees et al. |
| 4,007,557 | A | 2/1977 | Davis et al. |

(Continued)

FOREIGN PATENT DOCUMENTS

DE 42 31 984 A1 3/1994

(Continued)

*Primary Examiner* — Rita Leykin

(74) *Attorney, Agent, or Firm* — Carmody & Torrance LLP

(57) ABSTRACT

A door operator for controlling operation of a door, the door operator having a motor to open the door against a spring force, the door operator further comprising a door position sensor for transmitting a signal indicative of door position; and among other things, calculates a door moment of inertia based on a net torque and the time for the door to reach a predetermined angle from the closed position. Also provided is a door operator that compares door speed to a desired door speed based on a door speed-position profile and generates a door speed error signal and minimizes the door speed error signal by adjusting the braking load resulting from charging a chargeable battery using the motor as a generator.

10 Claims, 49 Drawing Sheets

U.S. PATENT DOCUMENTS 4,045,914 A 9/1977 Catlett
4,185,512 A * 1/1980 Sommer ...................... 74/411.5
4,220,051 A 9/1980 Catlett
4,348,835 A 9/1982 Jones et al.
4,369,399 A * 1/1983 Lee et al. ...................... 318/467
4,429,490 A 2/1984 Zunkel
4,498,033 A * 2/1985 Aihara et al. ................. 318/261
4,501,090 A * 2/1985 Yoshida et al. ................. 49/264
4,551,946 A 11/1985 Yoshida et al.
4,658,545 A 4/1987 Ingham et al.
4,785,493 A 11/1988 Tillmann et al.
4,972,629 A 11/1990 Merendino et al.
4,973,894 A 11/1990 Johansson
5,018,304 A 5/1991 Longoria
5,040,331 A 8/1991 Merendino et al.
5,063,337 A 11/1991 Evin
5,193,647 A 3/1993 O'Brien, II
5,221,239 A 6/1993 Catlett
5,243,735 A 9/1993 O'Brien, II
5,278,480 A 1/1994 Murray
5,392,562 A 2/1995 Carambula
5,497,641 A 3/1996 Linde et al.
5,513,467 A 5/1996 Current et al.
5,515,649 A 5/1996 Strab
5,543,692 A 8/1996 Howie et al.
5,594,316 A 1/1997 Hayashida
5,634,296 A 6/1997 Hebda
5,687,507 A 11/1997 Beran
5,727,348 A 3/1998 Arnell et al.
5,770,934 A 6/1998 Theile
5,838,129 A 11/1998 Luh
5,878,530 A 3/1999 Eccleston et al.
5,910,075 A 6/1999 Arnell et al.
5,930,954 A 8/1999 Hebda
5,956,249 A 9/1999 Beran et al.
6,006,475 A * 12/1999 Schwantes et al. ............. 49/341
6,038,895 A 3/2000 Menke et al.
6,061,964 A 5/2000 Arnell et al.
6,067,753 A 5/2000 Hebda
6,177,771 B1 1/2001 Kinzer et al.
6,336,294 B1 1/2002 Kowalczyk et al.
6,430,871 B1 8/2002 Hebda
6,481,160 B1 11/2002 Kowalczyk
6,530,178 B1 * 3/2003 Kowalczyk et al. ............ 49/334
6,553,717 B2 4/2003 St. John et al.
6,588,153 B1 7/2003 Kowalczyk
6,634,140 B1 10/2003 Sellman
6,754,990 B2 6/2004 Pedemonte
6,786,006 B2 * 9/2004 Kowalczyk et al. ............ 49/334
6,786,671 B1 9/2004 Eckendorff
6,891,479 B1 * 5/2005 Eccleston .................. 340/686.1
6,938,372 B2 9/2005 Kennedy et al.
7,298,107 B2 11/2007 McMohon
7,310,911 B1 12/2007 Sellman
7,316,096 B2 * 1/2008 Houser et al. ................... 49/345
7,339,336 B2 3/2008 Gregori
7,405,530 B2 7/2008 Keller, Jr.
2002/0092237 A1 7/2002 Hebda
2003/0005639 A1 1/2003 Kowalczyk
2003/0205000 A1 11/2003 Pagowski
2004/0068935 A1 4/2004 Ichikawa et al.

FOREIGN PATENT DOCUMENTS

DE 44 31 789 C1 11/1995
DE 195 00 844 A1 11/1995
DE 195 47 683 A1 6/1997
DE 197 26 021 A1 12/1998
EP 1 818 490 A2 8/2007
WO WO 00/46476 8/2000
WO WO 01/11174 A1 2/2001
WO WO 03/042480 5/2003

* cited by examiner

| Symbol | Description |
|---|---|
| Start / End | This symbol identifies the beginning or the end of a subroutine. |
| Inputs / Outputs | This symbol identifies an action on the hardware inputs/outputs, such as buttons or LEDs, or a global variable. |
| Entity | This symbol identifies a call to a subroutine. |
| Entity | This symbol identifies a call to a subroutine. However, this subroutine is not exploded. |
| Condition (True / False) | This symbol indicates that a condition must be checked before continuing the process. |
| User input | Manual operation done by the user. |
| Local Action | This symbole indicates a local action. This is a software only action. |

Fig_32

DOOR OPERATOR FOR CONTROLLING A DOOR AND METHOD OF SAME

CROSS-REFERENCES TO RELATED APPLICATIONS

This application is a continuation-in-part of U.S. application Ser. No. 11/403,490, filed Apr. 13, 2006, which claims the benefit of U.S. Provisional Application No. 60/751,623 filed Apr. 13, 2005. All of the subject matter and disclosure of the aforementioned U.S. application Ser. No. 11/403,490 and U.S. Provisional Application No. 60/751,623 are incorporated by reference as if each are fully set forth herein.

BACKGROUND OF THE INVENTION

The present invention is directed to door operators for controlling a door and methodology for controlling the door.

The prior art contains at least several patents related to door closers. For example, U.S. Pat. No. 4,973,894 to Johansson describes what the inventor therein characterizes as a method and arrangement for optimizing the operation of a door closer at different phases of opening and closing of the door. In particular, this '894 patent describes that the door closer is provided with a force transmission shaft that turning in accordance with the movements of the door and with a spring element operationally connected thereto. The opening of the door takes place against the force of the spring element. The '894 patent states that at the closing phase of the door the energy of the spring element, exceeding the return force of the spring element needed to accomplish the desired closing movement of the door, is recovered through simultaneous braking of the closing movement of the door for the main part of the closing movement. When the door is only somewhat open any more, preferably under 5. degrees, a final force securing the closing of the door is accomplished by making use of the recovered energy. The '894 patent describes that the door closer is provided with a rotor, a stator and an energy storing device arranged to serve as an electric generator or as an electric motor as required.

However, it is believed that the state of the art has perceived deficiencies.

The present invention overcomes the deficiencies in the prior art, as well as achieves the objectives and advantages set forth herein.

SUMMARY AND OBJECTIVES OF THE INVENTION

It is thus an objective of the present invention to overcome the perceived deficiencies in the prior art and achieve the advantages set forth herein.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, a preferred embodiment of the present invention is, generally speaking, directed to a door operator for controlling operation of a door, the door operator having a motor to open the door against a spring force, said door operator further comprising a door position sensor for transmitting a signal indicative of door position; and a controller for controlling a motor current to generate a predetermined motor force to open the door to a predetermined angle; receiving the signal from the door position sensor and determining a door position and a door speed based on the signal; measuring the time for the door to reach the predetermined angle from a closed position; measuring the current to hold the door at the predetermined angle; converting the measured current to an equivalent force of the motor acting on the spring, which represents the spring force; determining a first torque value acting on the door based on the spring force; determining a second torque value acting on the door based on the predetermined motor force to open the door to the predetermined angle; subtracting the first torque value from the second torque value to determine a net torque acting on the door; and calculating a door moment of inertia based on the net torque and the time for the door to reach the predetermined angle from the closed position.

In another preferred embodiment, a door operator for controlling operation of a door, the door operator configured to operate in a manual mode wherein a user provides opening power or in a powered mode using a motor for converting electrical energy stored in a chargeable battery to open the door and to act as a braking load to control door closing speed when charging the chargeable battery in a generator mode during door closing, said operator further comprising a nonvolatile door position sensor for transmitting a signal indicative of door position; and a controller for receiving the signal from the nonvolatile door position sensor; determining the door position and a door speed; comparing the door speed to a desired door speed based on a door speed-position profile and generating a door speed error signal; minimizing the door speed error signal by adjusting the braking load resulting from charging the chargeable battery using the motor as a generator.

In yet another preferred embodiment, the present invention is directed to a door operator assembly, comprising an operator unit mounted to a first position, relative to the door, by a first mounting bracket; an arm linkage connecting said operator unit and a second position, relative to the door; said arm linkage being mounted at said second position by a second mounting bracket; and an operator unit comprising a roller clutch to disengage the motor during manual door opening and engage the motor on door closing or on power opening.

BRIEF DESCRIPTION OF THE DRAWINGS

The above set forth and other features of the invention are made more apparent in the ensuing Description of the Preferred Embodiments when read in conjunction with the attached Drawings, wherein:

FIG. 17 *b*) is a top view of a linkage of a door operator assembly according to an embodiment of the present invention.

FIGS. 32-49 are a detailed flow charts showing logic control according to the present invention.

Identical reference numerals in the figures are intended to indicate like parts, although not every feature in every figure may be called out with a reference numeral.

DETAILED DESCRIPTION OF THE PREFERRED EMBODIMENTS

Figure 1A:
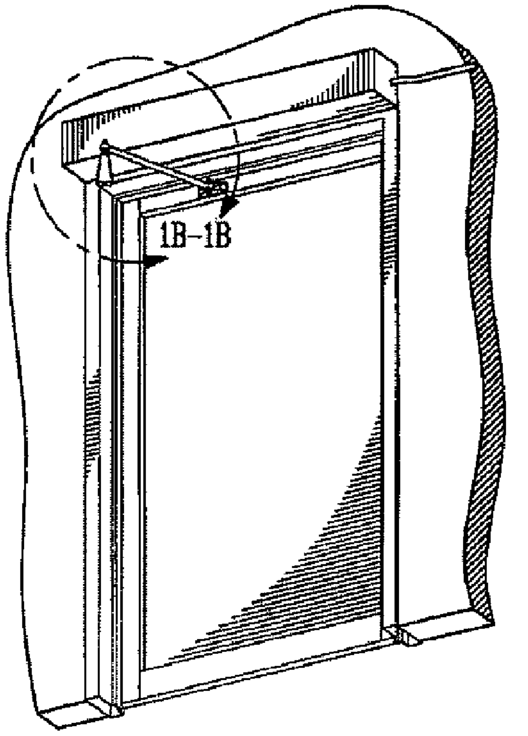
Fig 1A (Prior Art)
FIG. 1 is a view of a door operator system as known in the art.
Figure 1B:
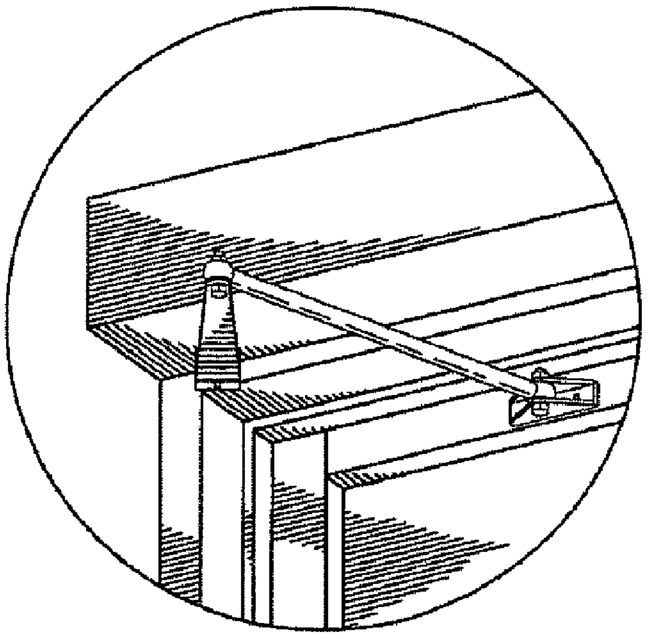
Fig 1B (Prior Art)
Figure 2A:
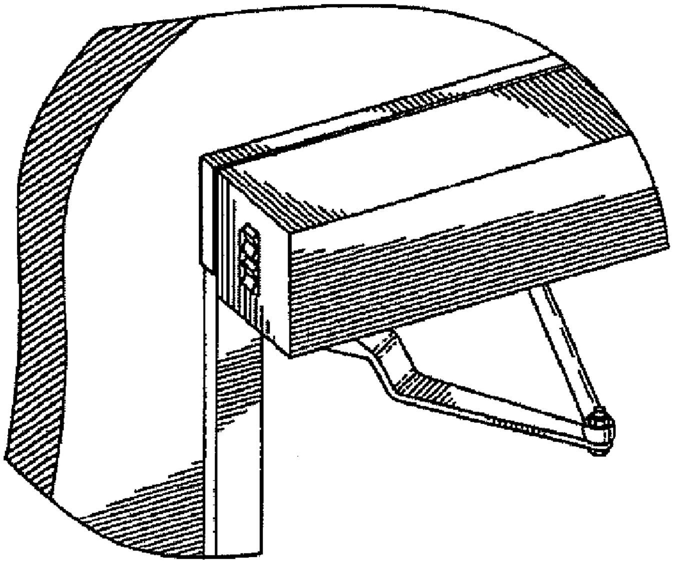
Fig 2A (Prior Art)
FIG. 2 is a close up view of a door operator system as known in the art.
Figure 2B:
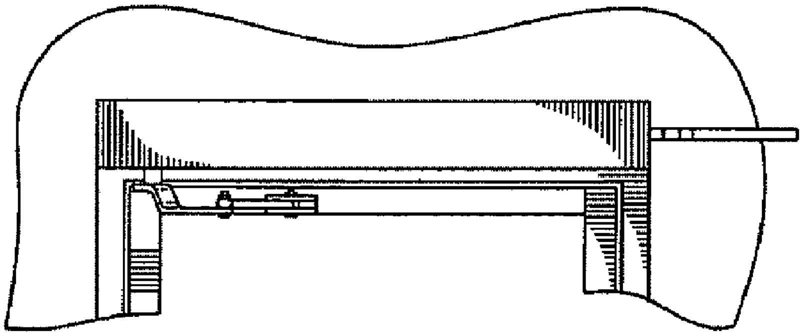
Fig 2B (Prior Art)
Figure 2C:
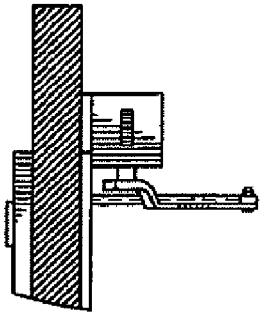
Fig 2C (Prior Art)

Prior to disclosing the details of the present invention, the following disclosure provides the skilled artisan with some general information regarding the present invention.

The amount of energy that can recovered from a door operator having a spring for door closing, is limited by the amount of effort a person can comfortably put into opening the door minus the energy required to close the door. The amount of energy recovered, which is typically saved on a battery pack, is reduced by inefficiencies (both mechanical and electrical) in the total system associated with operating the door. Likewise the amount of time that recovered energy can be retained on a battery pack is limited by any drain on the battery pack while the operator is awaiting an automatic or manual open cycle.

Since user comfort and industry standards limit the maximum acceptable opening force and the energy required to close the door cannot be reduced to zero, the overall efficiency of the door operator is critical to energy regeneration and storage. Efforts have therefore been made to minimize the force and energy required for operation of the door, reduce all electrical loads on an operators stored energy source and maximize capture of energy that might typically be wasted. In particular this wasted energy would be the energy stored in the spring that was over that energy needed to close the door at a safe speed or within an allotted time.

The selection of the type of motor is critical to maximize system efficiency and maximize the capture of energy from a moving. Most low energy door operator designs are focused more on cost than efficiency. Because of this, the motor of choice is usually a low cost brushed DC motor. However, these motors are not particularly efficient and are subject to a relatively high cogging force. An additional disadvantage of a brushed DC motor is that the motor brushes wear with time and will ultimately cause a failure when the brushes completely wear, or if dust from the brushes causes a short in the motor. In the case of a shorted motor, the motor will act as a brake making it difficult to open the door and making the door close slowly. Such failures may require emergency service because of the unsafe or unacceptable performance of the door.

Another motor option is an ironless core brushed DC motor. In this type of motor the rotor inertia is extremely low because the motor construction does not require an iron in the rotor. Also, because of the arrangement of the coils this type of motor has no cogging force. Another benefit of these motors is the very high efficiency of the motor to minimize power output required and maximize power generation. However, this type of motor still has brushes which can wear and the cost of this type of motor is usually several times the cost of a standard DC motor.

Because of the disadvantages of the brushed DC motor and the cost of an ironless core motor, the preferred embodiment of the present invention utilizes a brushless DC motor. The brushless DC motor reduces motor cogging, reduces the power required to open the door, and maximizes power generation on closing of the door. Since there are no brushes to wear the life of the operator is improved and motor failure is minimized as a failure mode.

It is generally known that smaller low torque high speed motors require lower current and have higher efficiencies. The negative of a low torque high speed motor is that a high gear ratio is required to operate in the areas of maximum efficiency and to develop the required torque. Also, a high gear ratio is required so that the motor can be spun fast enough to achieve high power levels and these levels can be transformed into high torque through a gearbox.

Prior art door operators have gear reduction ratios of approximately 50:1 and 100:1. The present invention uses a gear ratio of 322:1 to reduce motor torque for automatic operation and gain higher induced voltages when the motor is operating as a generator when a door is closing. Several lower gear ratios were tested but could not accomplish the goal of generating a significant amount of power during manual operation. The negative of a high gear ratio is that the effect of motor cogging and rotor inertia are amplified. These deleterious effects are eliminated in the present invention by use of a one way roller clutch on the input shaft of the gear train. An additional advantage of this type of clutch is that no electrical power is needed for operation.

The clutch consists of 12 rollers arranged around a cylindrical input shaft. The gear has a powdered metal insert which has a series of semi-circular cuts around the circumference. Between the input shaft and the gear insert is a retainer which serves to both retain the rollers and to bias them against one side or the other of the semi-circular cuts of the gear insert. The retainer also has two spring loaded detents which engage in features of the gear insert and serve to hold the retainer in the biasing position. The direction of operation can be reversed by inserting a hex key or small screwdriver into the slot, holding the gear in place and rotating the retainer until the opposite detent is engaged.

Incorporation of a potentiometer for door positional information is an important aspect of the present invention because it keeps track of door position without any power and improves system efficiency and battery life. Powered encoders are often used in of prior art to give positional information but if power was lost, whether it was line power or battery backup power, the door would not have correct positional information. Therefore for a manually opened door to close safely it would have to be constrained to the lowest allowable closing speed which is door check speed.

At best then a door without a truly non-volatile position memory (that requires no power at all to track and remember position) would have to be forced to close from open position to close at close check speed which results in an excessively long closing time. Close check speed is an average door speed door speed that results in a time to close a door from a door open angle of 10 degrees to a fully closed position in not more than 1.5 seconds.

Therefore if a prior art door operator did not know at what angle the door was released to close and it happened to be released at a door angle of 90 degrees, it would take the door 1.5 seconds×9=13.5 seconds to close. The ability to operate using power generated when a door operator motor acts as a generator with a truly non-volatile position sensor allows the present invention to continue to operate safely at normal closing speeds even in case of a loss of all electrical power. The use of incremental encoders, in addition to requiring power to operate, also require power to remember changes from a starting position.

The present invention includes a control and indicator panel to simplify installation and setup of the door operator. Importantly the door operator includes an AUTO TUNE function that eliminates the need for an operator to manually enter door size and weight information or to refer to calibration charts to determine safe operating parameters based on the door size and weight. In Auto Tune, the present invention goes through a calibrated open cycle, a calibrated hold cycle and calculates door moment of inertia and door speed parameters. Importantly, the Auto Tune mode, by virtue of the calibrated hold cycle automatically adjusts for spring force.

The present invention allows an installing technician to over ride or change any preprogrammed nominal values but warns the installer if changed values are outside of acceptable safe limits. For example whereas it is generally desirable to have 5 second hold open time minimum, it is possible for an installing technician to change the 5 second value.

The present invention also provides built in test equipment to monitor speed and or time parameters. In case where prestored maximum or minimum values are not met, either due to equipment deterioration or operator error, a series of RED indicators are illuminated alerting a technician or installer. The number and pattern of illuminated indicators is indicative of the relationship between a desired value and a measured value.

| Setting | LED Pattern | Hold Open Time |
|---|---|---|
| 1 | ■ □ □ □ | 1 |
| 2 | □ ■ □ □ | 2 |
| 3 | □ □ ■ □ | 3 |
| 4 | □ □ □ ■ | 5 |
| 5 | ■ ■ □ □ | 7 |
| 6 | ■ □ ■ □ | 10 |
| 7 | ■ □ □ ■ | 15 |
| 8 | ■ ■ ■ □ | 20 |
| 9 | ■ ■ □ ■ | 25 |
| 10 | ■ ■ ■ ■ | 30 |

Therefore, and generally speaking in accordance with preferred embodiments, door operators and methodologies for controlling doors are disclosed herein.

For example, in accordance with a first embodiment, a door operator for controlling operation of a door is provided, the door operator having a motor to open the door against a spring force, said door operator further comprising a door position sensor for transmitting a signal indicative of door position; and a controller for controlling a motor current to generate a predetermined motor force to open the door to a predetermined angle; receiving the signal from the door position sensor and determining a door position and a door speed based on the signal; measuring the time for the door to reach the predetermined angle from a closed position; measuring the current to hold the door at the predetermined angle; converting the measured current to an equivalent force of the motor acting on the spring, which represents the spring force; determining a first torque value acting on the door based on the spring force; determining a second torque value acting on the door based on the predetermined motor force to open the door to the predetermined angle; subtracting the first torque value from the second torque value to determine a net torque acting on the door; and calculating a door moment of inertia based on the net torque and the time for the door to reach the predetermined angle from the closed position. In a preferred embodiment, the moment of inertia is used to set open and close speed profiles for the door.

In another preferred embodiment, a door operator for controlling operation of a door, the door operator configured to operate in a manual mode wherein a user provides opening power or in a powered mode using a motor for converting electrical energy stored in a chargeable battery to open the door and to act as a braking load to control door closing speed when charging the chargeable battery in a generator mode during door closing, said operator further comprising a non-volatile door position sensor for transmitting a signal indicative of door position; and a controller for receiving the signal from the nonvolatile door position sensor; determining the door position and a door speed; comparing the door speed to a desired door speed based on a door speed-position profile and generating a door speed error signal; minimizing the door speed error signal by adjusting the braking load resulting from charging the chargeable battery using the motor as a generator.

In yet another preferred embodiment, the present invention is directed to a door operator assembly, comprising an operator unit mounted to a first position, relative to the door, by a first mounting bracket; an arm linkage connecting said operator unit and a second position, relative to the door; said arm linkage being mounted at said second position by a second mounting bracket; and an operator unit comprising a roller clutch to disengage the motor during manual door opening and engage the motor on door closing or on power opening.

In still a further embodiment, a method of controlling operation of a door is provided, wherein a door operator has a motor to open the door against a spring force, said door operator further comprising a door position sensor for transmitting a signal indicative of door position; and a controller for controlling a motor current to generate a predetermined motor force to open the door to a predetermined angle, wherein the method preferably comprises the steps of receiving the signal from the door position sensor and determining a door position and a door speed based on the signal; measuring the time for the door to reach the predetermined angle from a closed position; measuring the current to hold the door at the predetermined angle; converting the measured current to an equivalent force of the motor acting on the spring, which represents the spring force; determining a first torque value acting on the door based on the spring force; determining a second torque value acting on the door based on the predetermined motor force to open the door to the predetermined angle; subtracting the first torque value from the second torque value to determine a net torque acting on the door; and calculating a door moment of inertia based on the net torque and the time for the door to reach the predetermined angle from the closed position. In a preferred embodiment, the moment of inertia is used to set open and close speed profiles for the door.

In another preferred methodology for controlling operation of a door using a door operator configured to operate in a manual mode wherein a user provides opening power or in a powered mode using a motor for converting electrical energy stored in a chargeable battery to open the door and to act as a braking load to control door closing speed when charging the chargeable battery in a generator mode during door closing, and wherein the operator further comprises a nonvolatile door position sensor for transmitting a signal indicative of door position; and a controller for receiving the signal from the nonvolatile door position sensor; the method may preferably comprise the steps of determining the door position and a door speed; comparing the door speed to a desired door speed based on a door speed-position profile and generating a door speed error signal; minimizing the door speed error signal by adjusting the braking load resulting from charging the chargeable battery using the motor as a generator.

Figure 3:
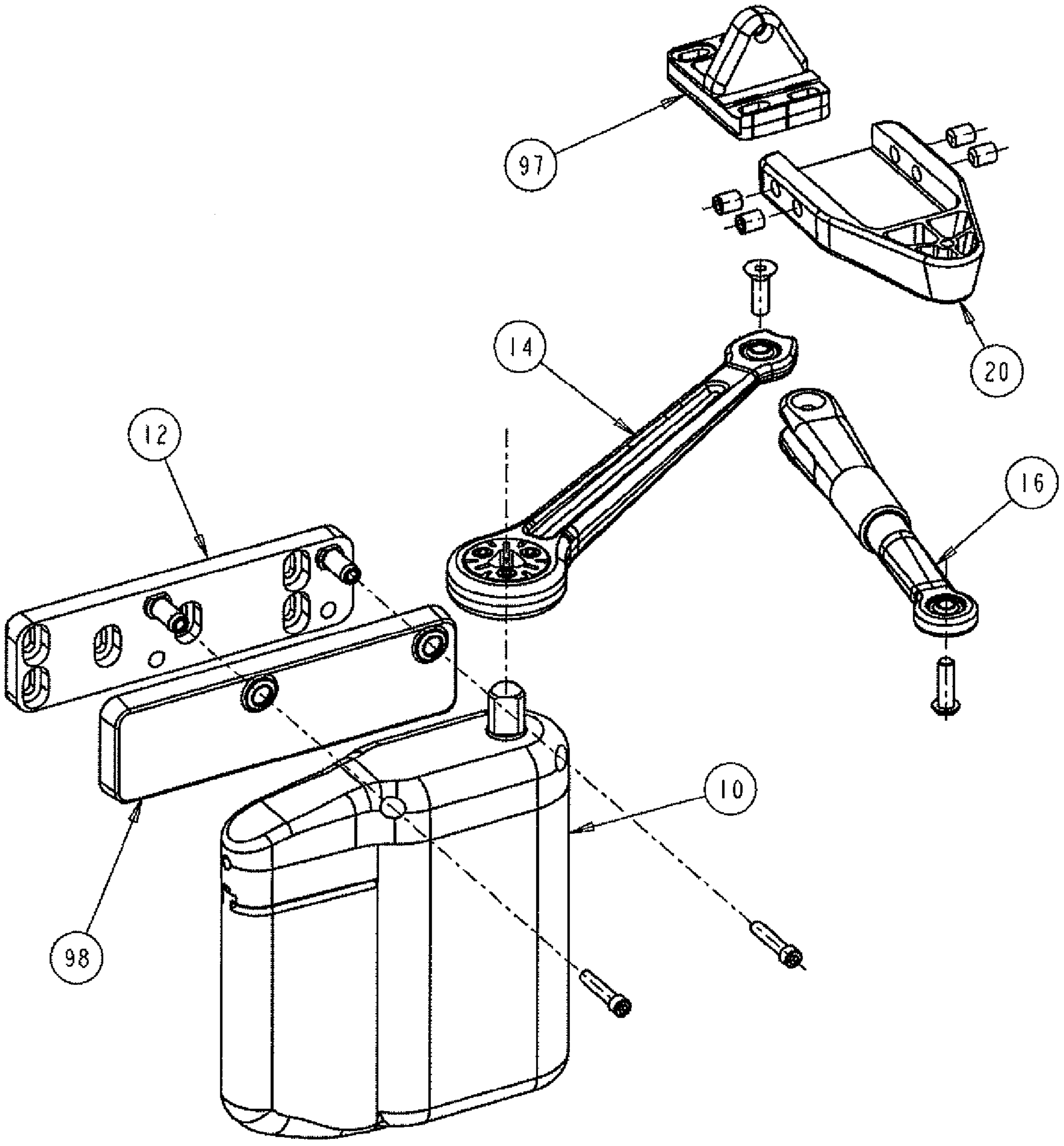
FIG. 3 is an exploded view of a door operator assembly according to an embodiment of the present invention.
Figure 10A:
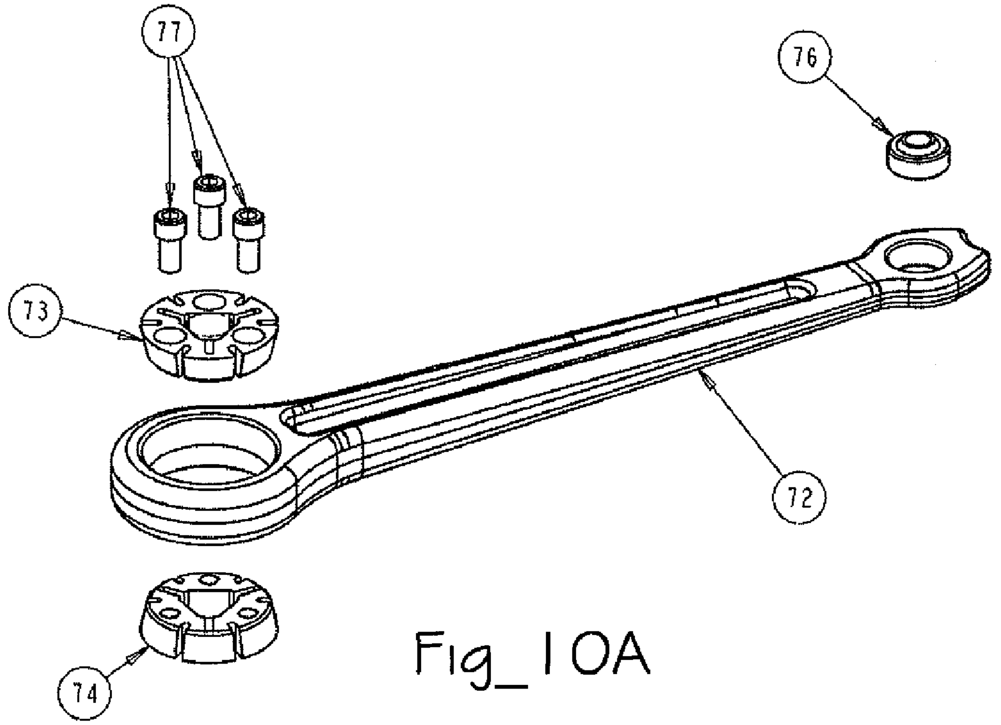
FIG. 10 *a*) is an exploded view and FIG. 10 *b*) is a top view and FIG. 10 *c*) is a sectional view of an integrated door arm for a door operator assembly according to the present invention.

Turning to specifics of the present invention, as illustrated in FIG. 3, a door operator assembly 8 of the present invention comprises an operator unit 10 with linkages 14 and 16 and first and second mounting brackets 12 and 97, and an adjustable pivot bracket 20. To improve the aesthetics of the installation a mounting bracket cover 98 is provided. The overall dimensions of the operator unit 10 are approximately 8" tall, 8" wide (including battery pack), and 2.5" thick. The operator assembly is mounted to a door 5 as shown for example in FIG. 10A. Industry standards that address door operator operational parameters including ANSI A156.19 which is hereby incorporated by reference as if fully set forth herein.

Figure 4:
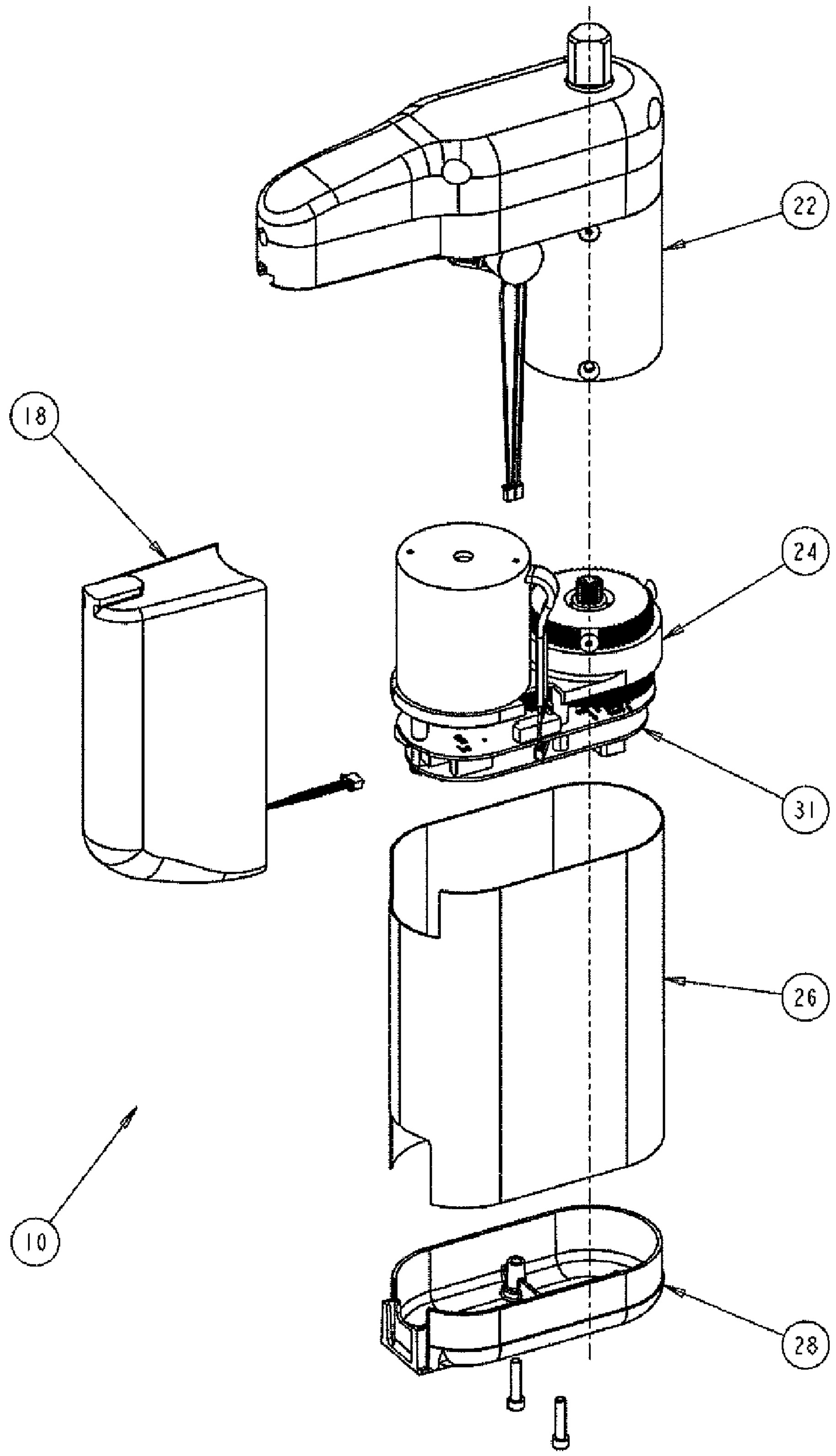
FIG. 4 is an exploded view of an operator unit in a door operator assembly according to an embodiment of the present invention.

As illustrated in FIG. 4, the operator unit 10 further comprises an output drive unit 22, an input drive unit 24 with controls 31, a cover 26 and a control cover 28.

Power is supplied to motor 30 by a low voltage power storage pack 18 comprising rechargeable batteries. Recharging is accomplished by capturing excess energy during door closing in both manual and automatic modes and, in an alternate embodiment, during both manual opening and closing. Where the door operator power open duty cycle exceeds the ability to capture enough energy to maintain a charge on the battery, the battery pack 18 can also be recharged using a low voltage wall adapter.

Figure 5:
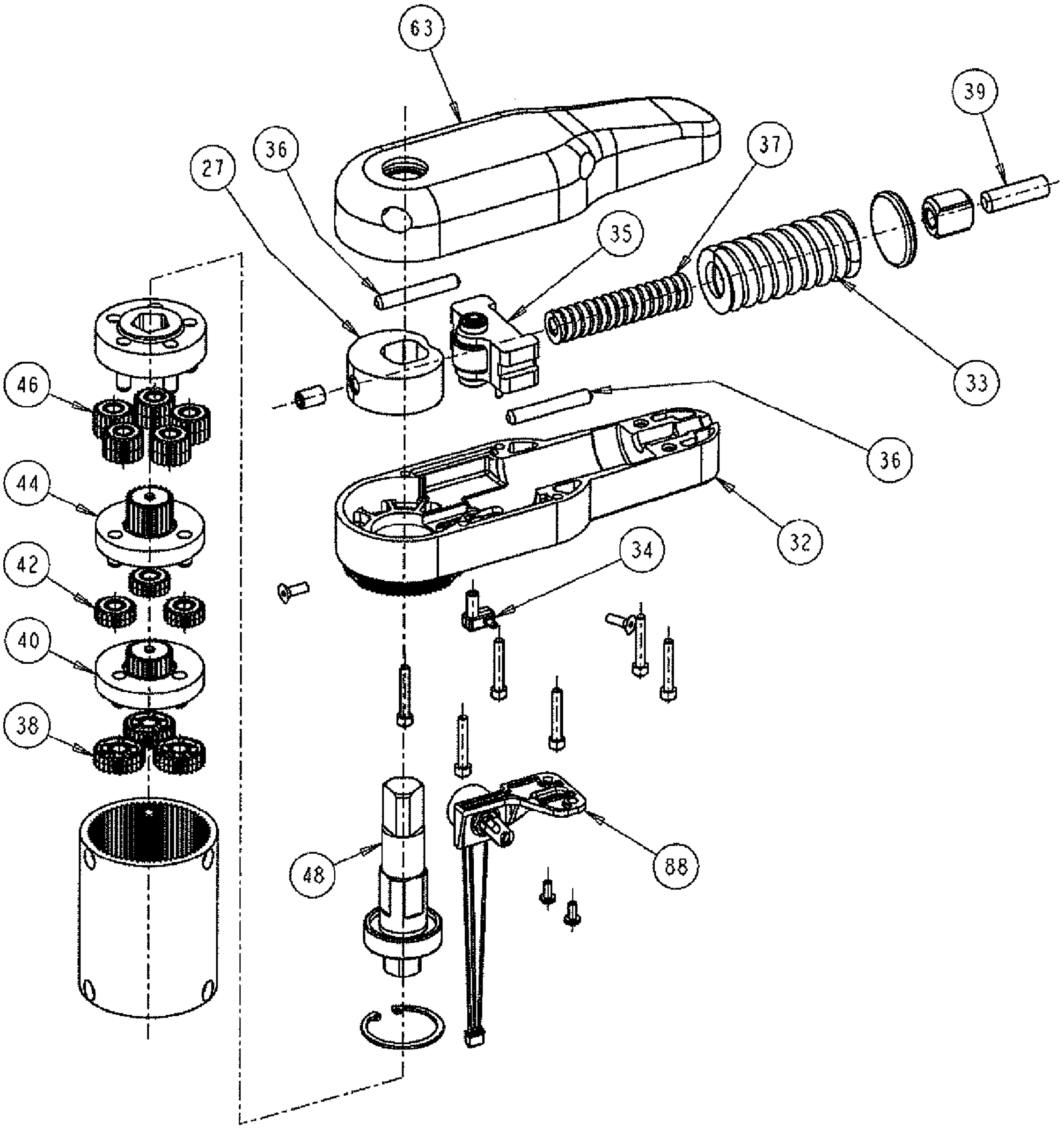
FIG. 5 is an exploded view of an output drive unit of the operator unit of FIG. 4.
Figure 12A:
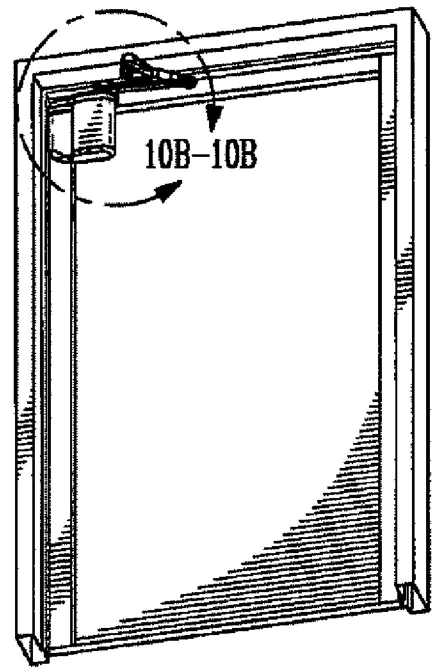
FIG. 12 is a general view of door operator assembly according to an embodiment of the present invention, mounted in a configuration known in the art.
Figure 12B:
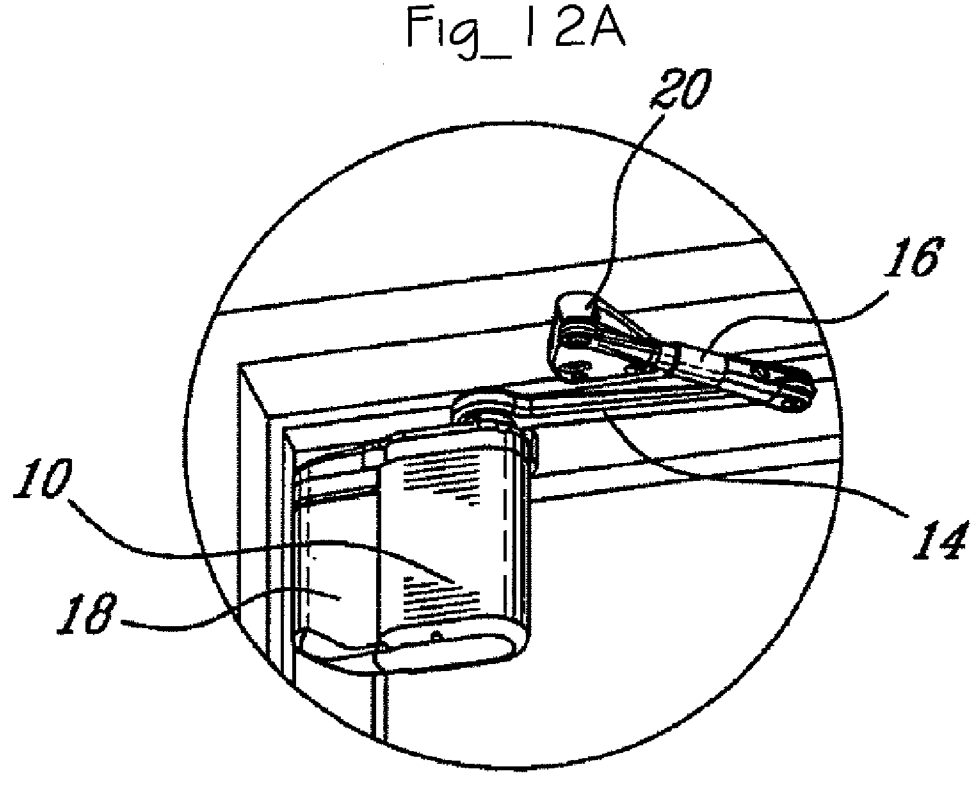
Figure 30:
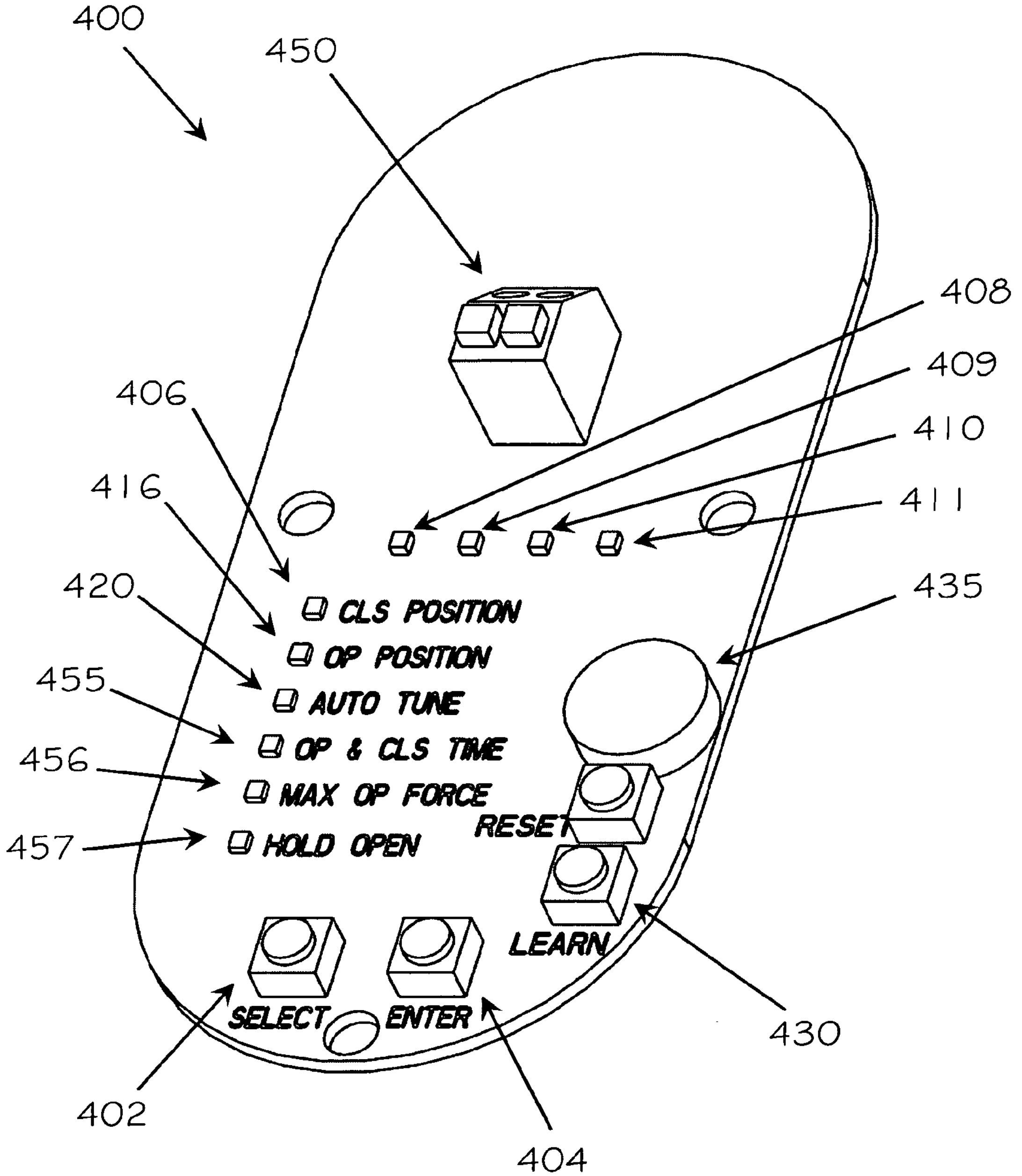
FIG. 30 is an isometric view of the installer panel according to the present invention.

Overall door speed, door position, and battery condition monitoring are performed by controller 31 shown in FIGS. 4 and 30. As shown in FIG. 30, controller 31 receives door position information from a potentiometer 88, as shown in FIGS. 5 and 12, acting as a non-volatile position sensor that does not require standby power. Likewise controller 31 uses Hall Effect feedback sensor 90 (shown on FIG. 30) for control of position and direction of brushless DC motor 30. The Hall Effect devices 90 are integral to Motor 30. Hall Effect devices 90 are turned off in a sleep mode to conserve power.

Battery condition monitoring and charging are likewise controlled by Controller 31. Local control and operator initiation of door setup after installation are also provided at controller 31. In a setup procedure after installation, the installer uses controller 31 to "teach" the door its closed and open positions and to learn certain parameters of the door and spring in an Auto Tune mode.

In the Auto Tune mode, controller 31 opens the door to 45 degrees using a known current, pauses for a few seconds at 45 degrees, calculates a force provided by a closing spring force, and then, knowing the time to reach 45 degrees, the applied current (and hence torque) and spring force, calculates the moment of inertia of the door.

Alternatively, the controller 31 opens the door to 90 degrees, pauses for a few seconds at 90 degrees, calculates a force provided by a closing spring, allows the door to freely close to 45 degrees, measures the time to achieve the second position, calculates the moment of inertia based on the acceleration of the door and the known spring force.

The present invention is configured for maximum efficiency so that there can be significant amounts of energy recovered and stored during any time the door closes and in an alternate embodiment during opening or closing. Maximum energy is retained by putting controller 31 in a hardware sleep mode when the door is not in use and by use of a potentiometer, which does not require power to retain position information for door position sensing. To conserve battery power, Hall effect devices which are required to control operation of motor 30, are not powered in the sleep mode.

As seen in FIG. 5, the output drive unit 22 comprises an output shaft assembly 48, two springs 33 & 37 arranged coaxially, and a planetary gear train. An eccentric 27 assembles to the output shaft assembly 48 using a mating square shape and a set screw.

An eccentric 27 (see FIG. 5) is used to load the adjustable spring assembly which provides the force to close the door. As shown in FIG. 5, the output shaft assembly 48 is connected to the eccentric 27. As the output shaft 48 is rotated, the eccentric 27 causes a roller assembly 35, shown in FIG. 16, to move and compress two-nested helical compression springs 33 and 37. The roller cam 35 connects to a potentiometer 88 which is a non-volatile position sensor through link 34 so that the potentiometer rotates as the cam 35 compresses the springs 33 & 37.

Figure 15:
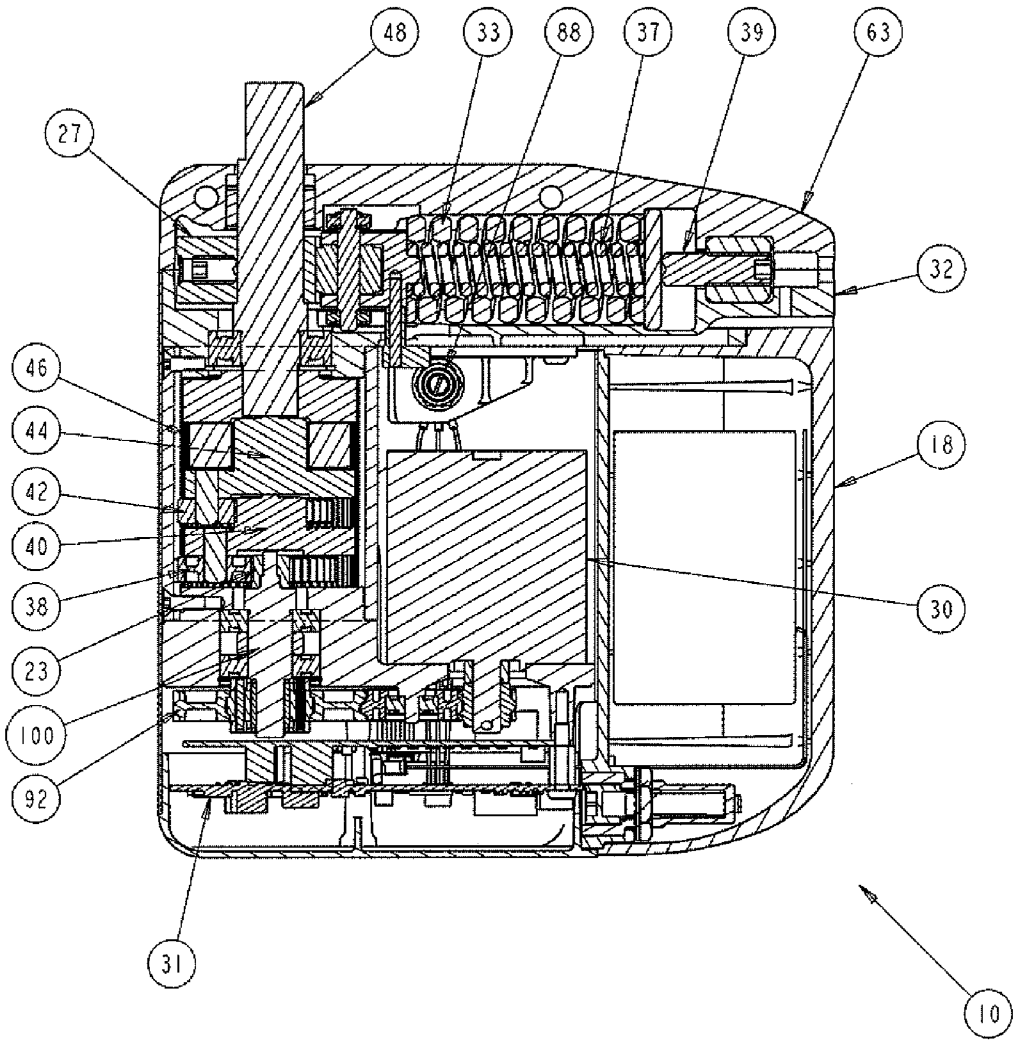
FIG. 15 is cross sectional view of an operator unit in a door operator according to the present invention.
Figure 18A:
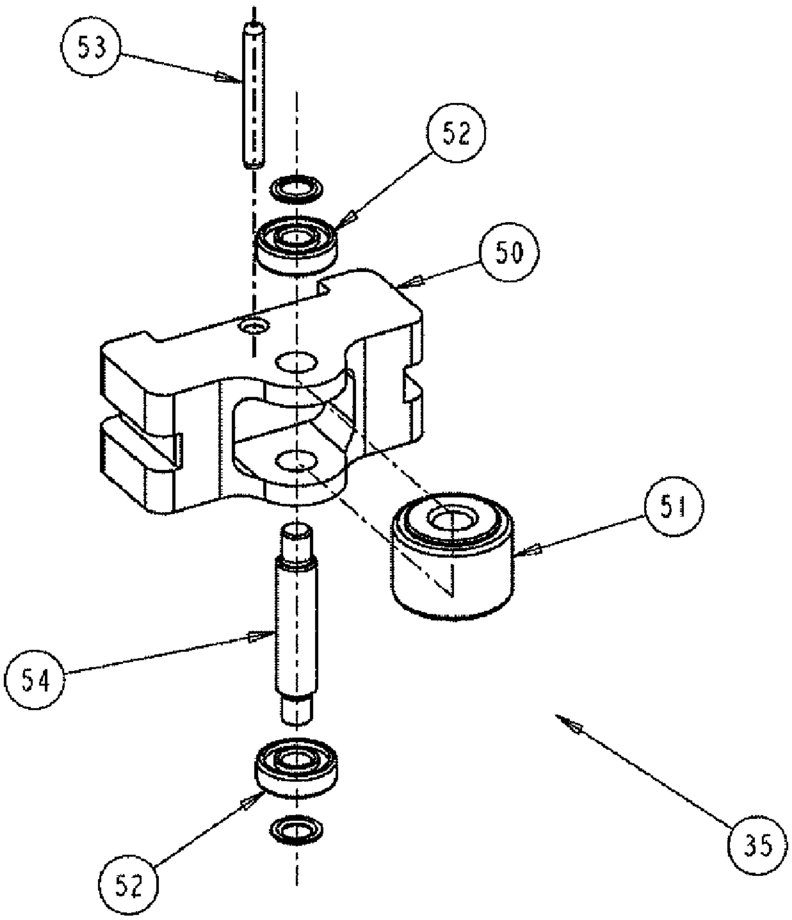
FIG. 18 *a*) is an exploded view and FIG. 18 *b*) is a cross section of a roller assembly according to the present invention.
Figure 18B:
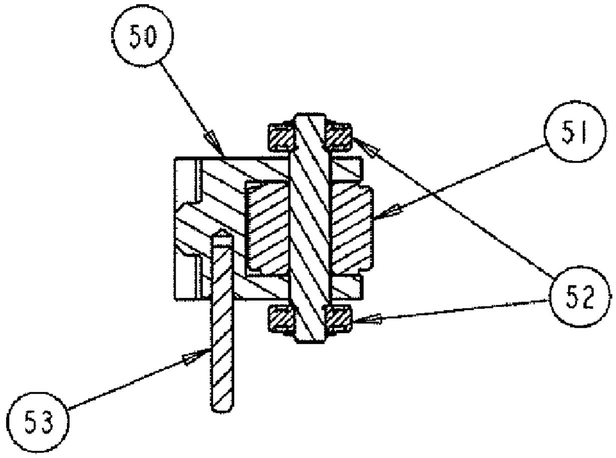

The roller cam assembly 35 is guided in the vertical direction by two dowel pins 36 and in the horizontal direction by two ball bearings 52 (as shown in FIGS. 18 A & 18B). The roller cam assembly 35 comprises a cam roller body 50, a main shaft 54 which attaches to cam roller bearing 51 as seen in FIGS. 18 A & 18B. A dowel pin 53 is used to connect to the potentiometer link 34 as seen in FIG. 15.

The linear force of the springs 33 and 37 results in a torque in the closing direction on the output shaft assembly 48. By modifying the profile of the eccentric 27, the force acting on the door generated torque generated on the output shaft of the operator on the door can be controlled to be a constant through the range of door motion.

Alternatively, the profile of the eccentric 27 can be modified to provide increased torque near the closed position of the door as is often desired to ensure proper door closing in conditions where there is wind or stack pressures which tend to push the door open. This provides for a smooth manual opening feel to the user and ensures reliable closing of the door.

Eccentric 27 is adapted to use compression springs instead of commonly used clock type springs, which are known to fail prematurely. Moreover, since clock type springs only provide torque in one direction, door operators using this type of spring system are handed and require disassembly to reverse the handing thereof. The preferred embodiment of the present invention uses a symmetrical profile for eccentric 27 so that door operator 10 can be used on either a left or a right hand door.

Figure 6:
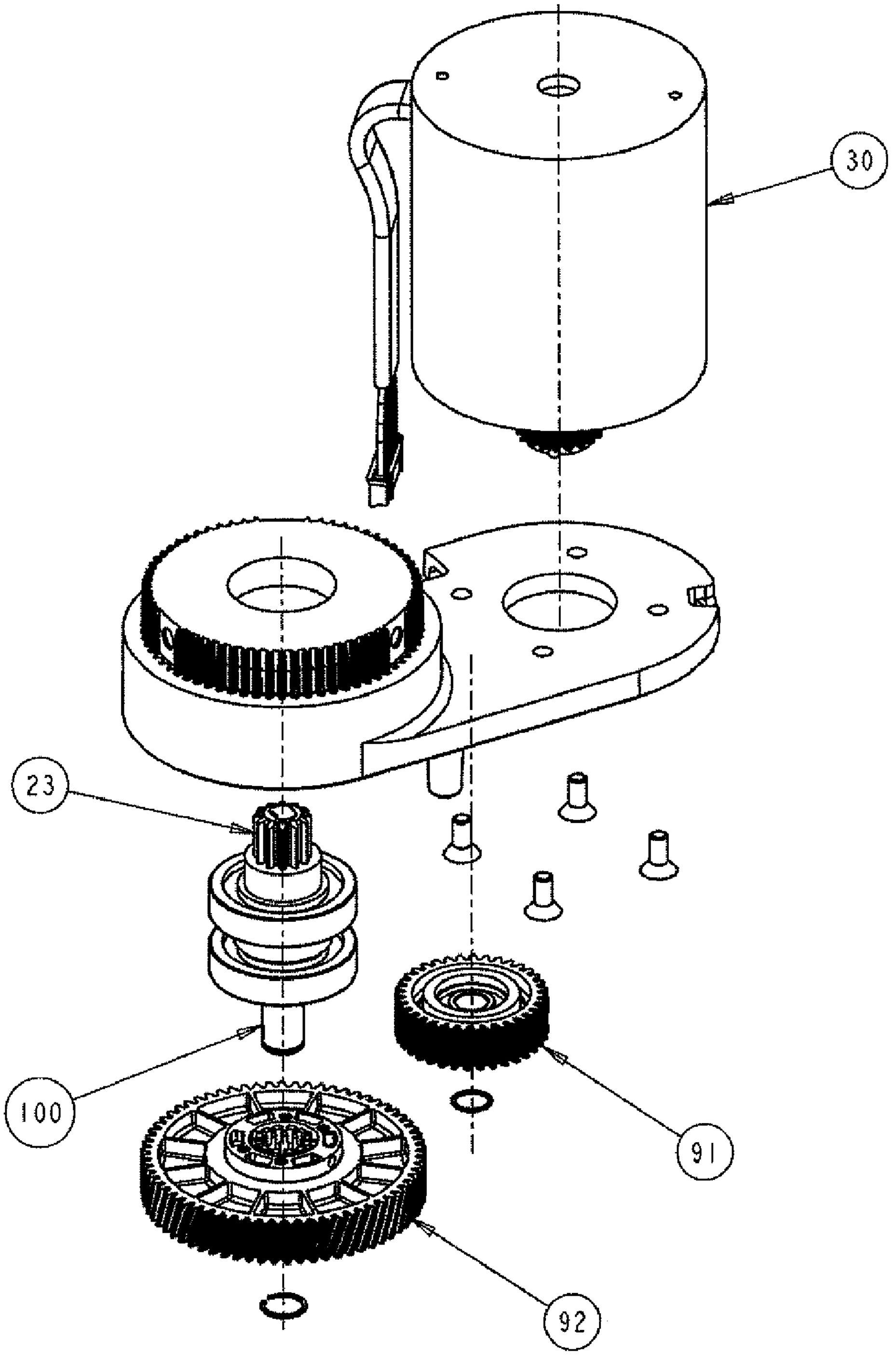
FIG. 6 is an exploded view of an input drive unit of the operator unit of FIG. 4.

As seen in FIG. 6, the input drive unit 24 comprises the motor assembly 30 with a helical gear on the output shaft, an idler gear 91, a helical gear assembly 92 which connects to the input shaft 100 of the planetary geartrain. The input shaft assembly 100 connects the input drive unit 24 to the output drive unit 22 by means of a sun gear 23.

Figure 7:
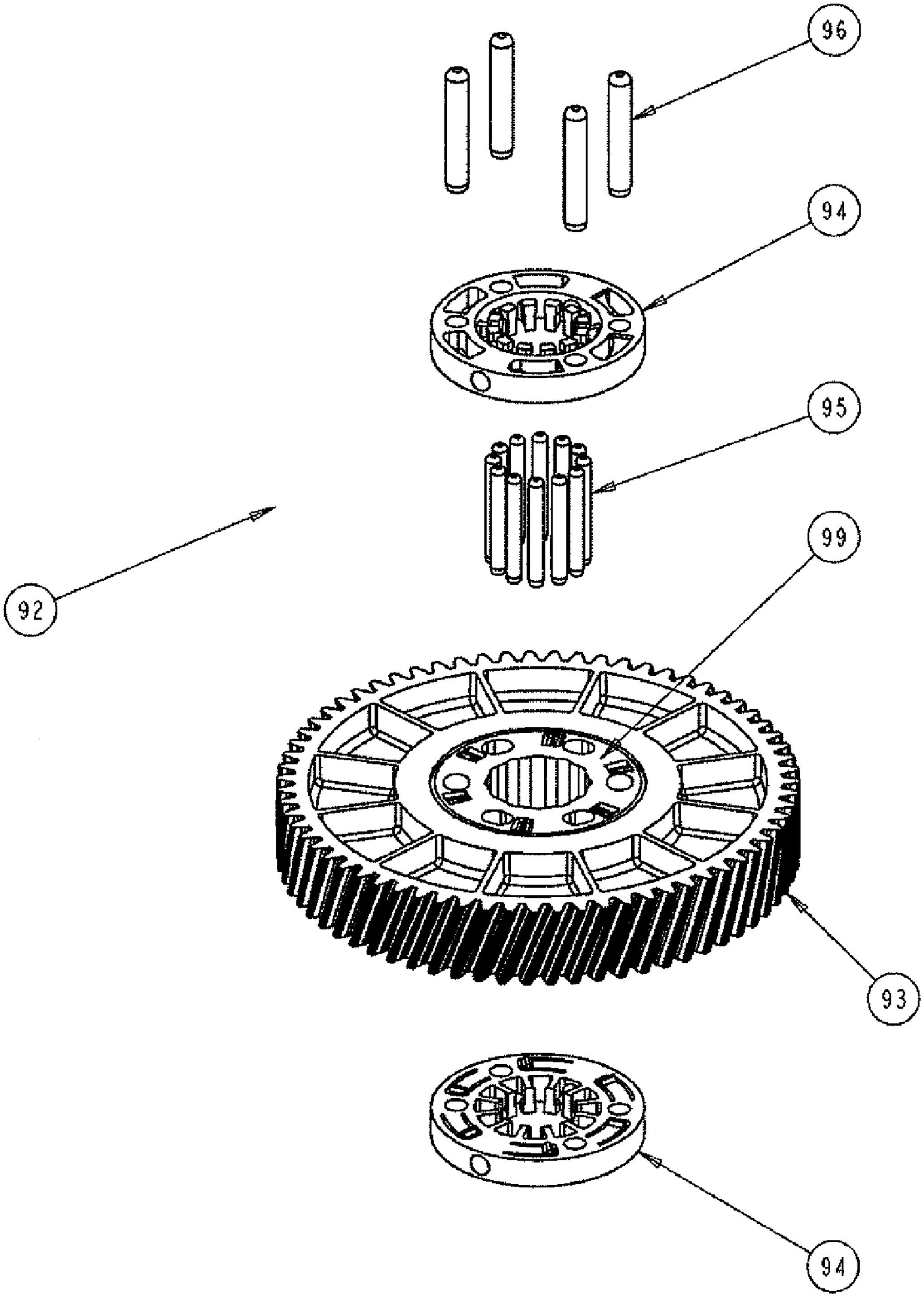
FIG. 7 is an exploded view of a roller clutch assembly.

The helical gear assembly 92 consists of an injection molded helical gear 93 which is molded over a powdered metal insert 99 as can be seen in FIG. 7. The powdered metal insert 99 has 12 semi-circular cuts arranged around the inside diameter. The same number of rollers 95 are arranged in the cuts in the powdered metal insert 99 and are held in place by two plastic retainers 94. The two retainers are assembled and held together by four dowel pins 96 which maintain the relative position between the two retainers.

Figure 8:
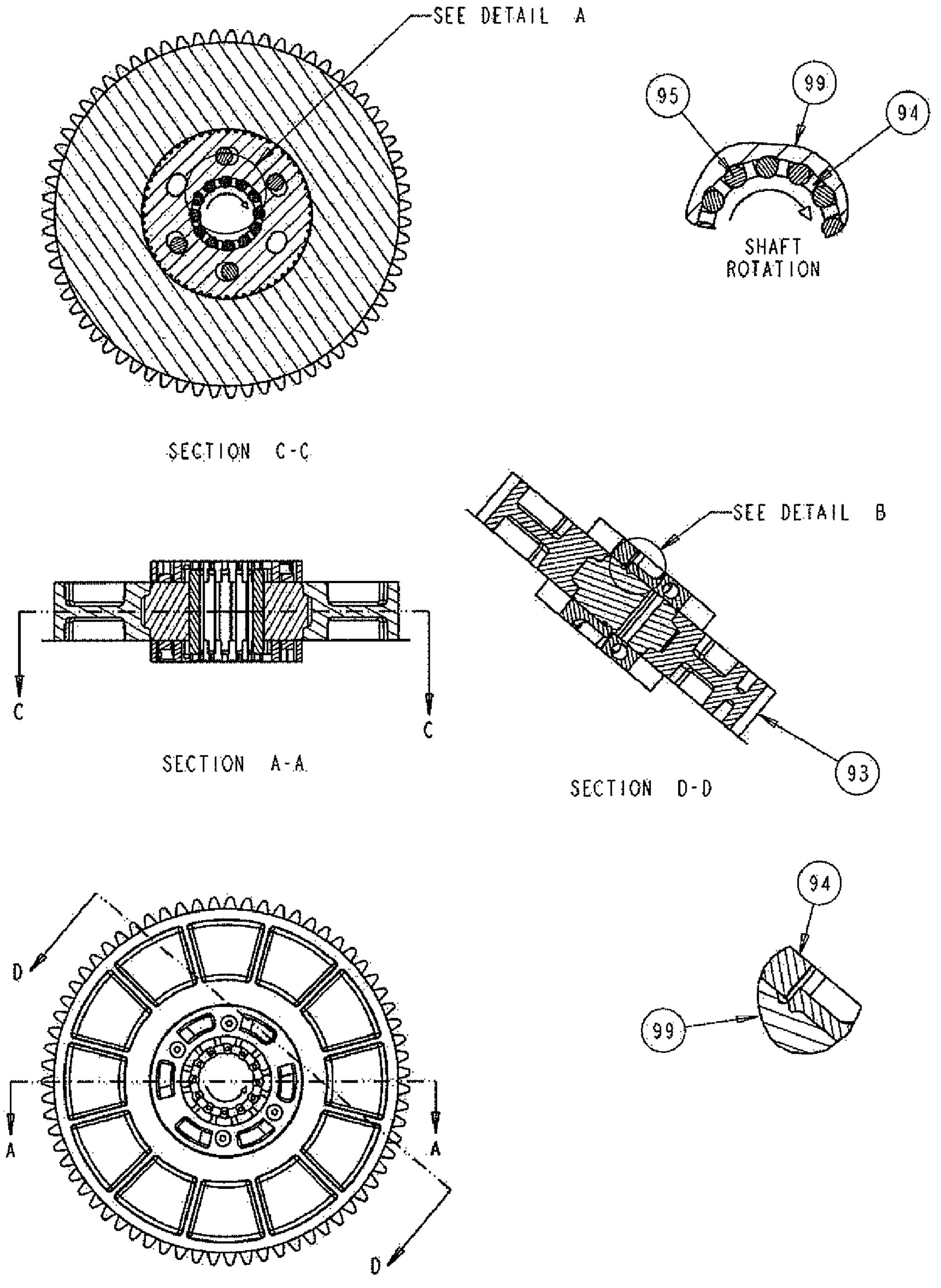
FIG. 8 shows the roller clutch assembly in position for right hand operation.
Figure 9:
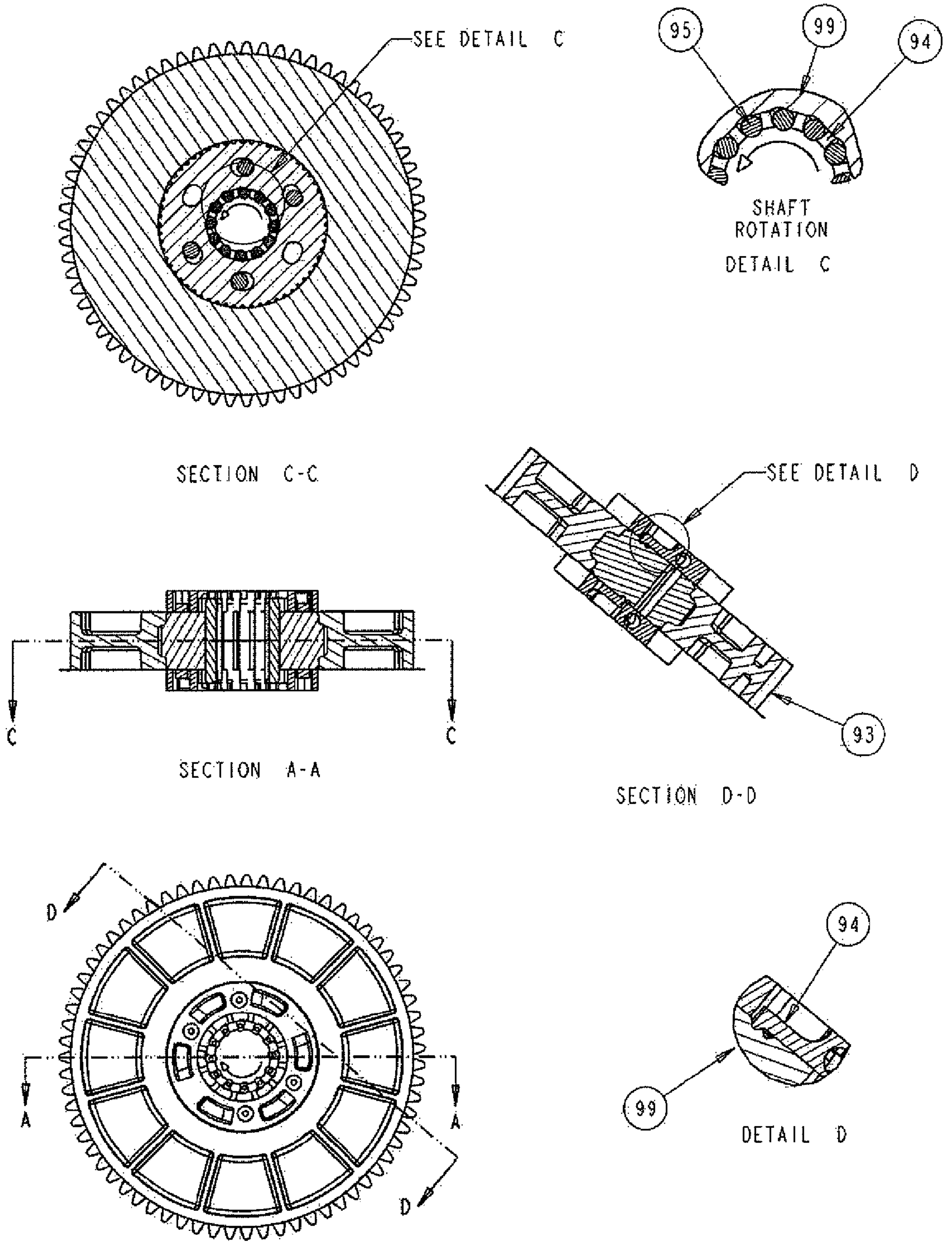
FIG. 9 shows the roller clutch assembly in position for left hand operation.

As can be seen in FIGS. 8 & 9, the retainers contain a spring detent shown in detail B which engage in one of two positions. As shown in FIG. 8, when the retainers are in the first position, the retainers bias the 12 rollers in a counterclockwise orientation relative to the powdered metal insert 99. The bias results in locking the rotation of the shaft assembly 100 to the helical gear assembly 92 when the rotation of the shaft is in a counterclockwise direction. When the shaft rotates in the clockwise direction (which would be the direction of rotation during manual use of a right hand door) the rollers move into the larger portion of the semicircular cuts in the powdered metal part 99 which allows the shaft to rotate freely in relationship to the helical gear assembly 93.

When the retainers are in the second position, as shown in FIG. 9, the retainers bias the rollers in the rollers 12 in a clockwise orientation relative to the powdered metal insert 99. The bias results in locking the rotation of the shaft assembly 100 to the helical gear assembly 92 when the rotation of the shaft is in a clockwise direction. When the shaft rotates in a counterclockwise direction (which would be the direction of rotation during manual use of a left hand door) the rollers move into the larger portion of the semicircular cuts in the powdered metal part 99 which allows the shaft to rotate freely in relationship to the helical gear assembly 93.

Having the ability to selectively change the bias of the rollers allows the installer to change the hand of the door operator without any special tools or disassembly of the operator. The installer only must hold the helical gear 92 assembly stationary while rotating the retainers 94 into the desired position using a common tool such as a hex key or a small screwdriver.

The sun gear 23 drives a first stage planetary gear consisting of three plastic planet gears 38 driving an input carrier 40 as shown in FIG. 15. The output carrier 40 drives a second set 42 of three planet gears, which are cut or powdered metal gears driving drives an intermediate carrier 44. The intermediate carrier 44 drives a final set of five planetary gears 46, which are cut or powdered metal gears driving the output shaft assembly 48. In the preferred embodiment the speed reduction (or gear ratio) through gearing of FIG. 15 is 322:1.

The use of a the helical gear assembly including the idler gear allows for a parallel rotational axis structure of the door operator assembly, which allows the motor 30 to be positioned next to the gear train. This embodiment allows for a higher gear reduction ratio in comparison to other methods such as a pulley or timing belt arrangement.

Once the door operator 10 is installed on the door, the Force of springs 33 and 37 may be adjusted by spring adjustment set screw 39 (shown in FIG. 5) both while the door is installed or is in a disassembled state. An Auto Tune mode of the present invention is used to calibrate for spring force and or door weight and size to achieve safe operation as will be described below.

Springs 33 and 37 absorb energy during door opening and store the energy for use when closing the door. As will be explained further below, if a door equipped with the present invention were to move to quickly, its speed would be controlled by converted excess kinetic energy in the door into electrical energy to charge battery pack 18. This conversion of energy provides power to the controller 31 and allows for control of the door closing speed based on position in the event that a failure of battery pack 18 occurred.

Referring back to FIG. 3, the linkage comprises a shock absorbing door arm 16 and a drive arm unit 14. The output shaft assembly 48 is supported by a top housing 63 and a bottom housing 32. The output shaft assembly 48 is connected to the drive arm unit 14 as shown in FIG. 12.

Figure 10B:
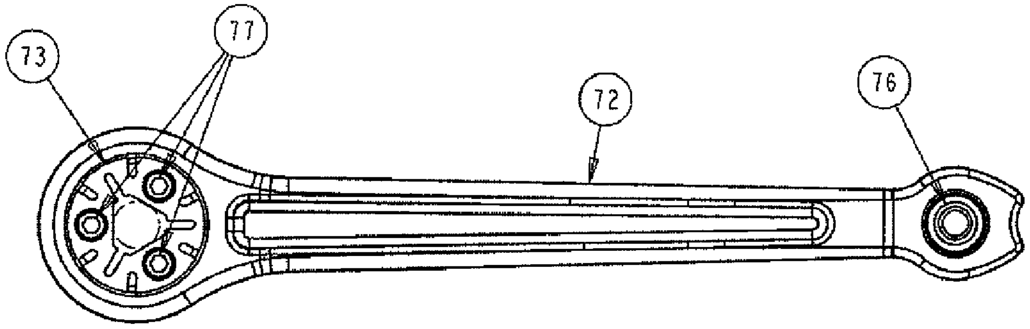
Figure 10C:
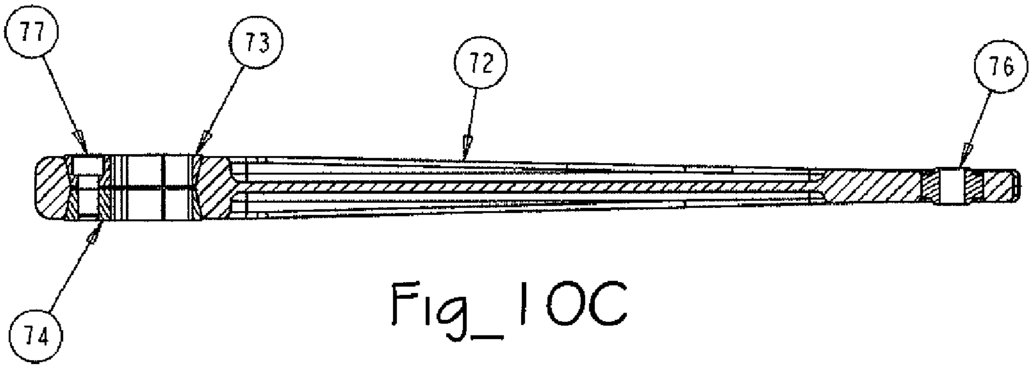

As shown in FIG. 10, the drive arm unit 14 comprises a main arm 72, which has a spherical bearing 76 at a first end and a shaft coupling assembly consisting of two tapered collars 73, 74 held together with three fasteners 77 at a second end. The tapered collars 73 and 74 and the output shaft assembly 48 have mating triangular shapes. The two parts have sufficient clearance to assemble easily when the fasteners 77 are loose. The tapered collars 73 and 74 have a series of 6 slots on each collar arranged around the inside and outside diameters. Tightening the fasteners 77 causes the tapered collars to contract around the shaft assembly 48 and exert a high frictional force on the main arm 72 which prevents rotation.

Such tapered coupling between the door arm and the output shaft, compared to conventional splined or square shape on the output shaft of the operator unit, allows the arm to be attached in a range of positions on the door operator output shaft, and provides a robust connection to the output shaft 48. Such splined shapes are also know to have a problem with fretting which can result in wear and eventually allow such relative rotation between the output shaft and the arm that one or both must be replaced. Additionally, if the arm were to experience such an abusive force as to cause relative rotation, the tappers would simply slip. Such an occurrence on an output shaft and arm with mating splines results in damage to the shaft and or arm assembly which would require replacement of one or both.

Figure 11A:
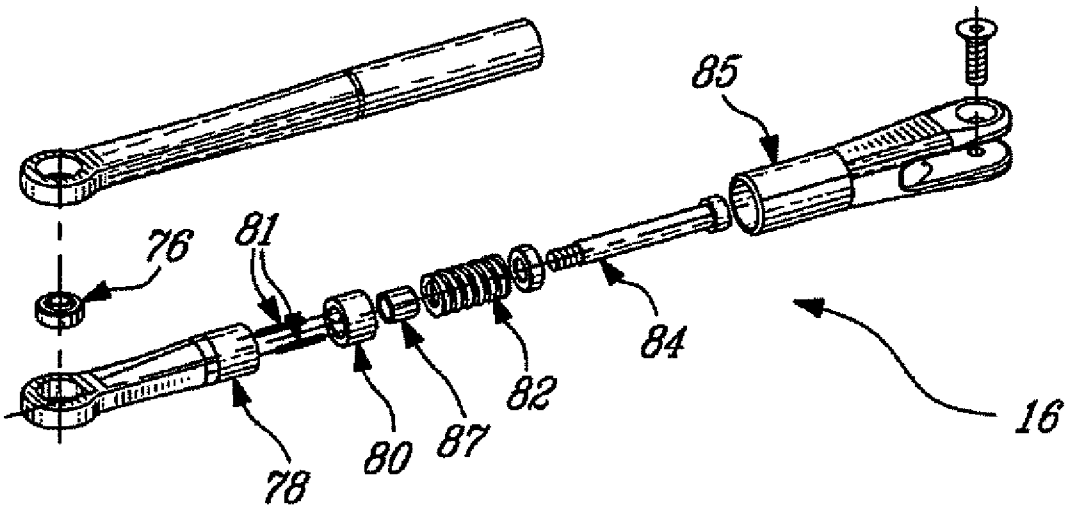
FIG. 11 *a*) is an exploded view and FIG. 11 *b*) is a sectional view of an adjustable length shock absorbing arm unit according to the present invention.
Figure 11B:
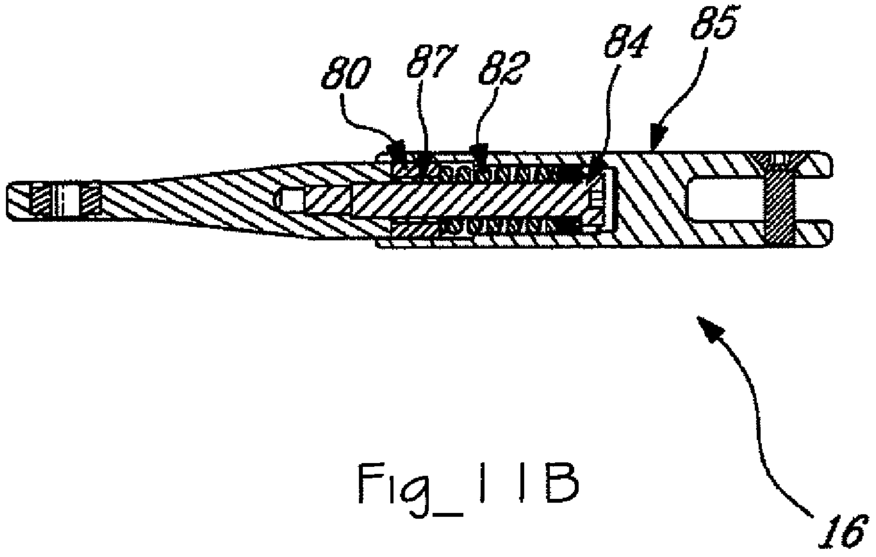

As shown in FIG. 11, shock absorbing door arm 16 comprises a solid arm 78 and a hollow arm 85, which are connected through a threaded housing 80 and a plastic bearing 87 by means of a shock-absorbing medium 82, such as a spring or a closed cell polyurethane for example. A shoulder bolt 84 is used to preload the shock absorbing door arm 16 when connected to the solid arm 78. Length adjustment is accomplished by rotating hollow arm 85 in relation to the threaded housing 80, which is fixed to the sold arm 78 through two dowel pins 81.

Shock absorbing door arm 16 reduces the impact force frequently caused by wind or abuse, which are common causes of a mechanical failure.

Figure 16A:
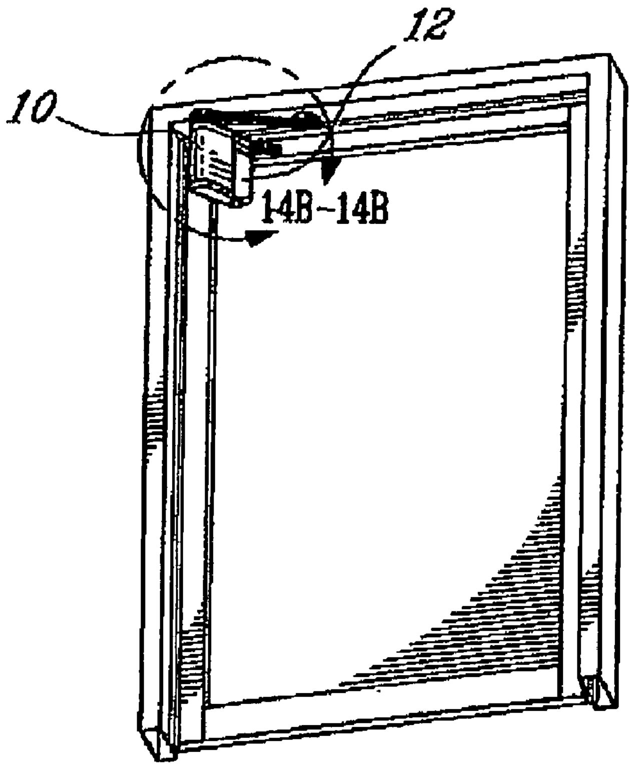
FIGS. 16A and 16B, hereinafter collectively referred to as FIG. 16, are views of a door operator assembly according to an embodiment of the present invention, mounted in a third alternative configuration.
Figure 16B:
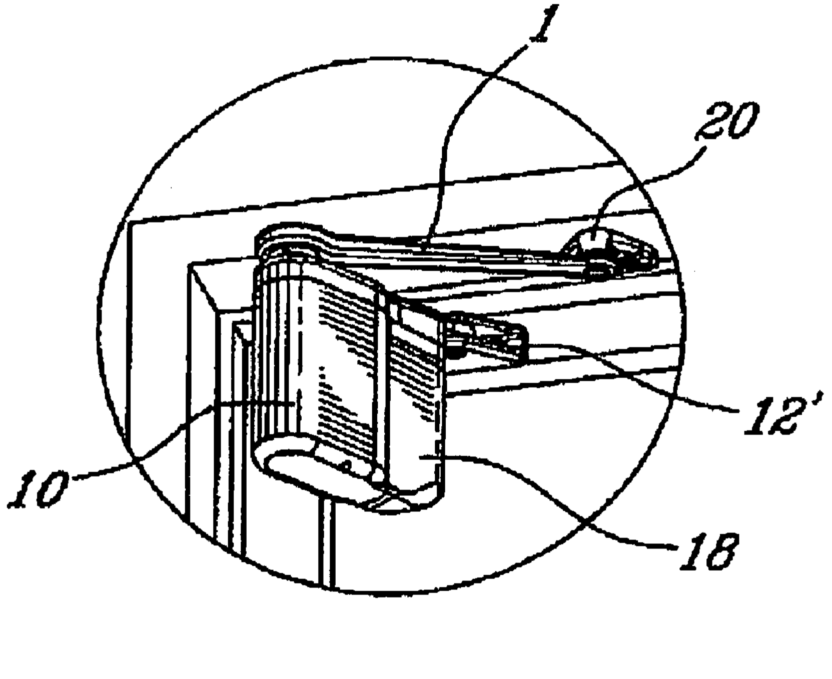

Shock absorbing door arm 16 is attached on a first end to the second mounting bracket 20, which mounts to the frame mounting bracket 97. The shock absorbing door arm 16 mounts to the second mounting bracket 20 through a spherical bearing 76 (see FIG. 9), and on a second end to the drive arm unit 14 as shown in mounting configurations illustrated in FIGS. 12 & 16 for example. The mounting bracket arrangement allows for adjustment of the distance between the face of the door and the spherical bearing 76 on the shock absorbing arm 16. This distance is critical to maintaining the proper linkage geometry to allow the door to open and close between the required angles when the operator is mounted as shown in FIGS. 12 and 16.

Figure 13A:
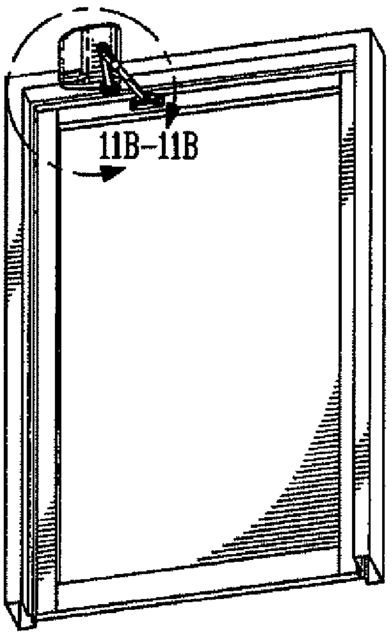
FIG. 13 is a general view of door operator assembly according to an embodiment of the present invention, mounted in a first alternative configuration.
Figure 13B:
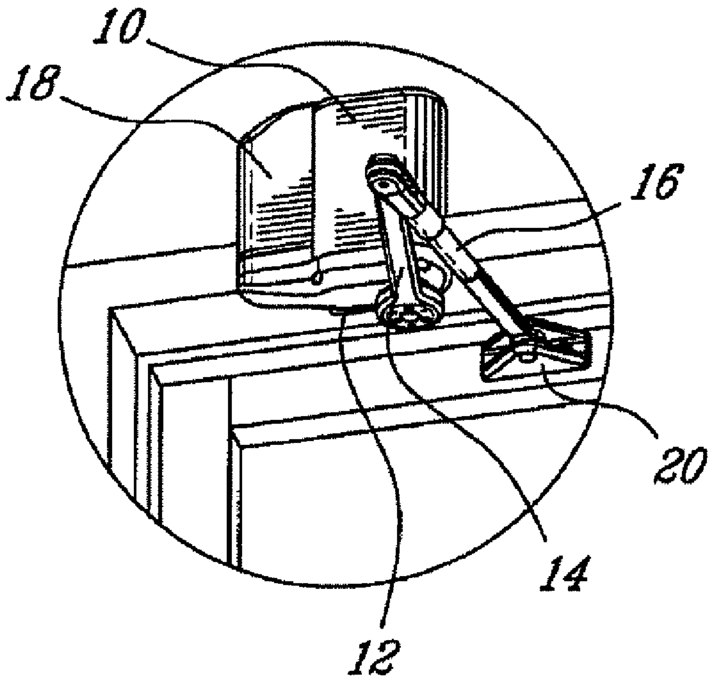
Figure 14A:
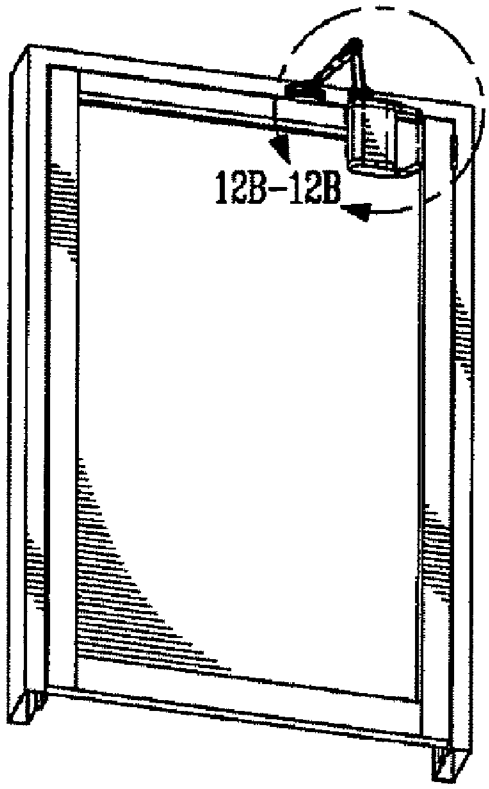
FIG. 14 is a general view of door operator assembly according to an embodiment of the present invention, mounted in a second alternative configuration.
Figure 14B:
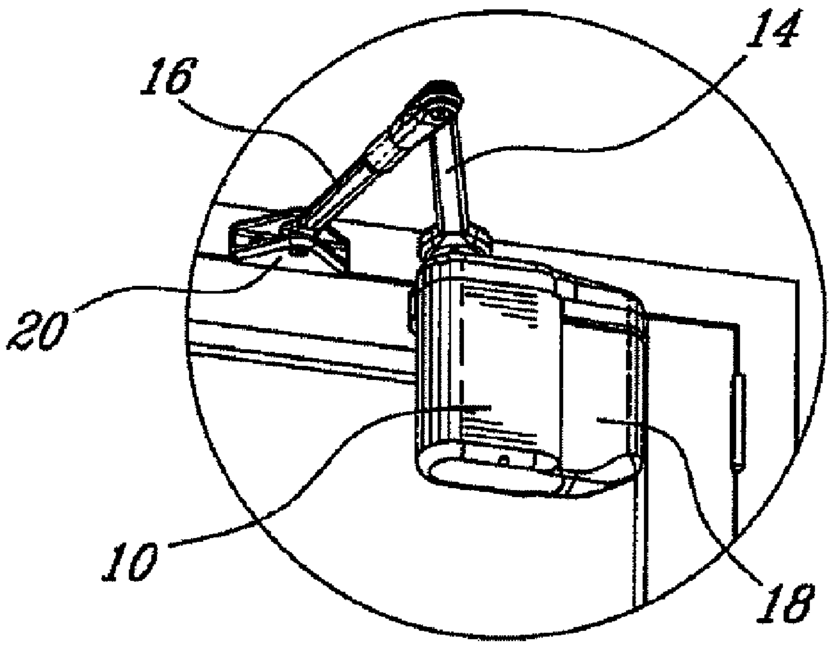

In an alternative mounting arrangement as shown in FIG. 13, the operator 10 is attached to the door frame and the second mounting bracket 20 is affixed to the door. The door operator can also be mounted to the push side of the door with the second mounting bracket 20 attached to the frame of the door as shown in FIG. 14.

Figure 19A:
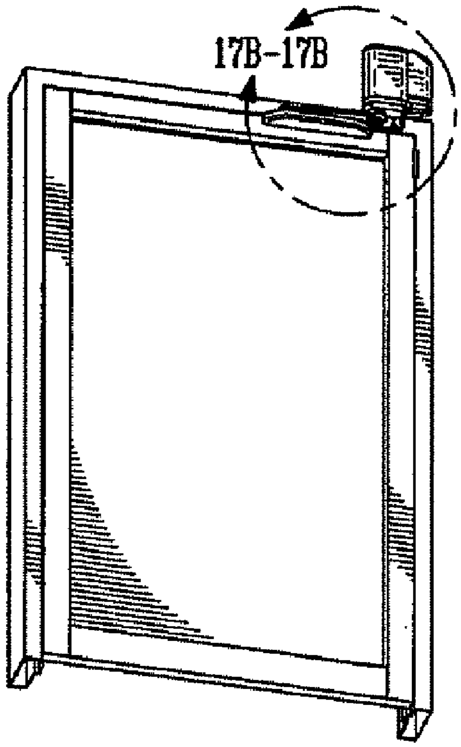
FIG. 19 is a general view of door operator assembly according to an embodiment of the present invention, mounted in a fourth alternative configuration.
Figure 19B:
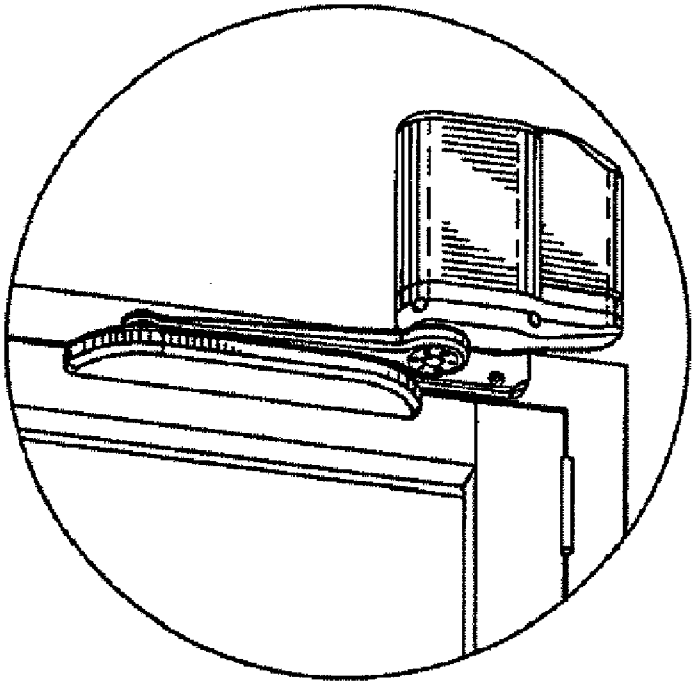

A further alternate mounting arrangement as shown in FIG. 19 allows the operator to be mounted to the door frame. In this mounting arrangement the output shaft assembly 48 connects to the fixed arm assembly 14 to drive a slider which is attached to the door. This mounting method minimizes the protrusion from the face of the frame which is required in some applications.

Figure 17A:
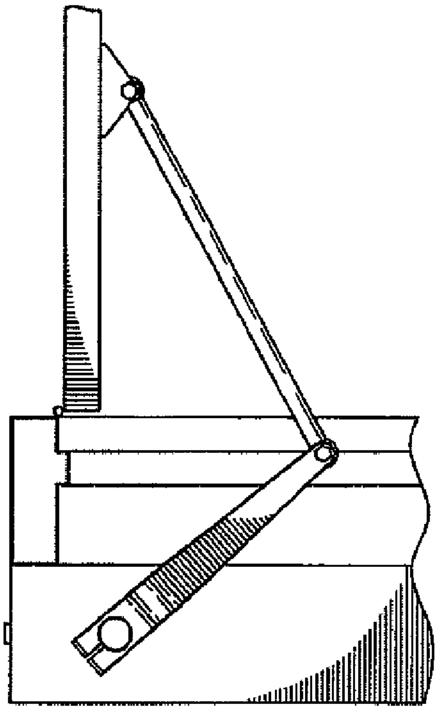
FIG. 17 *a*) is a top view of a linkage of a door operator assembly as known in the art.
Figure 17B:
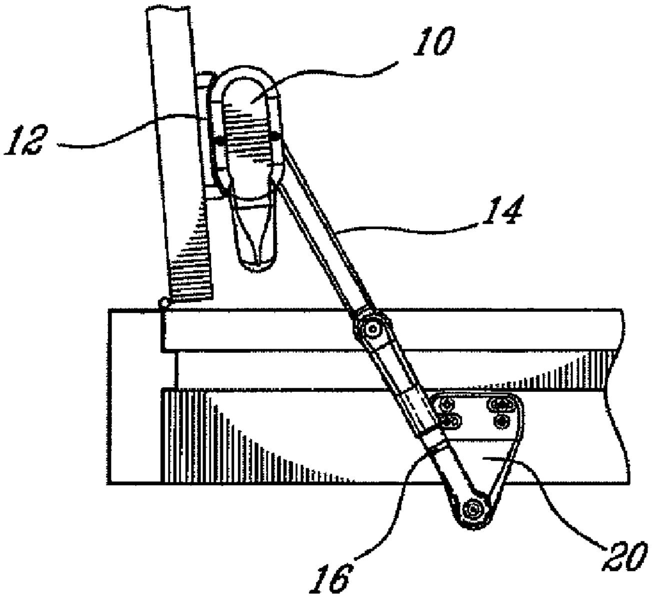

As seen in FIG. 17*b*, the drive arm unit 14 and the shock absorbing door arm 16 maintain a linear alignment when the door is fully opened, thereby eliminating torsional loads on the operator and reducing stress on the door operator assembly, mounting brackets, and door pivots.

The door operator assembly of the present invention incorporates speed controls to ensure that the door operates at safe speeds. Controller 31 constantly monitors door speed and position, in such a way that if the door begins to move faster than a predetermined speed/position profile, the motor 30 is used as a generator to remove energy from the moving door and slow it down. The excess energy is used to recharge power pack 18.

In an alternative embodiment an electrically driven clutch is used in place of the roller clutch 80 to allow energy capture during manual open. The electrically driven clutch would provide the desired characteristic of, for example, slowing down a door when it is driven open by a gust of wind.

In a second embodiment a directional mechanical override clutch is used to engage a when a door opens at an excessive speed.

At the start of closing the invention applies a force proportional to the force available in the compressed spring and the door is allowed to accelerate as fast as it can. However when the closing speed is close to a desired maximum closing speed for the door, the invention switches into a regenerative mode where excess kinetic energy in the door, is converted into electrical energy by motor 10 acting as a generator to charge battery pack 18. Battery pack 18 may comprise one or more batteries as would be understood in the art. Therefore, reference to a battery or batteries will be understood to be a battery pack, and visa versa.

Power is supplied to motor 30 by a low voltage power storage pack 18 comprising rechargeable batteries. Recharging is accomplished by capturing excess energy during door closing in both manual and automatic modes and, in an alternate embodiment, during both manual opening and closing. Battery pack 18 can also be recharged using a low voltage wall adapter. In cases where a large number of powered operations results in excessive drain on battery pack 18, the low voltage wall adapter recharges battery pack 18.

Additional power may be provided to extend the life of the battery pack when no manual door operation occurs by using solar cells or RF power transfer technology for doors which are very rarely used or are not used for extended periods.

When it is desired to use a low voltage wall adapter the battery pack 18 may be substituted with a super high capacity capacitor pack assembly. This would reduce cost and eliminate any long term degradation of storage capacity associated with current battery technology.

Overall door speed, door position, and battery condition monitoring are performed by controller 31 shown in FIGS. 6 and 30. As shown in FIG. 30, controller 31 receives door position information from a potentiometer 95 acting as a non-volatile position sensor that does not require standby power.

Likewise controller 31 uses Hall Effect feedback sensor 90 (shown on FIG. 30) for monitoring and control of the position of brushless DC motor 30. The Hall Effect devices 90 are integral to Motor 30. Hall Effect devices 90 are turned off in a sleep mode to conserve power.

Local control and operator initiation of door setup after installation are also provided at control and indicator 400. In a setup procedure after mechanical installation, the installer uses control and indicator 400 to “teach” a door operator closed and open positions of the door and to learn certain parameters of the door and spring in an Auto Tune mode. Control and indicator 400 is also used to teach transmission codes of RF activation switch 103.

In the Auto Tune mode, controller 31 opens the door to 45 degrees using a known current, pauses for a few seconds at 45 degrees, calculates a force provided by a closing spring force, and then, knowing the time to reach 45 degrees, the applied current (and hence torque) and spring force, calculates the moment of inertia of the door.

Alternatively, the controller 31 opens the door to 90 degrees, pauses for a few seconds at 90 degrees, calculates a force provided by a closing spring, allows the door to freely close to 45 degrees, measures the time to achieve the second position, calculates the moment of inertia based on the acceleration of the door and the known spring force.

The present invention is configured for maximum efficiency so that there can be significant amounts of energy recovered and stored during any time the door closes and in an alternate embodiment during opening or closing. Maximum energy is retained by putting controller 31 in a hardware sleep mode when the door is not in use and by use of a potentiometer, which does not require power to retain position information for door position sensing. To conserve battery power, Hall effect devices which are required to control operation of motor 30, are not powered in the sleep mode.

Figure 20:
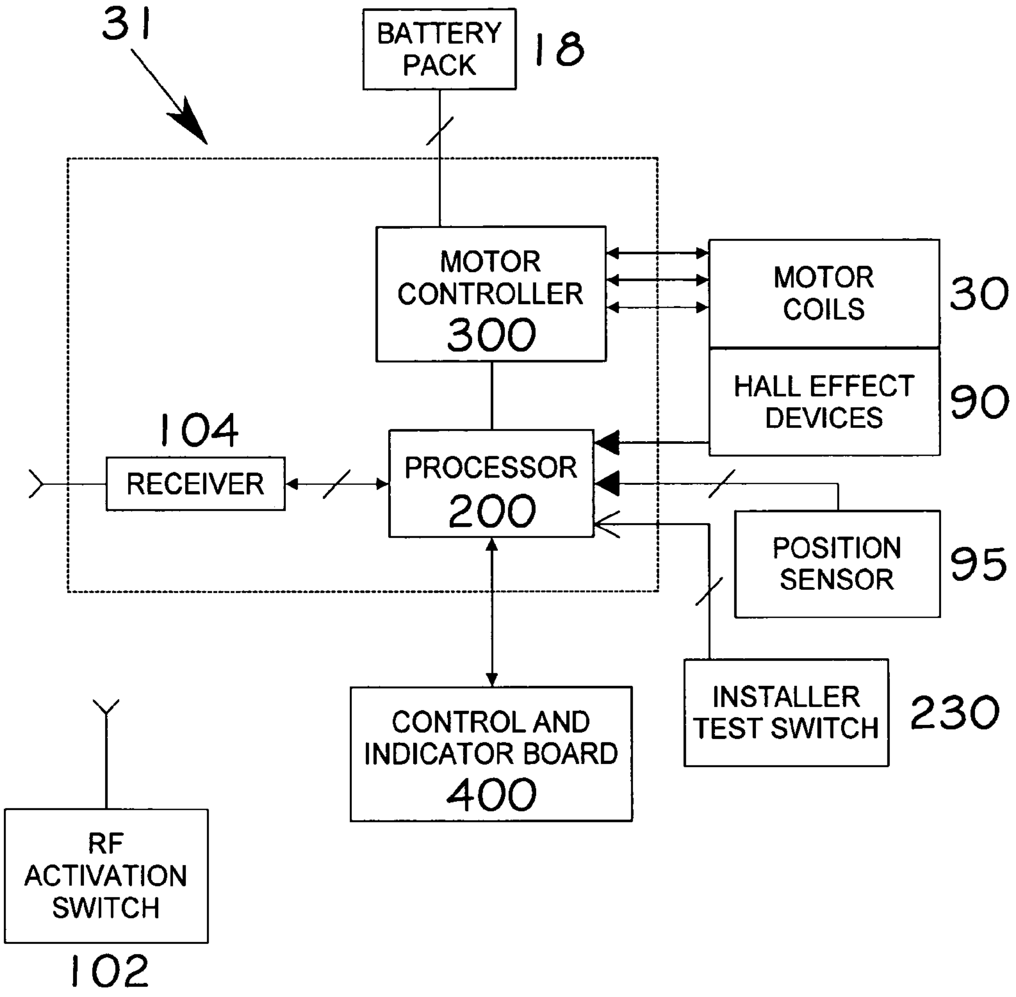
FIG. 20 is a block diagram of the door operator assembly according to the present invention.

Refer now to FIG. 20 wherein is shown a block diagram of the electronic controls of the present invention are shown at 100.

The invention as shown in the block in FIG. 20 includes a remote RF activation switch that communicates via RF signals with its associated receiver 104 located on controller 31.

A user depresses a push button switch on remote RF activation switch 102 to initiate an automatic opening sequence for a door 2. In this mode, motor 18 powers opening of door 2. An installer can also initiate an automatic start sequence by operating a temporary test switch connected to controller 31.

In addition to receiver 104, controller 31 includes; motor controller 300, processor 200 and control and indicator panel 400. Motor controller 300 includes power switches to control motor 30.

Also shown in FIG. 20 coil windings of motor 30 are connected to motor controller 300 and hall effect device of motor 30 connected to processor 200. Also shown in FIG. 20 is position feedback potentiometer 88 which is also connected to processor 200. Potentiometer 88 is preferable a single turn, 10 kohm potentiometer having a mechanical and electrical operating angular operating range of approximately 320 degrees and a life of 10 million cycles.

Figure 23:
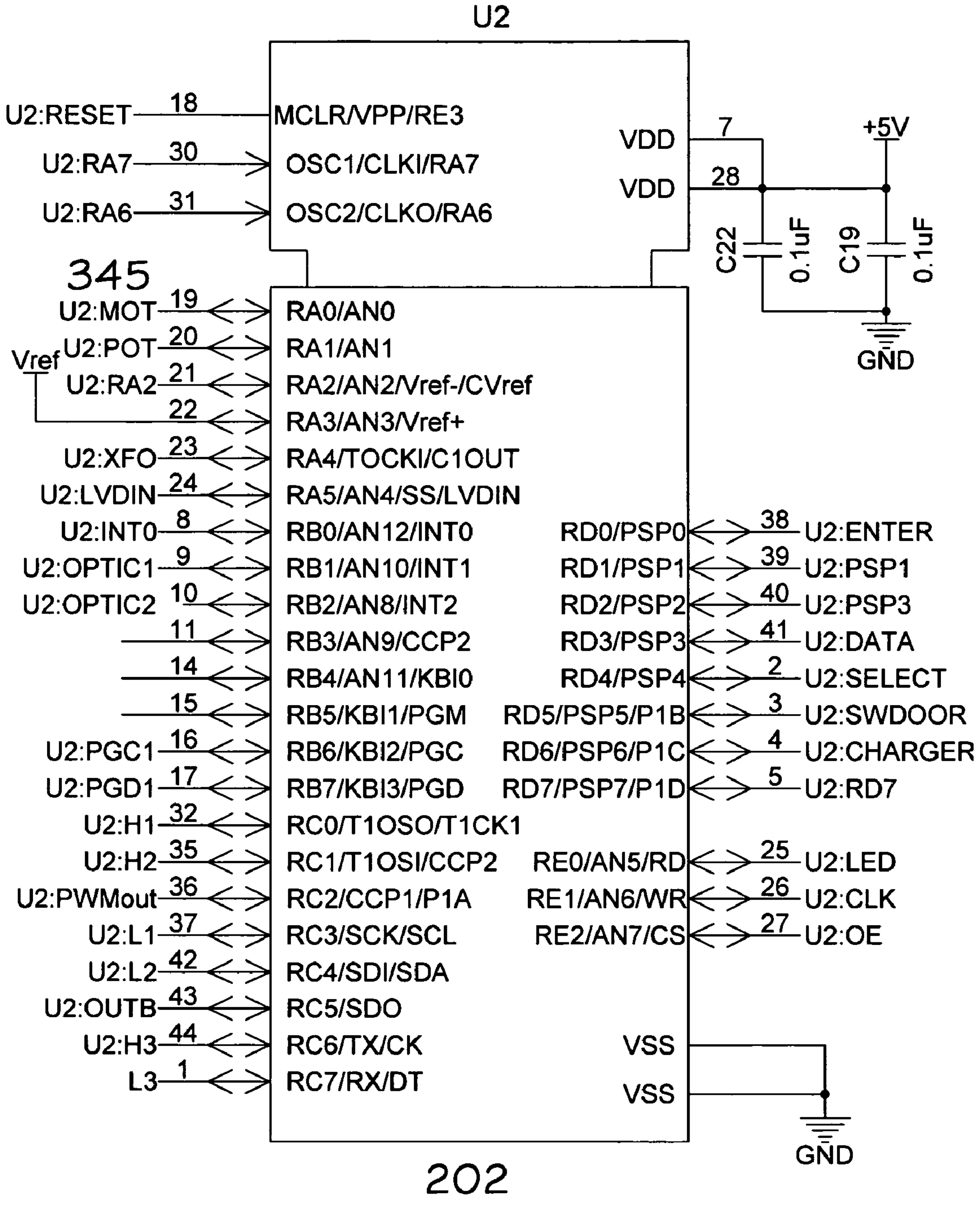

Motor controller 300, also shown in FIGS. 26-29, includes a motor power driver comprising mosfets 305 through 310 which are in a bridge configuration and are under control of microprocessor 202 of FIG. 23. Mosfets 306, 308 and 310 are preferable P channel devices while Mosfets 305, 307 and 309 are N-Channel devices.

When in a motor mode, Mosfets 305 through 310 drive the phase windings of motor 30 and when in a generating mode act to both control motor speed and charge battery pack 18 through channel diodes in the P channel devices (Mosfets 306, 308 and 310).

Processor board 200 includes micro 202 which is preferably a PIC 17F44420. Micro 202 control and monitors all aspects of the operation of the present invention including: overall door speed and position control, regeneration control, motor 30 position monitoring and speed through use of hall effect devices 90 mounted in motor 30, manage installer setup, calculate door moment of inertia in an AUTO TUNE mode as well as other control and monitoring aspects as discussed herein.

Micro 202 includes RAM for storing temporary variables, EEprom for non volatile memory of data that can be changed at door installation or adjustment but must also be remembered if all power was lost. Importantly the micro includes a sleep function that is used to minimize battery power drain when door 2 is not in operation Processor board 200 receives installation related information from control and indicator 400 shown in FIG. 23 which contains switches, a potentiometer for entering data and LED indicators to give the installer status information.

Processor board 200 also includes controls to implement a hardware sleep function to conserve power. To reduce power drain on battery pack 18, a number of devices and circuits, and in fact micro 202 itself, are put into a sleep mode after a door 2 operated by the present invention has not moved for about 0.5 seconds. Circuits that are put to sleep include the motor drivers comprising mosfets 305 through 310 on FIGS. 26-28, Hall Effect sensors 90, a switched inverter 250 in FIG. 25 for converting the variable battery voltage to a fixed voltage for voltage critical circuits and RF receiver. Mosfets 305 through 310 are prevented from drawing current by breaking a ground return path at mosfet 201. Likewise switched inverter 250 is turned off through the operation of mosfet 203 and Hall Effect devices 90 are prevented from drawing current by the action of mosfet 202.

Figure 21:
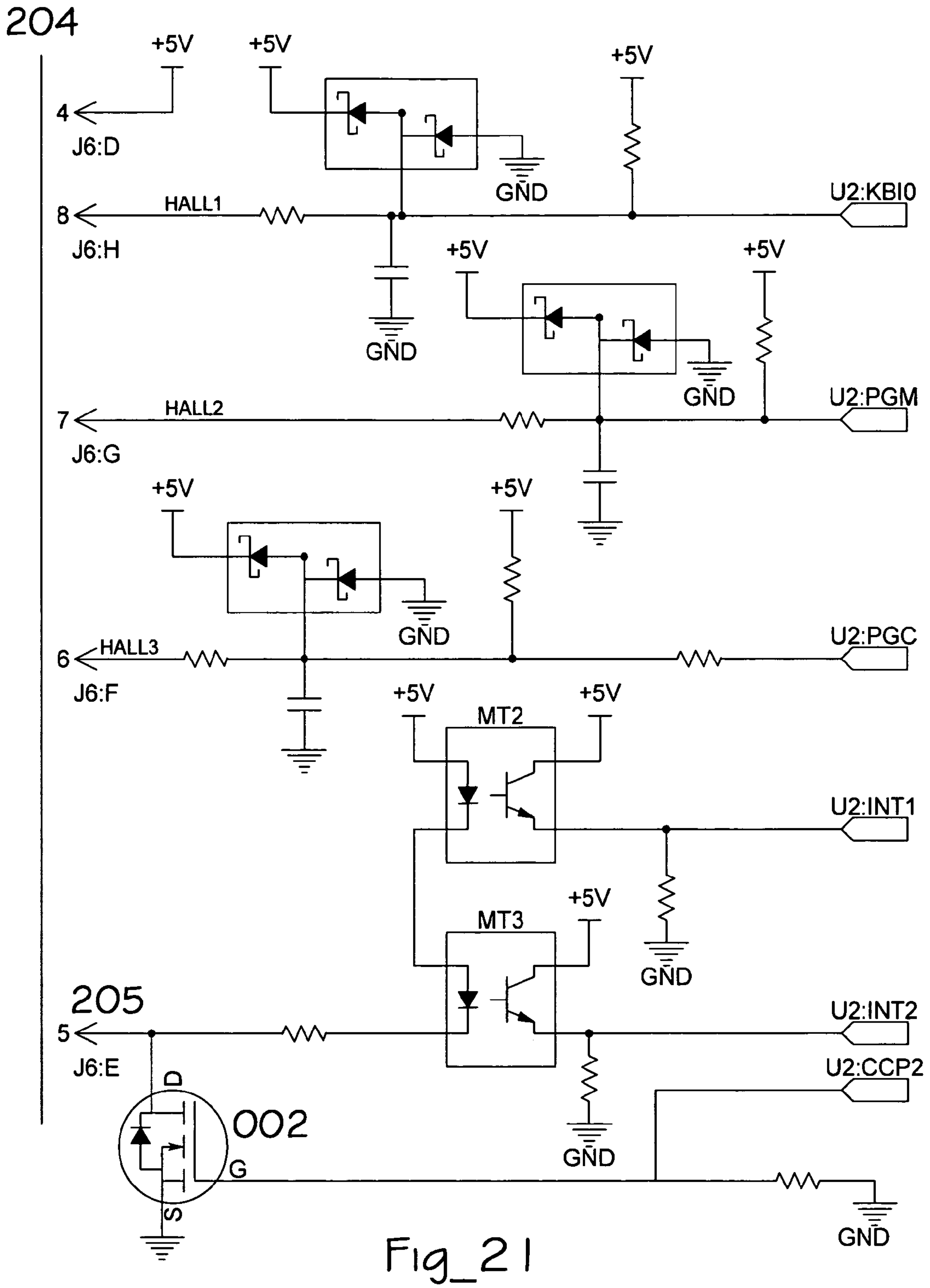
FIGS. 21-29 are schematics of the door operator controls according to the present invention.
Figure 24:
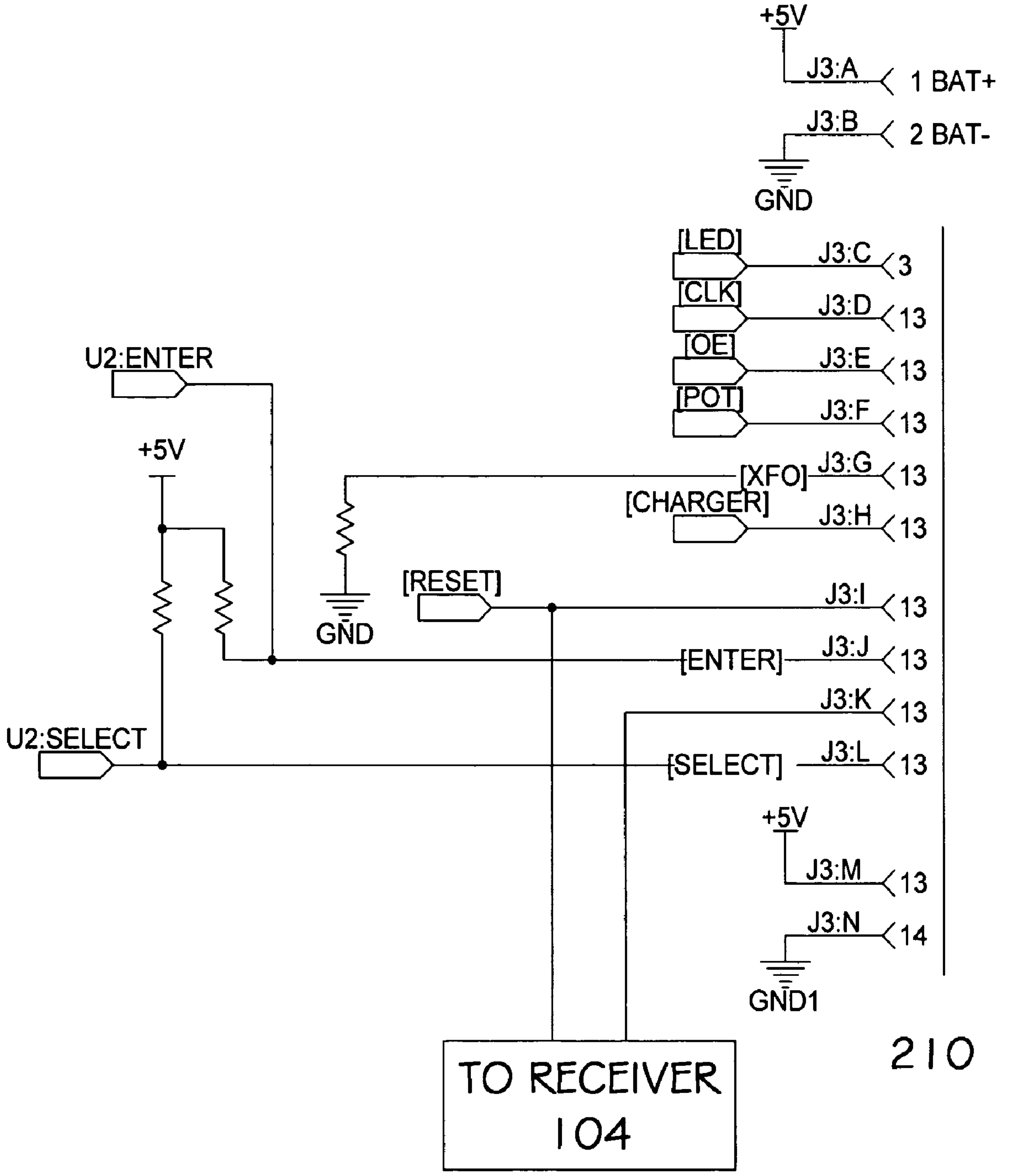

Referring to FIG. 21, signals from Hall effect devices 90 are received at 204, while signals to and from door and indicator board 400 and controller 200 pass through connections at 210 shown in FIG. 24. Position sensing potentiometer 95 is connected to controller 200 at 207 shown in FIG. 22.

Processor board 200 also contributes to protecting battery pack 18 from excess voltage during charge. In this regard programming in micro 202, shown in FIG. 23, monitors battery voltage and prevents automatic operation of the door when the voltage falls to 20 VDC. The invention can still operate in the manual mode only until battery pack 18 voltage reaches 22VDC. Automatic operation is limited to prevent repeated automatic powered opening cycles from draining the battery to a point that might cause damage to battery pack 18.

Figure 29:
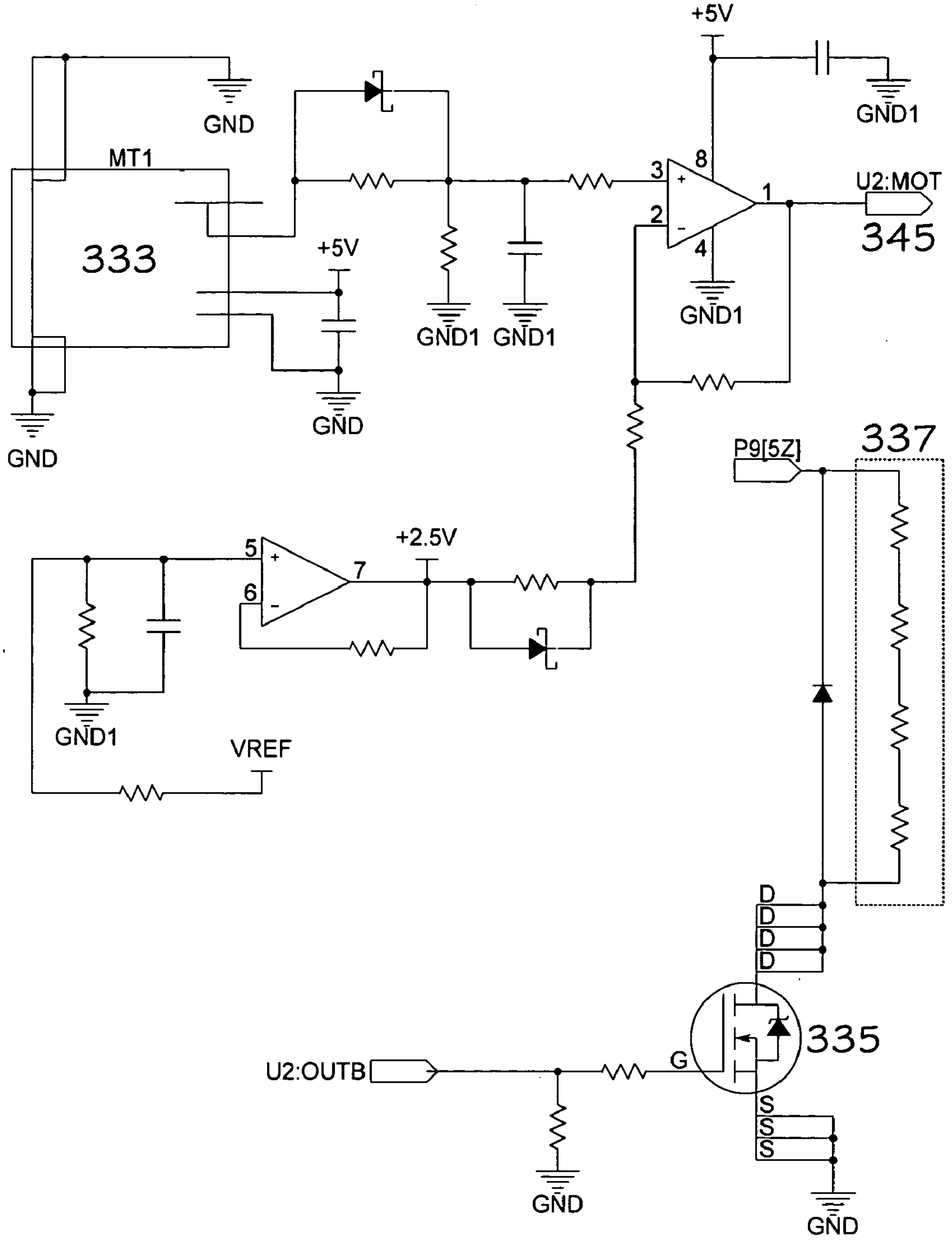
Figure 34:
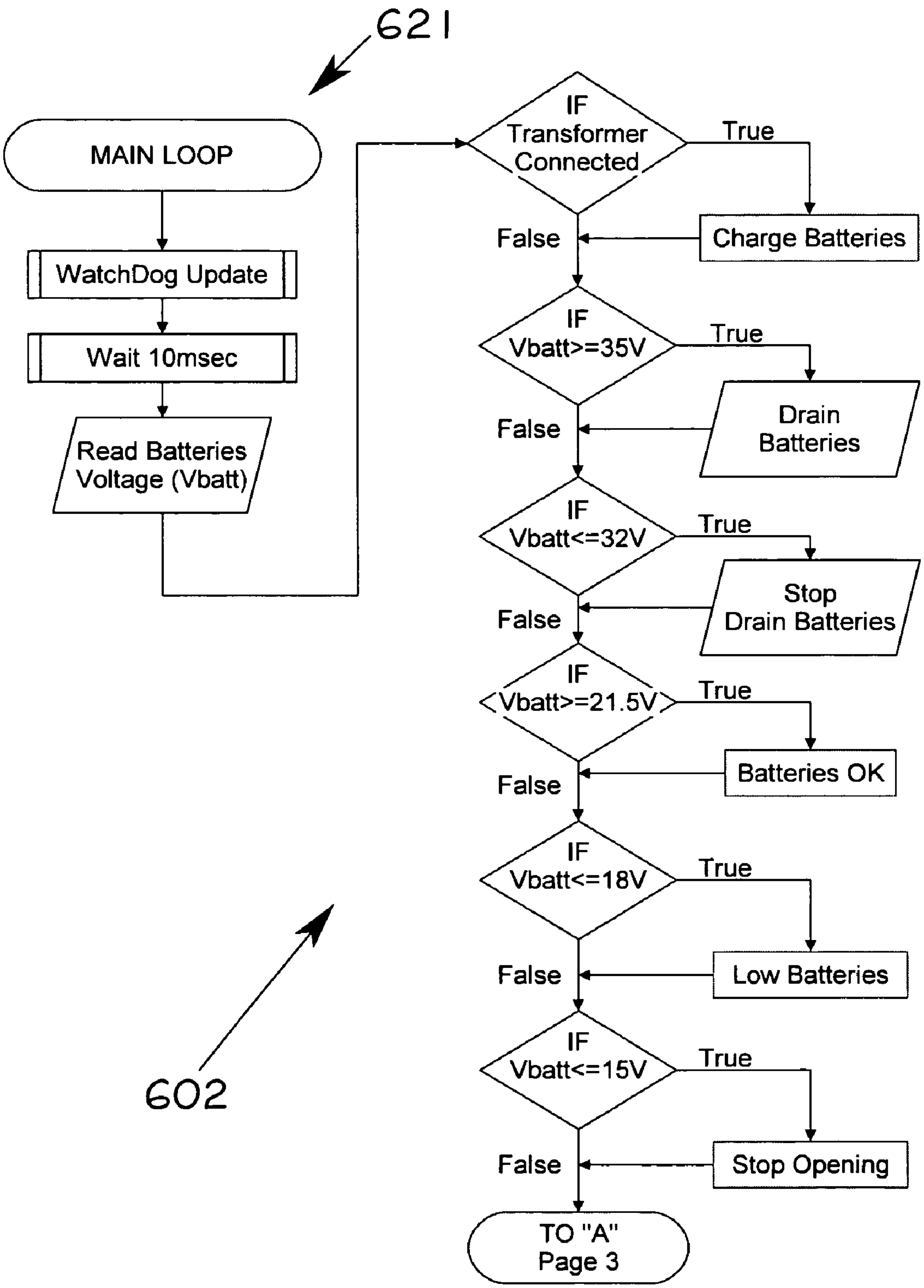
Figure 35:
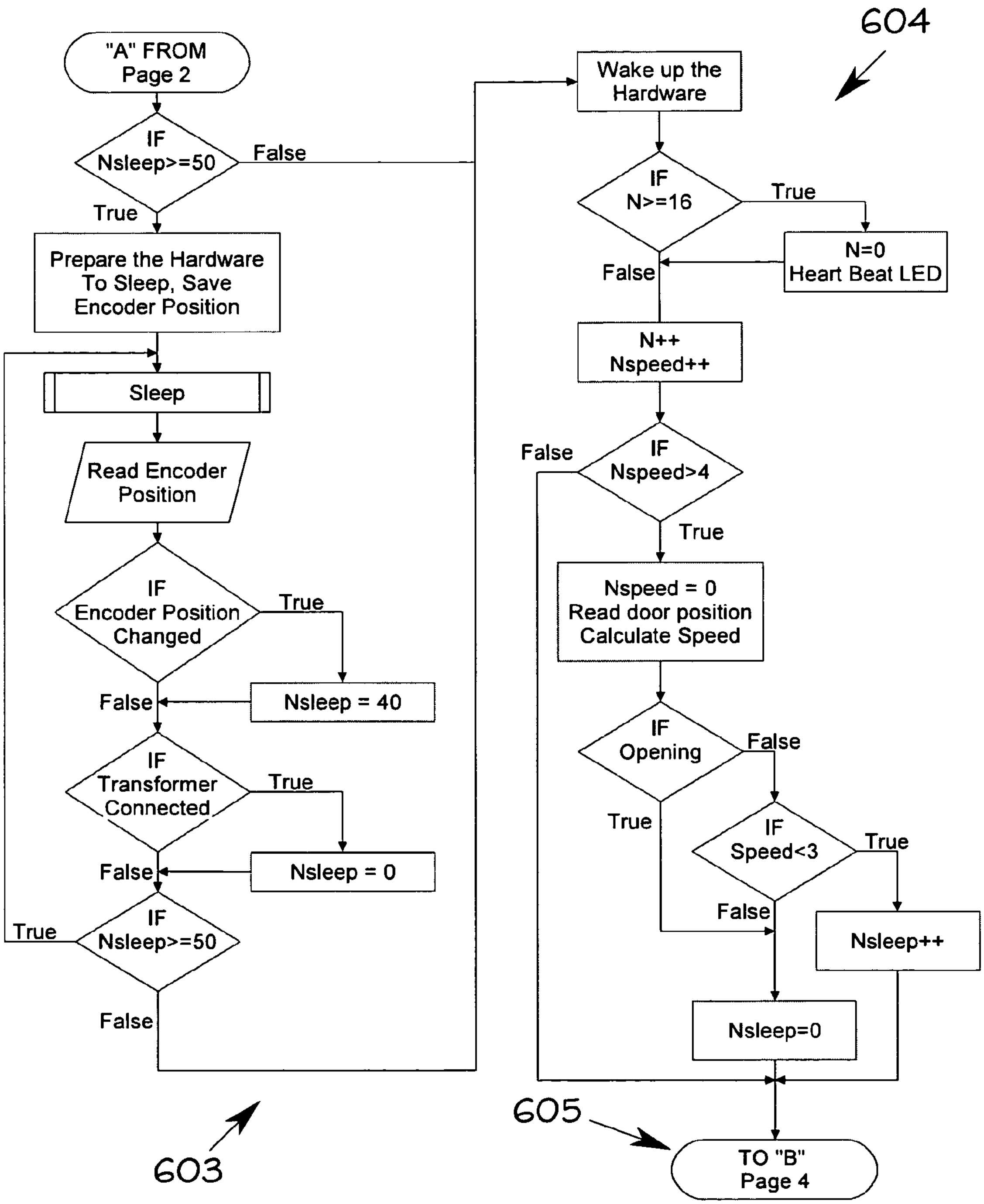
Figure 36:
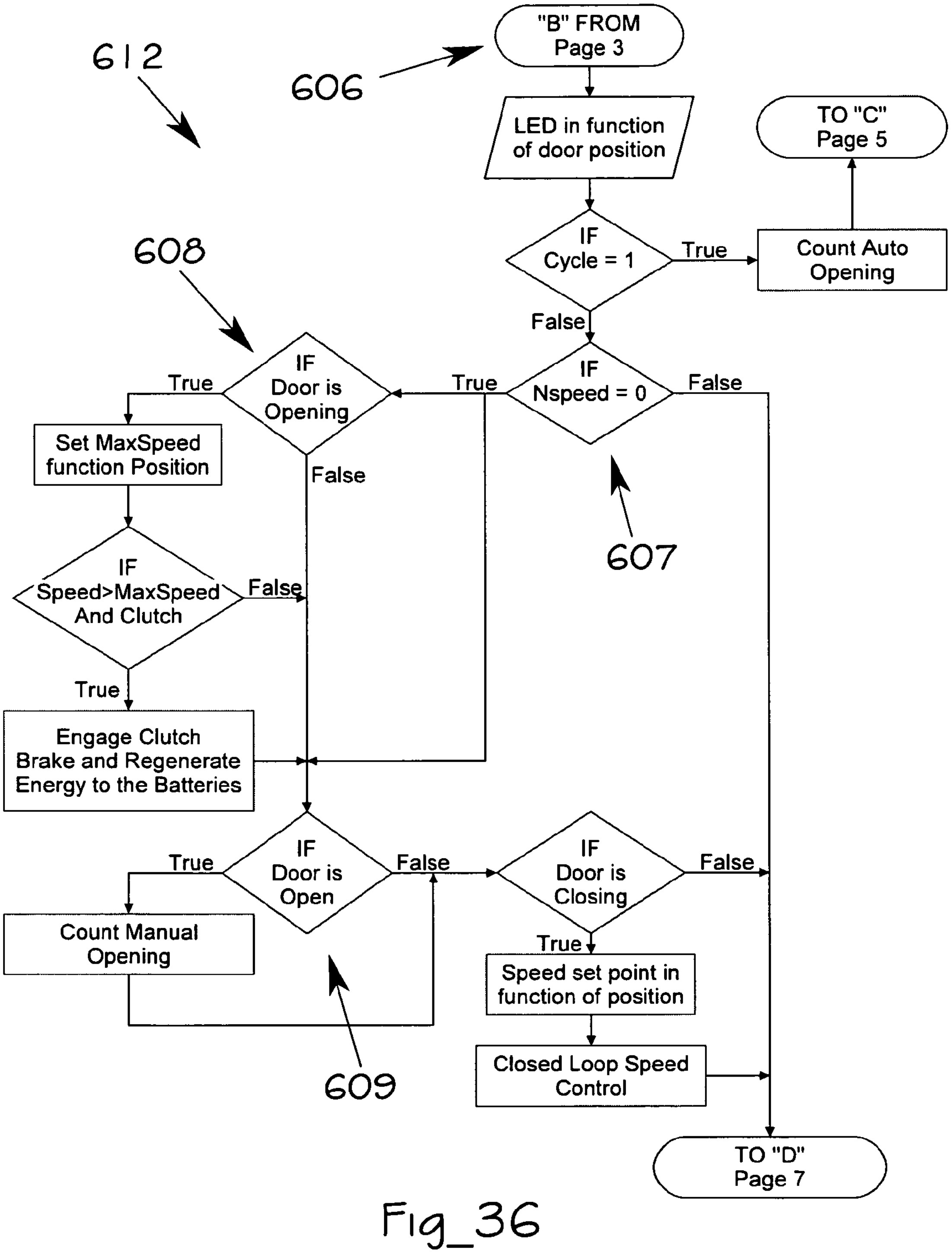
Figure 37:
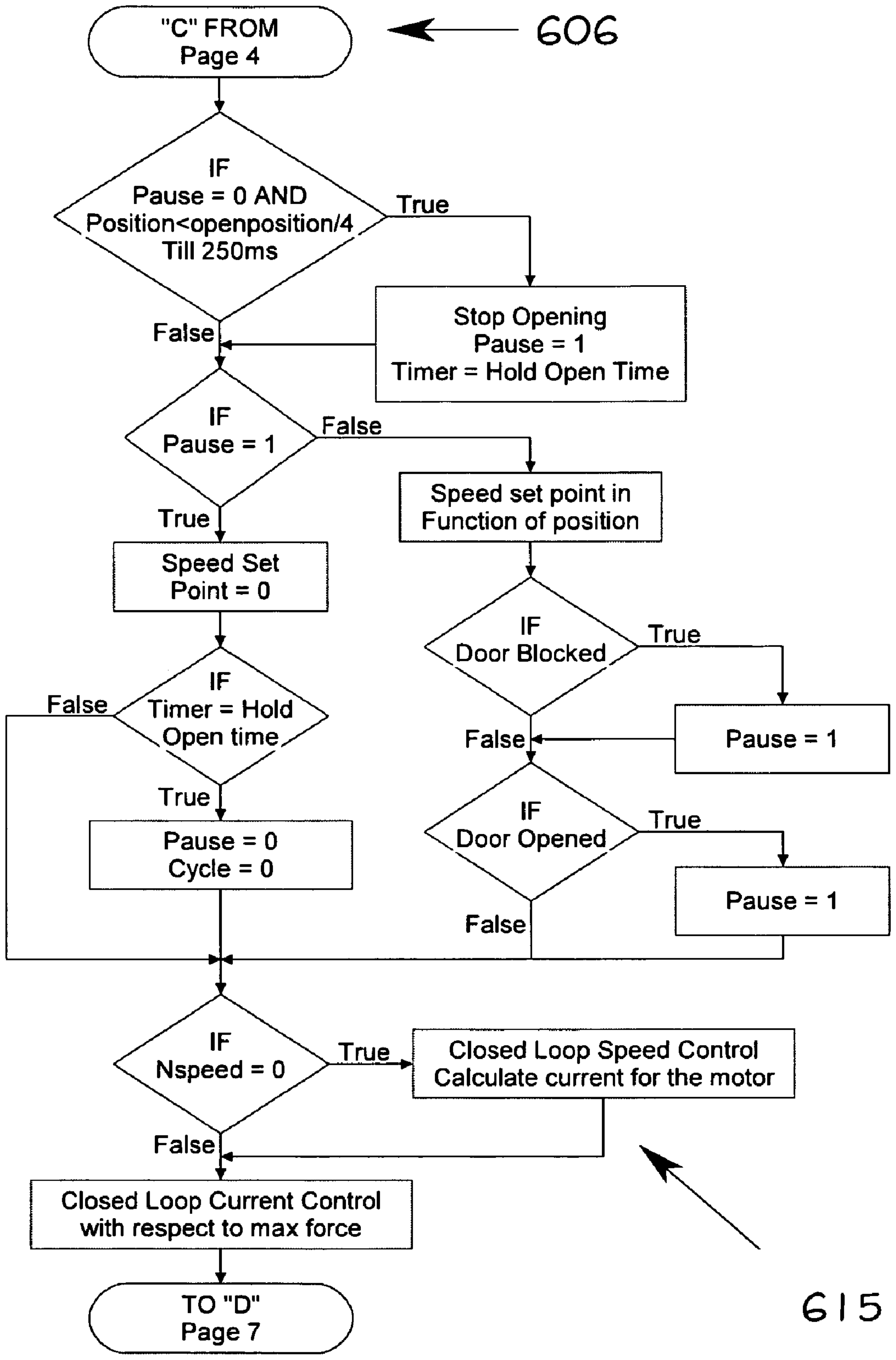
Figure 38:
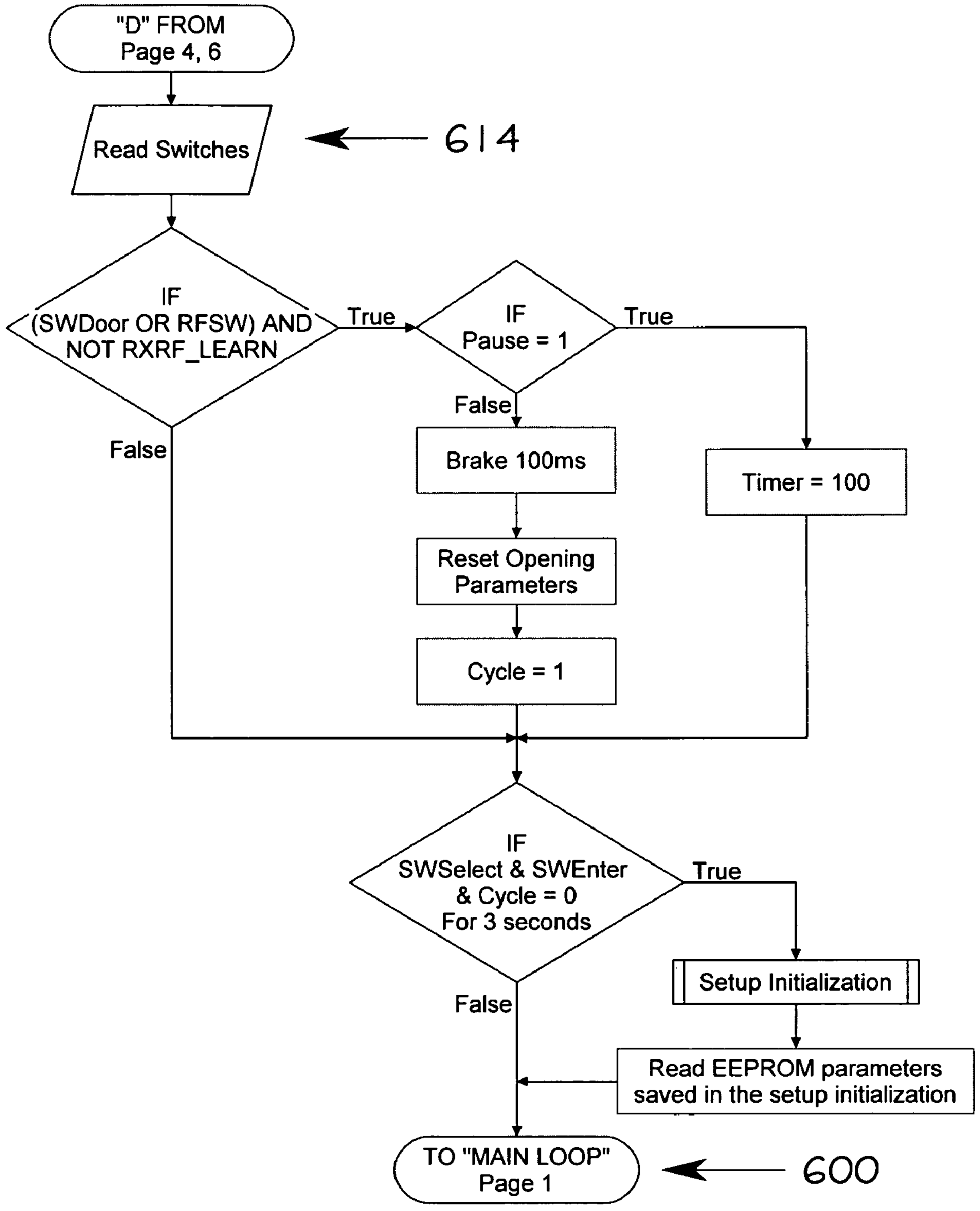
Figure 39:
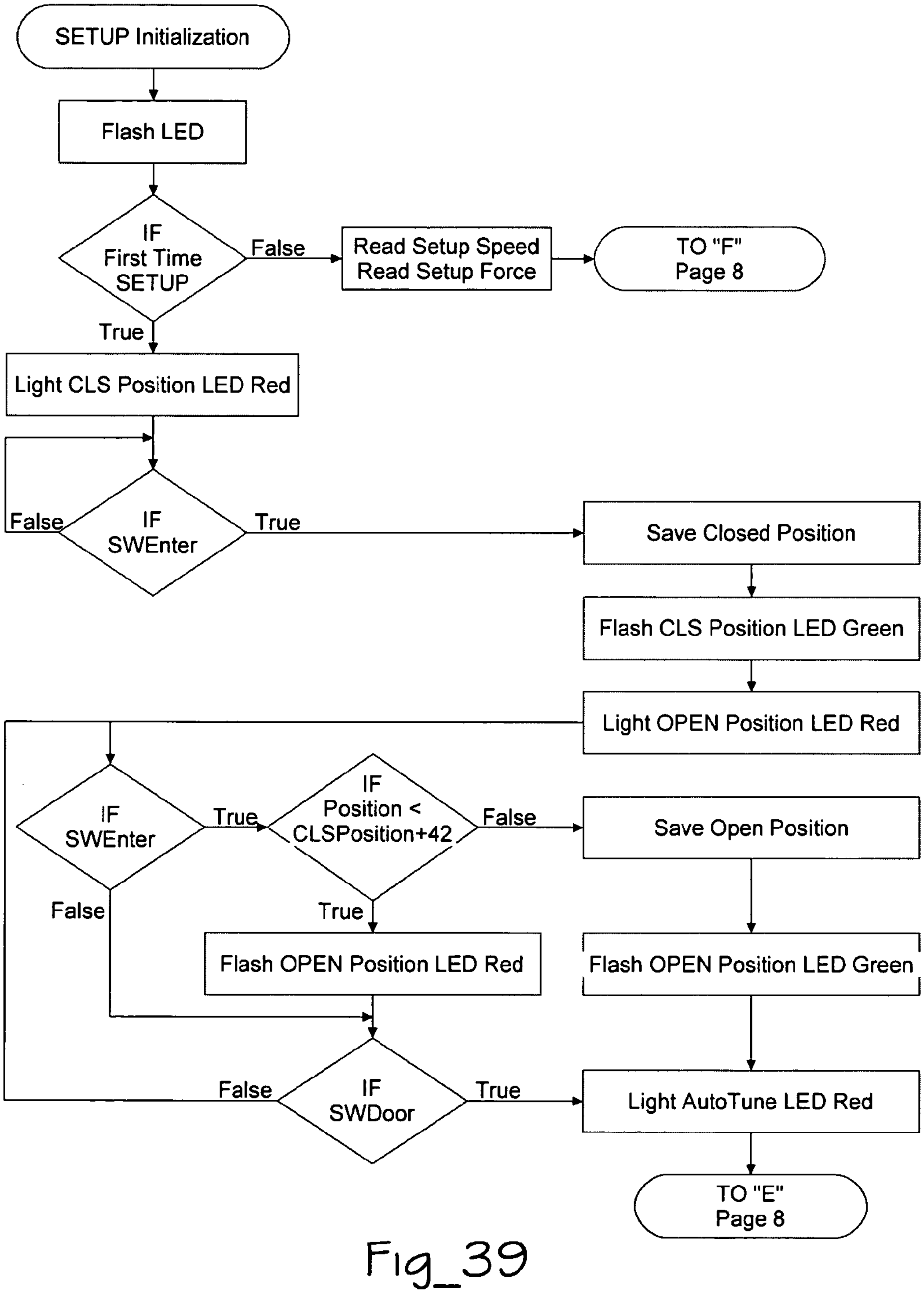
Figure 40:
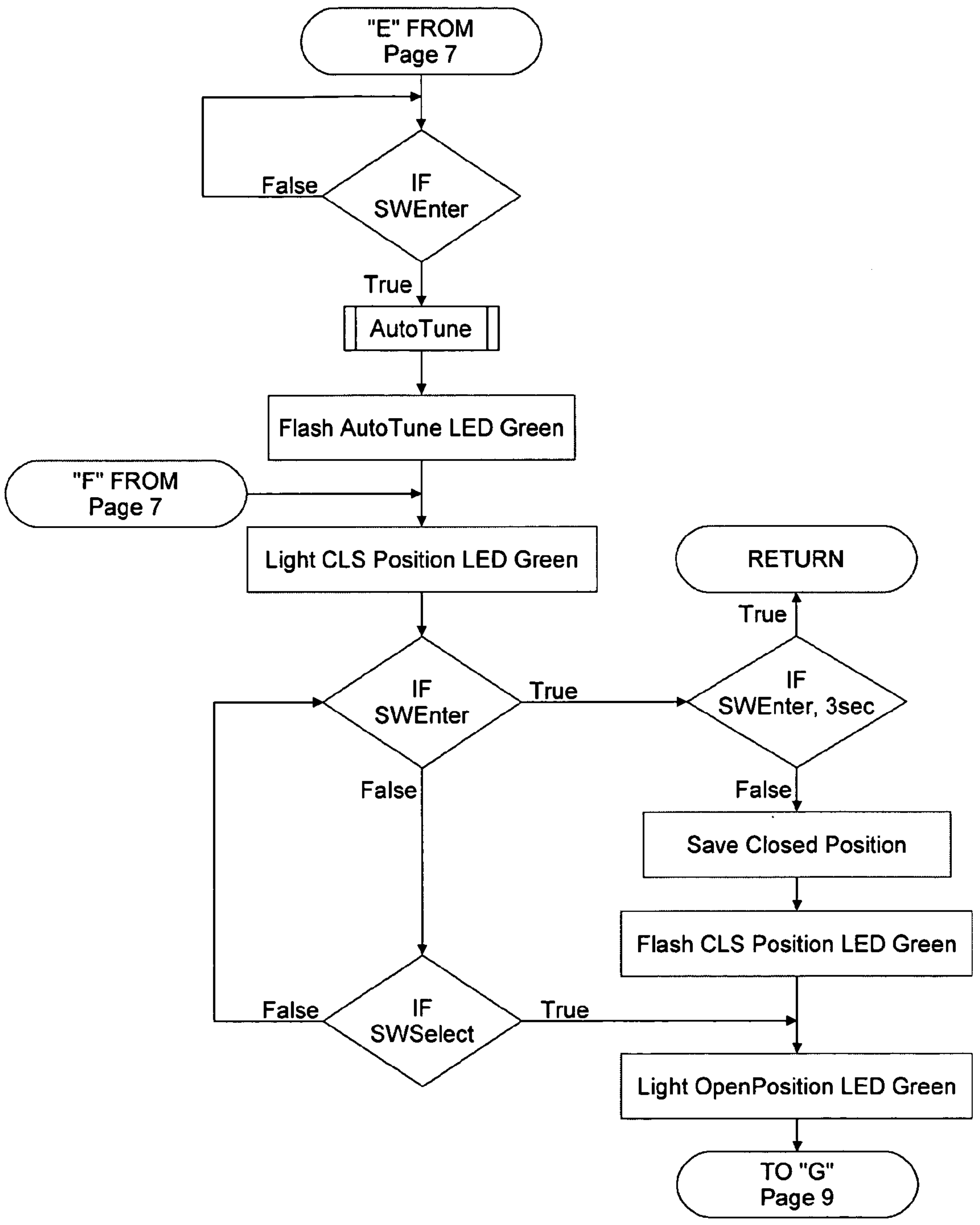
Figure 41:
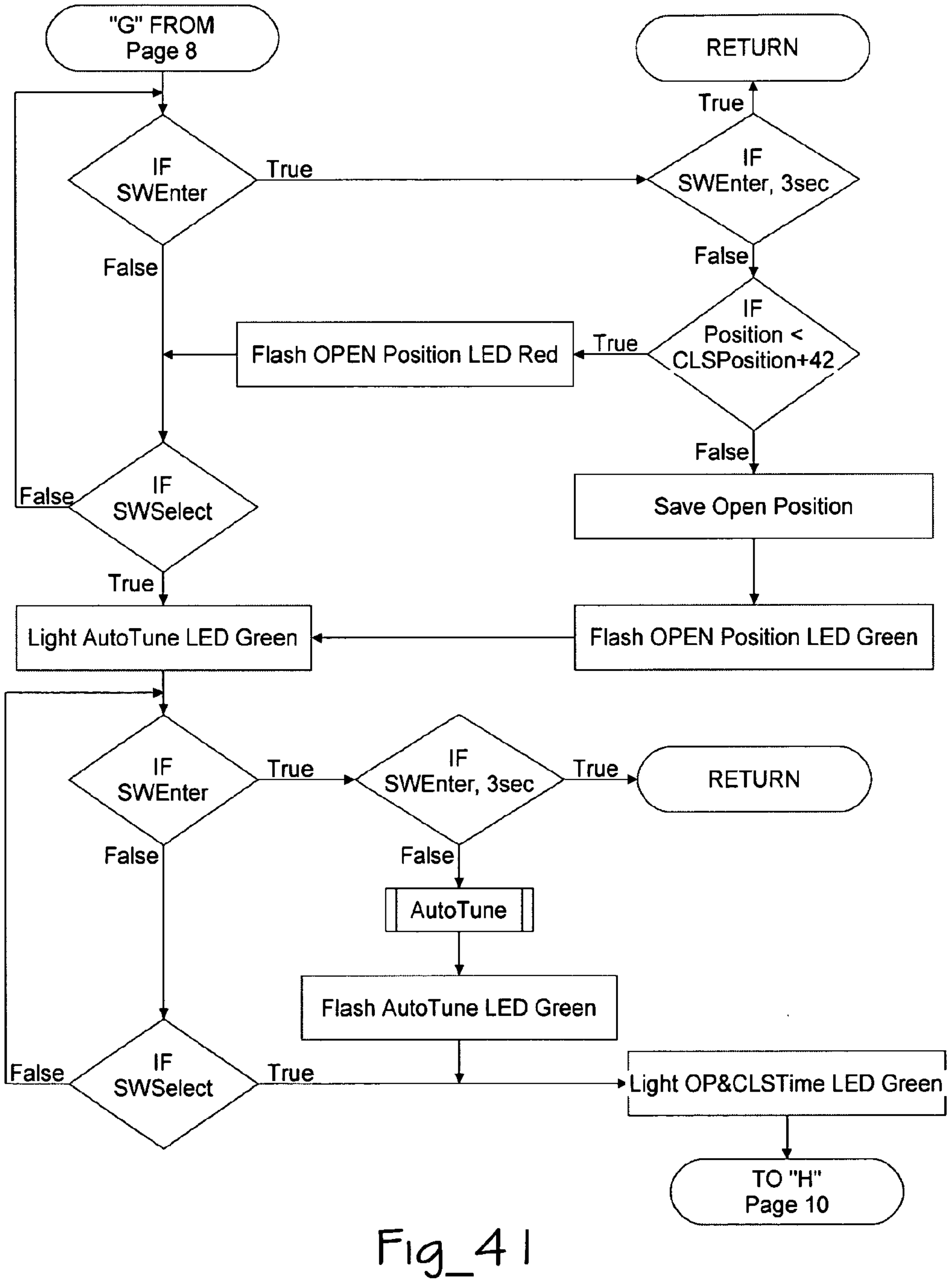
Figure 42:
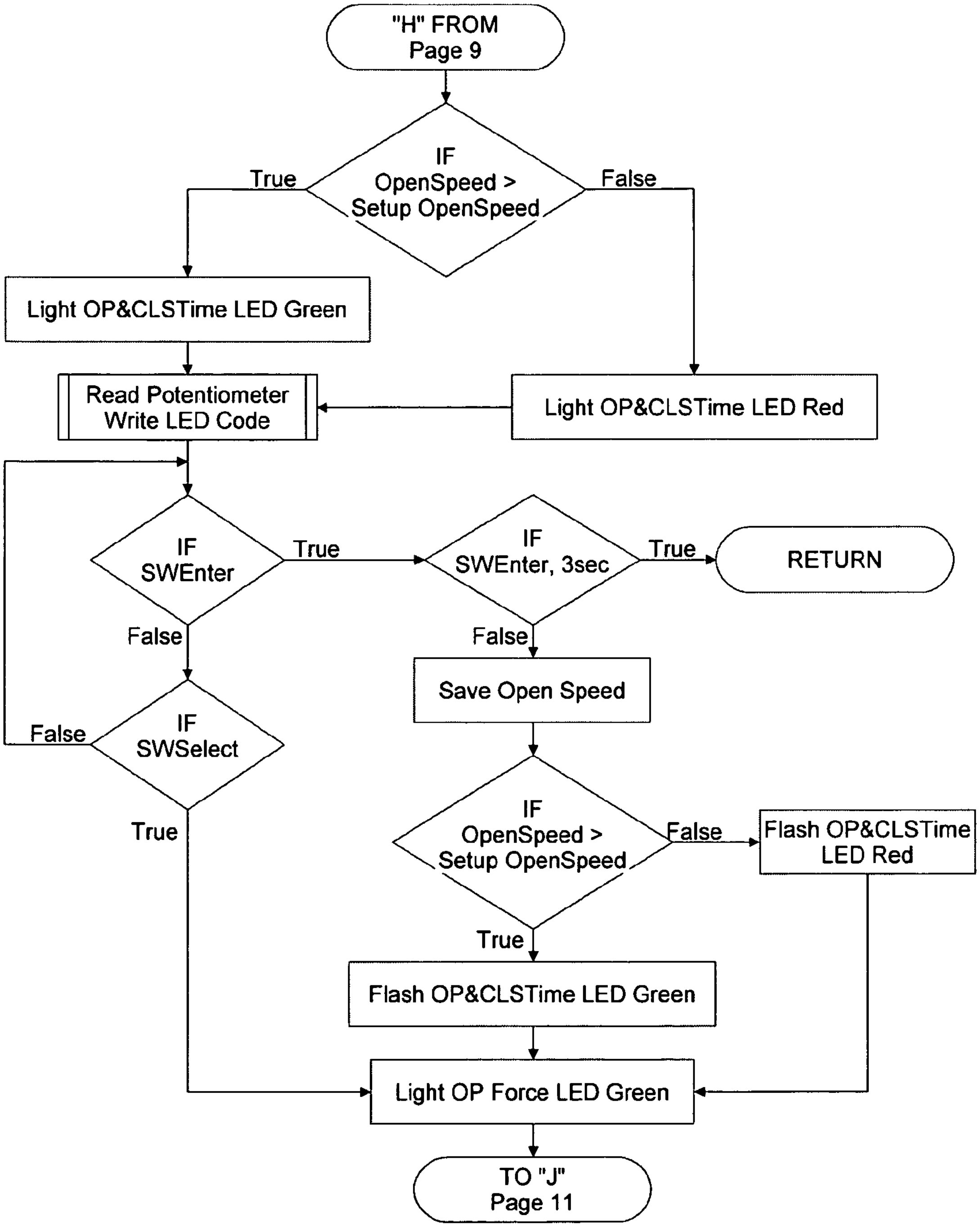
Figure 43:
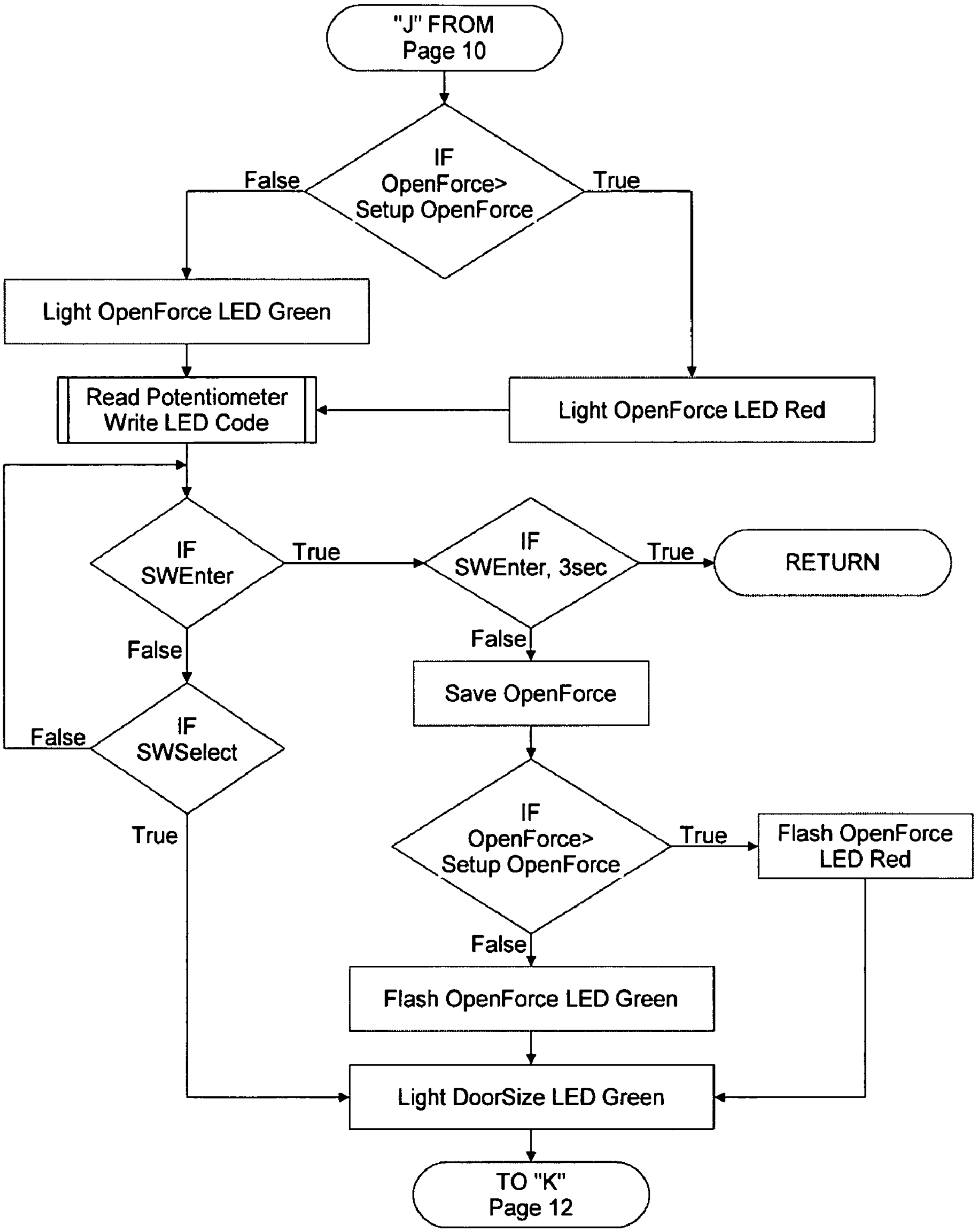
Figure 44:
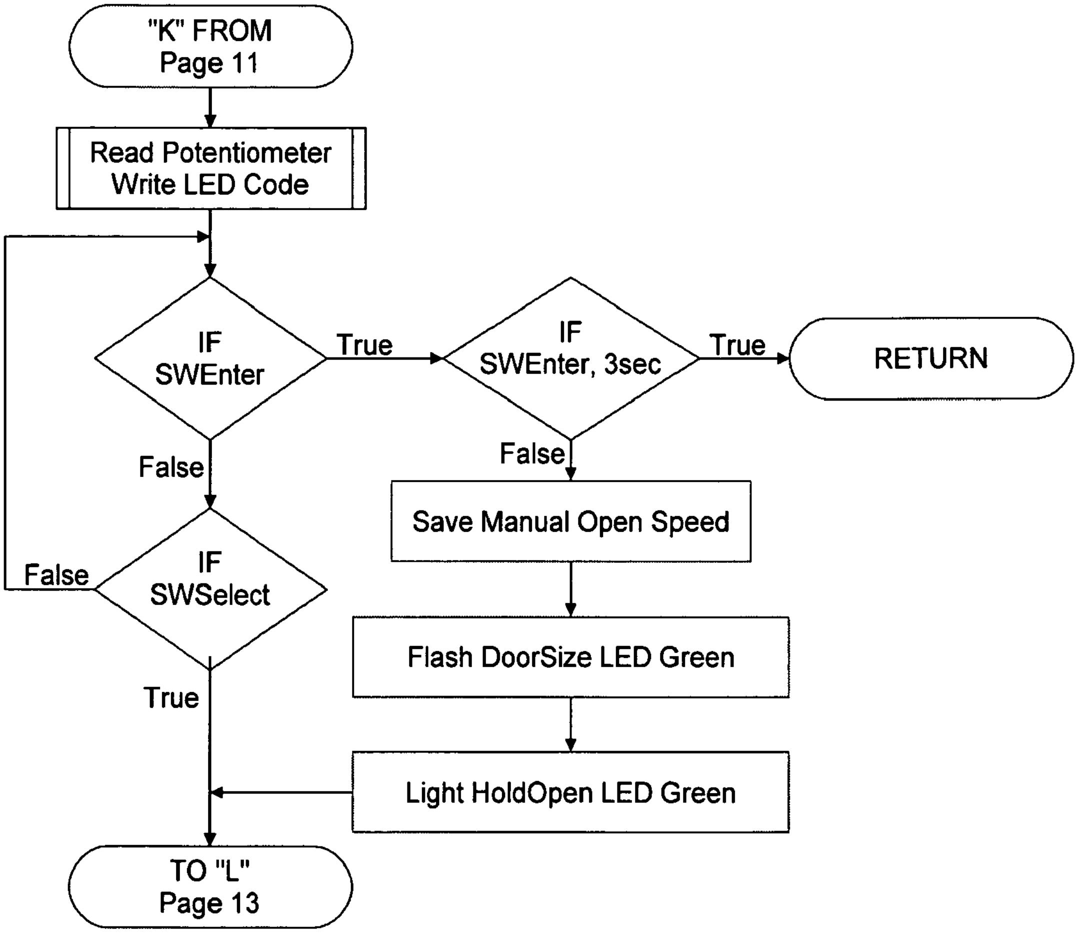
Figure 45:
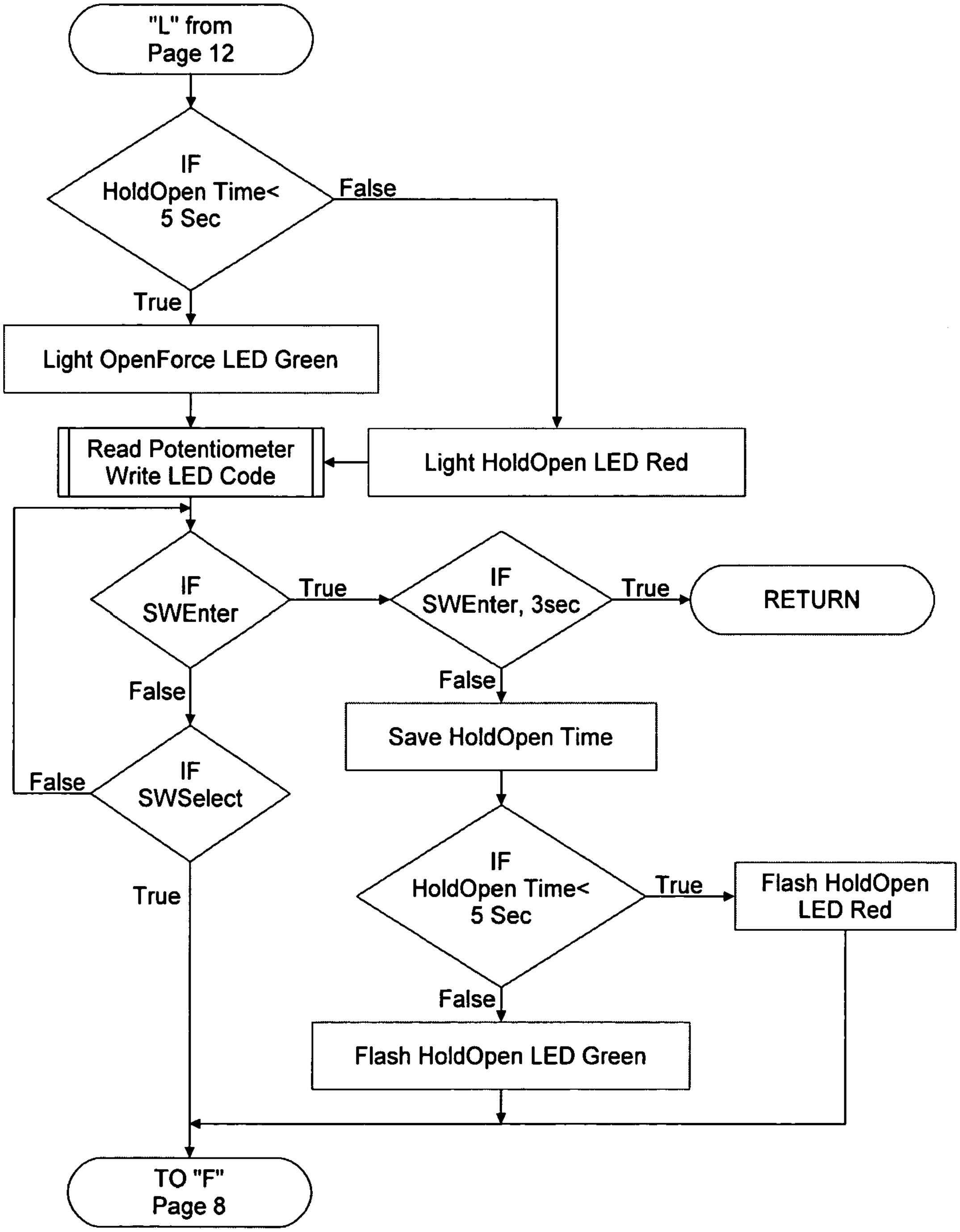

Like wise battery voltage check logic is described further at 602 of FIG. 34. Mosfet 335 on FIG. 29 is turned on in response to a command from micro 202 to load battery pack 18 and hence drain battery pack 18 and lower the stored charge when its voltage is high.

Referring now to FIGS. 26-29 for a more detailed discussion of the operation of power control 300.

Motor drive and regenerative braking are accomplished through control of high side mosfets 306, 308 and 310 and low side mosfets 305, 307 and 309 using logic signals generated in microprocessor 202. These logic signals include a PWM signal input to motor controller 300 at 338, high side mosfet control signals 313, 316 and 319 and low side mosfet control signals 339, 340 and 341. In the preferred embodiment, high side control signals at 313, 316 and 319 and low side control signals 339, 340 and 341 utilize conventional brushless DC motor control waveforms as known to those skilled in the art. While low side control signals 339, 340 and 341 are the same in motor drive or regeneration modes, high side mosfet signals are convention high side signals during motor drive but are low to hold OFF high side mosfets during braking and battery charging.

Control signals 339, 340 and 341 are modified by PWM signal 338 at AND gates 330, 331 and 332 to achieved PWM control of motor 30. The outputs of AND gates 330, 331 and 332 are level shifted and buffered by drivers 312, 315 and 318. In this manner the high side mosfets switch in a normal manner while driving motor 30 while PWM control is achieved with low side switching alone. The preferred switching rate of the PWM is approximately 20 kHZ.

PWM signal 338 controls the ON and OFF times (duty cycle) of the low side mosfets needed to achieve desired or limiting currents for motor 30 on door open, door block and braking current. Braking forces on door closing are achieved through braking torques on the rotor of motor 30 as battery pack 18 is charged and are adjusted by a PWM percentage.

During braking the low side of mosfets 305, 307 and 319 are brought to ground in the normal manner and sequence using control signals 339, 340 and 341. Braking torques due to charging battery 18 are developed because charging currents pass through body diodes of high side mosfets 306, 308 and 310. This path through the body diodes of the high side mosfets 306, 308 and 310 exist because, as noted above, the high side mosfets are held OFF by high side control signals 313, 316 and 319 throughout the period where door closing speed is limited by charging battery pack 18.

When the duty cycle is 100% anytime the voltage out of the motor (as a generator) exceeds the voltage at battery pack 18 *a* current can flow. Of course the average value of the charging current is a function of how often the battery pack 18 is allowed to charge and this is controlled by the duty cycle of the PWM signal at 338. For example If the duty cycle is 0% then none of the low side mosfets can be turned on and no charging current, and hence breaking current, can be developed. The charging current is prevented because with a 0% duty cycle there is no return path through which a charging current can flow.

For PWM % between 0 and 100% the charging current and hence braking torques can be developed in proportion to the PWM %.

For the safety of battery pack 18 *a* charge controller is included in battery pack 18 to prevent excess charging currents during braking or charging from a wall charger. Neither the Charge controller or wall adapter are shown.

Figure 22:
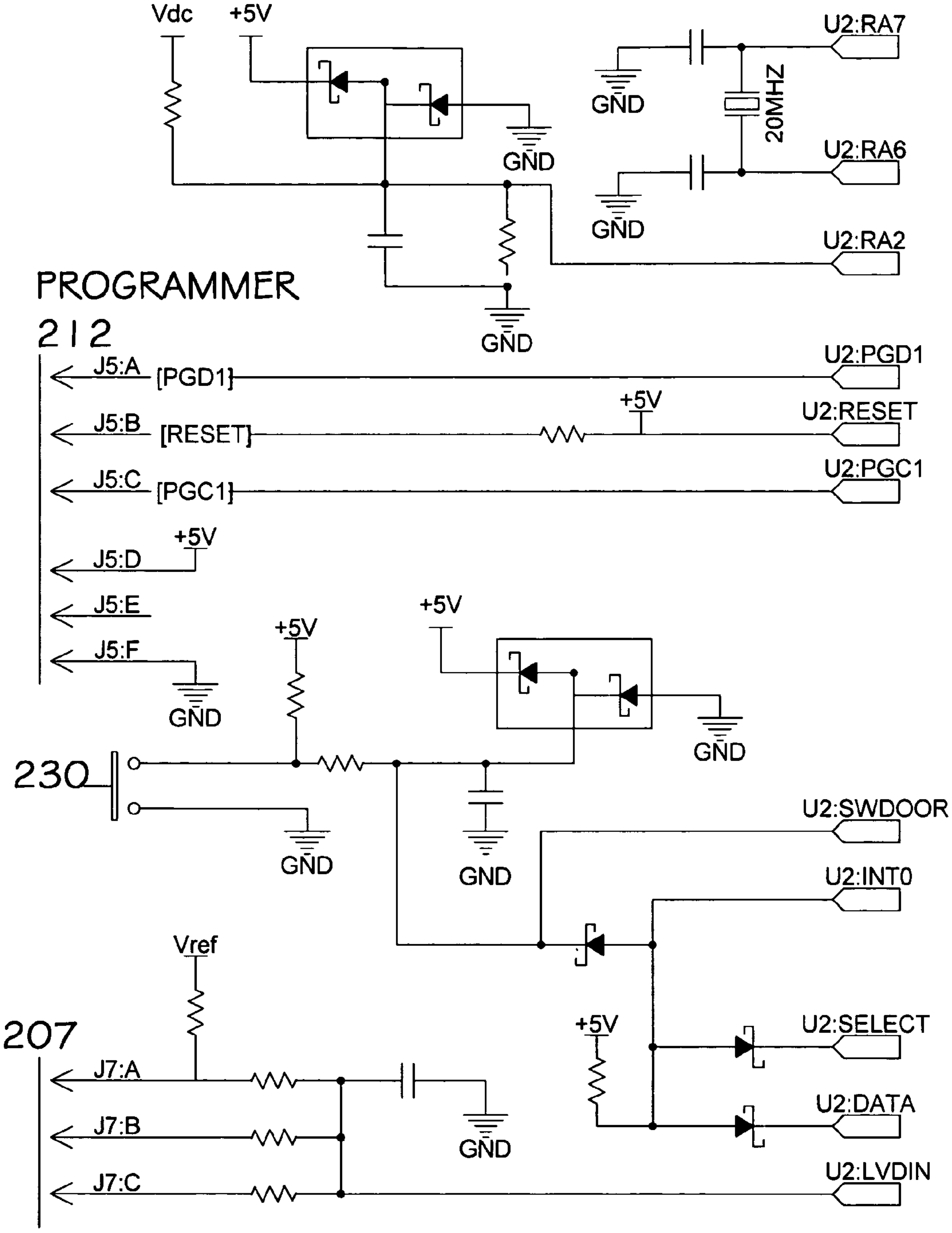

Motor controller 300 also includes mosfet 335 and associated resistors 337 which, under control of micro 202, acts to dissipate power and control door closing speed when fuse 346 of FIG. 22 is open or when battery pack 18 is removed. Mosfet 335 is also turned on by micro 202 to drain battery pack 18 when battery pack 18 voltage increases above a preselected maximum voltage which in the preferred embodiment is 35 volts.

Also included on motor controller 300 is current monitor 333 which is used in a feedback loop with micro 202 and mosfets 305 through 310 to limit current and hence the force applied to door 2 if it was blocked. In an alternate embodiment and for improved accuracy, both a current calculation based on motor 18 voltage divided by motor 18 rotor resistance and current monitor 333 are used to determine motor current. It has been found that for low PWM duty cycles accuracy of current measurement is achieved by the rotor current calculation while at higher PWM percentages current sensor 333 gives preferred results.

A logic flow diagram for a preferred software program that controls the present invention will now be described with the aid of FIGS. 25-32. The software program is stored in the ROM of micro 202.

Figure 25:
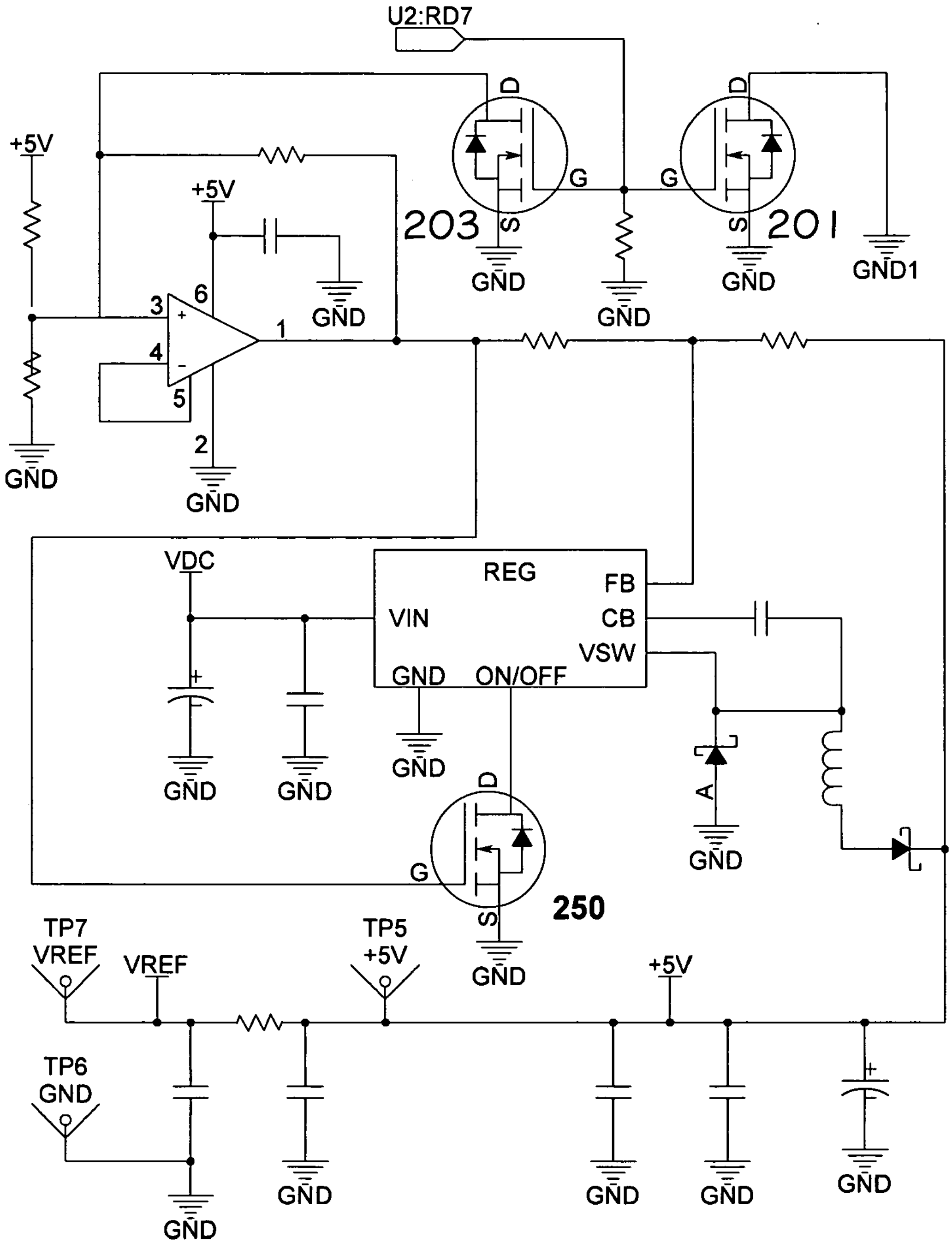
Figure 26:
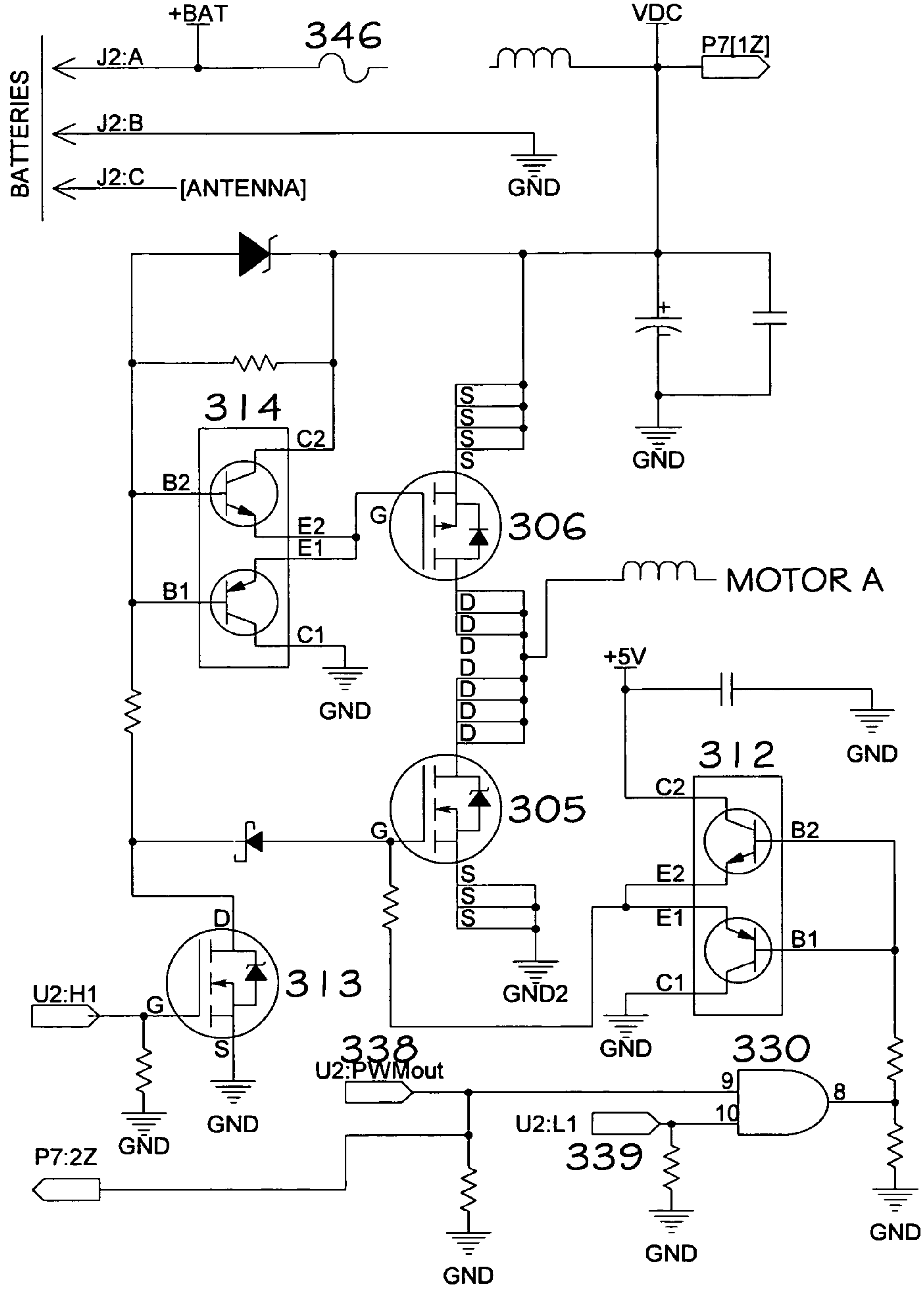
Figure 27:
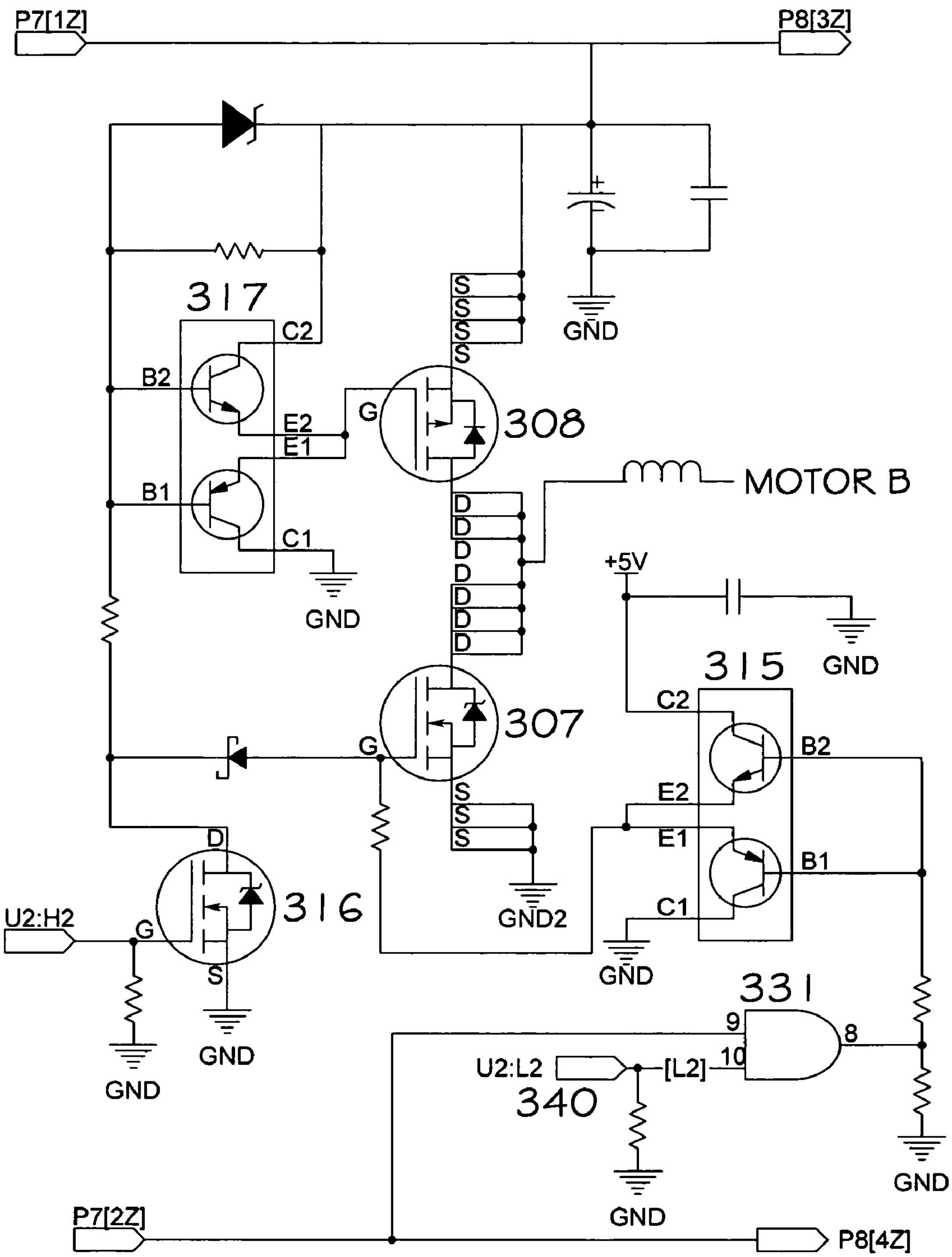
Figure 28:
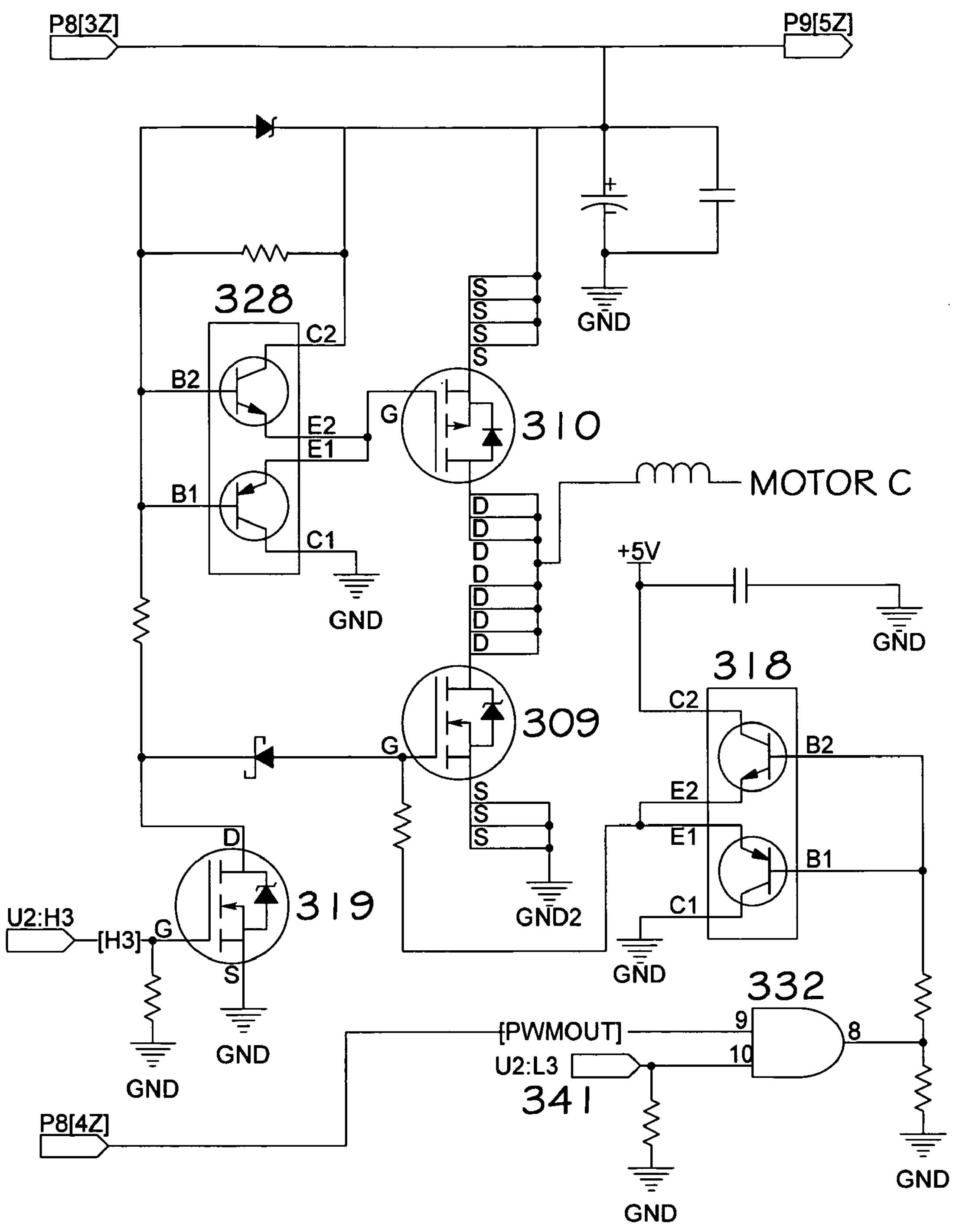

FIG. 25 gives the meaning of logic blocks used in the logic flow diagrams, while notes applicable to FIGS. 25-32 include:

"Nsleep>=50" means that door has not been moved for a fixed interval which in the preferred embodiment is 500 milliseconds.

Nspeed varies from 0 to 4, When Nspeed=0, the speed control loop compares actual speed to a desired speed and adjust motor 30 drive current accordingly. Otherwise adjustment of motor currents to control door speed is skipped.

Nsleep=0 indicates that the invention is not sleeping. Nsleep is increments at a specified time interval.

Cycle=1 indicates that the invention is in an automatic door opening mode, i.e. opening has been initiated either by remote RF activation switch 102 of FIG. 30 or portable switch used for installer test purpose.

The Watch Dog Time interrupts and wakes up microprocessor 202 every 10 milliseconds.

"SW" as part of a label indicated that it is a logic level associated with a switch parameter and in for example, SWRF (remote RF activation switch), DoorSW (manual door switch used by installer to activate door) and SWselect (which is the "Select" switch on the installer panel 400.

Variable N varies from 0 to X and is incremented every Y milliseconds.

"Set output to the motor"=Turn on bridge circuits to drive motor.

601 in the flow charts generally provides the logic associated with processes at power turn ON and include certain tests used for product factory testing.

602 in the flow charts provides the logic associated with condition testing of battery pack 18.

603 in the flow charts provides the logical steps that are preformed when the micro 202 is awakened from a sleep mode due to: time out of a watch dog timer; after being awakened by activation of a remote switch plugged into control and indicator 400; or if a remote activation switch 102 linked to controller board 31 by RF is activated.

604 in the flow charts provides the logical steps taken by micro 202 if the hardware stays awake because the door has moved. If the door has moved the hardware is awakened and door speed adjusted as needed if Nspeed=0. If Nspeed is not greater than 4 then a speed check is skipped. The logical steps that follow the processes at 604 continue from 605 to 606.

At 612 on is a test if Cycle=1. If Cycle=1 then the invention is in an automatic opening mode and certain operations relevant to a door opening process are performed at 615. If the door is not opening automatically (door is being opened manually) and the invention is configured with a roller clutch (preferred embodiment) then the "true" branch at 607 goes to a test at 609 and not to test at 608. In alternative embodiment using an electrically operated clutch, the "true" branch at 607 goes to 608. This alternative embodiment allows capture of excess kinetic energy on opening when for example a gust of wind increases door speeds dangerous levels. This safety feature is especially important for large, heavy exterior doors.

Switches at control and indicator 400 are read at 614 and if no switches other than both SELECT and ENTER are operated together for 3 seconds while the door is not in an automatic mode, program flow branches from 620 to 621.

Figure 46:
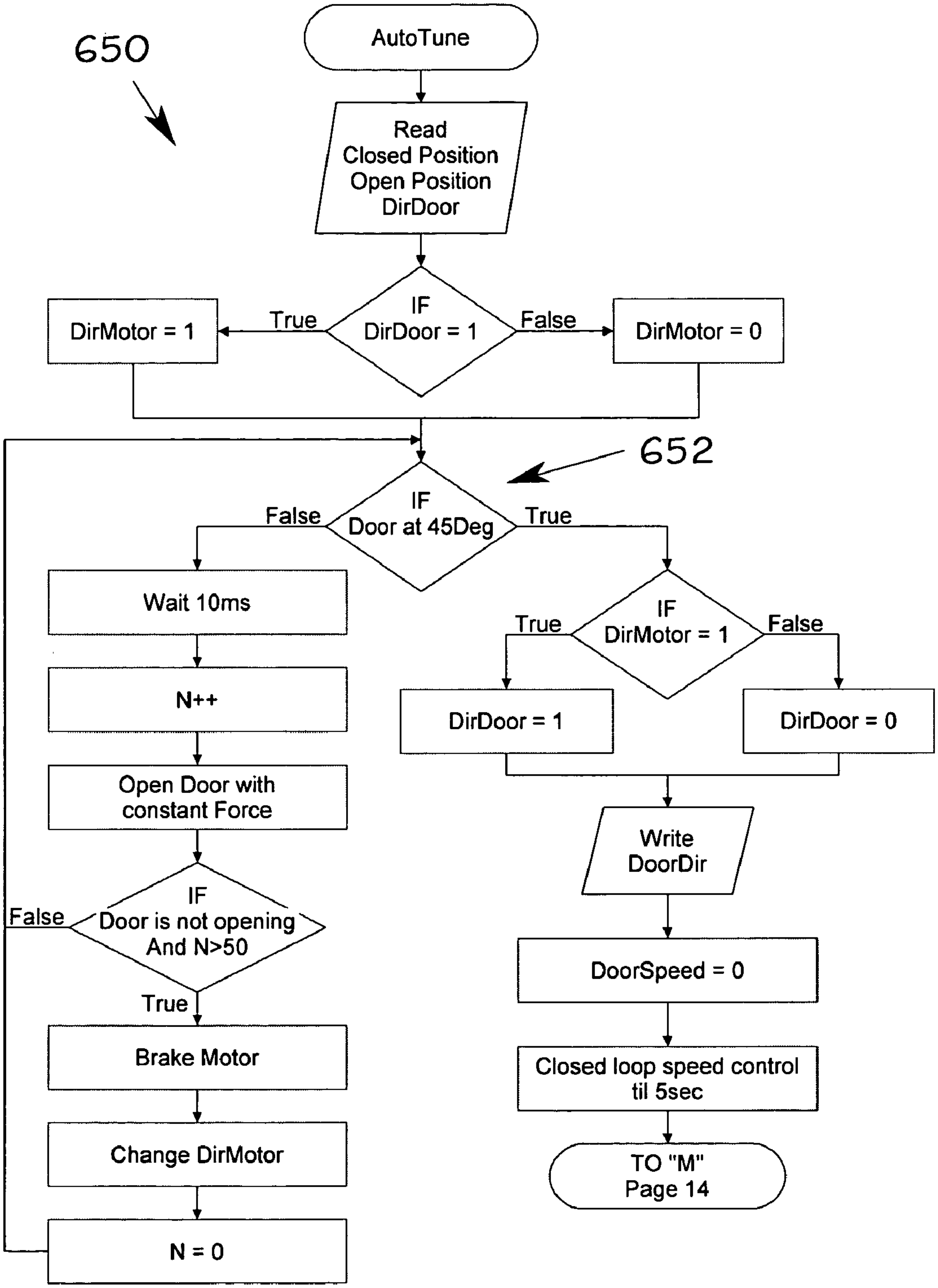
Figure 47:
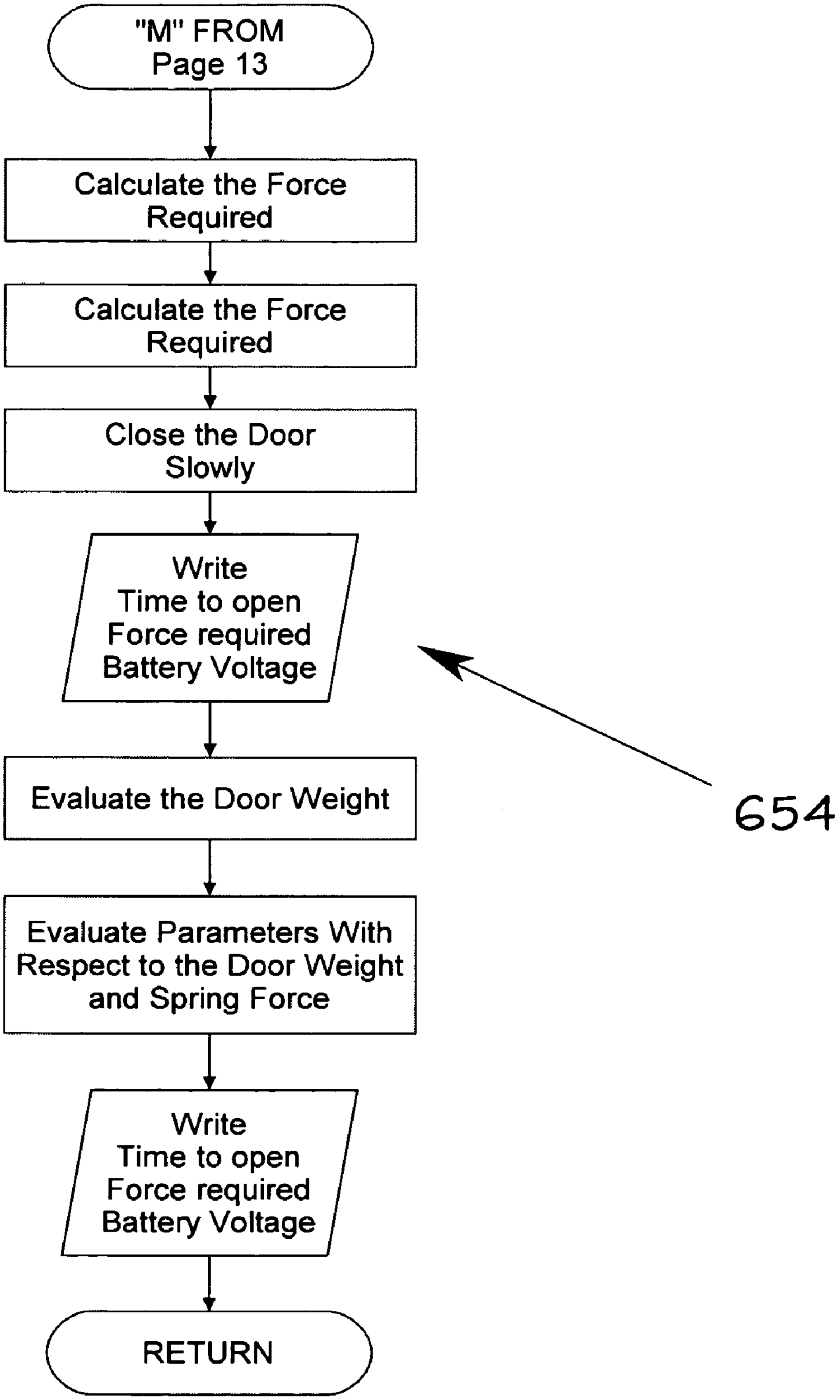
Figure 48:
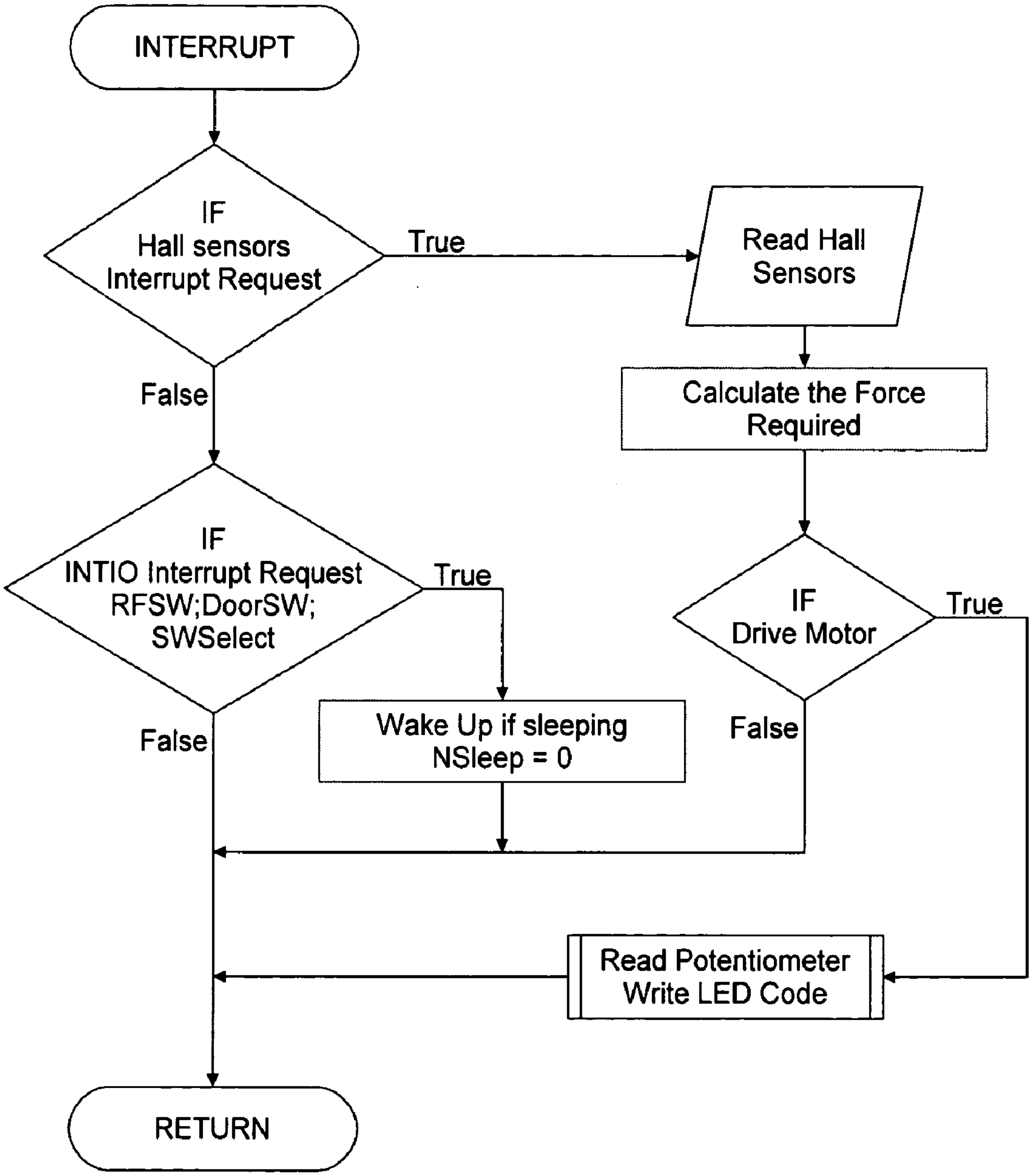

FIGS. 39-45 refer to door setup operations and will be understand by those skilled in the art when read in the context of set up operations performed at control and indicator 400 provided herein. FIGS. 46 & 47 are described in the context of the Auto Tune functionality of the present invention. FIG. 48 discloses an interrupt routine stored in Micro 202 which is initialized when either the RF activation switch is operated or the watch dog timer of micro 202 times out. The logic of FIG. 48 is needed because circuitry driving a brushless DC motor needs to know the angular position of its rotor and this information in the present invention is derived from hall effect sensors 90.

Figure 49:
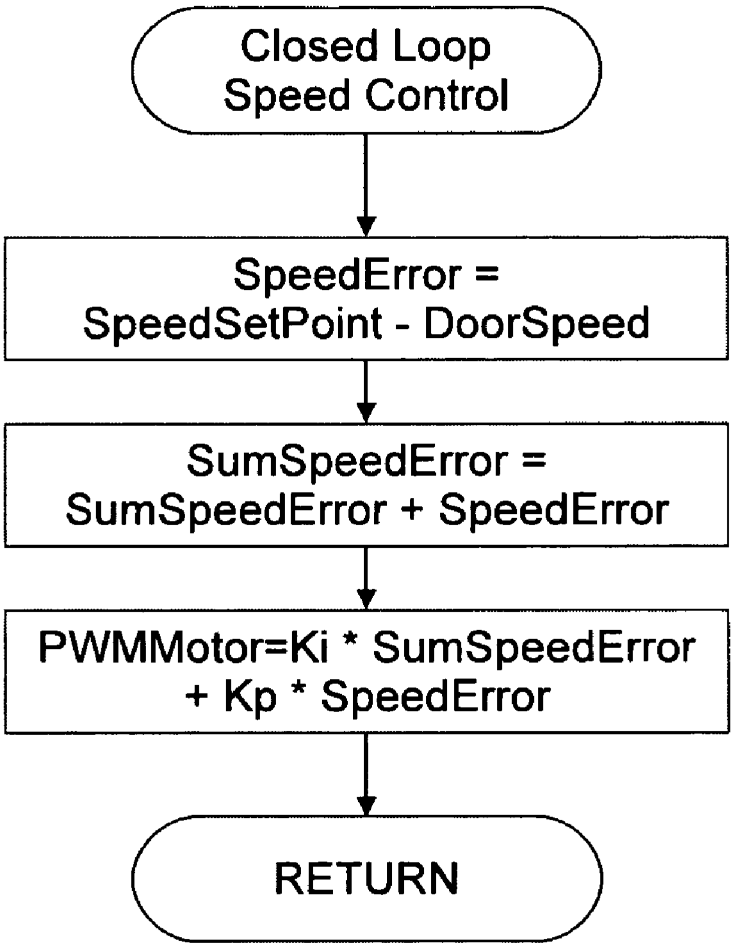

FIG. 49 is a subroutine that provides the logic flow for speed control operations loop of the present invention. When called, this subroutine determines a speed error by subtracting the actual door speed from a door speed defined by a door speed—door angle profile determined at door initialization and based on a calculated door moment of inertia and known safe door opening speeds or times. The resulting speed error is applied to a Proportional-Integral (PI) controller to determine a PWM value that will establish a current that drives the motor to correct the error.

Use of the present invention does not require that an installer know door weight and size to assure that a door operates safely. The present invention uses the known relationship of T=Iw to calculate the inertia of the door and then, during normal operation, selects appropriate speed reference points that are consistent with I. This process of determining door inertia is termed an Auto Tune mode.

In the Auto Tune mode, a predetermined current generates a known torque in the motor 30 causing angular acceleration of door. The net torque accelerating door in made up of two components: the torque generated by the motor 30 (as modified by a gear ratio and linkages) and the equivalent torque generated by the springs at the door (also modified by the mechanical arrangement of the springs and linkages). The known current is selected to be greater than the minimum current necessary to accelerate the door into an open position with worst case spring settings.

At the start of auto tune mode the door is accelerated until it reaches 45 degrees at which point the time needed to get to the 45 degree position is measured and stored memory.

As mentioned, It is known that Torque=Moment of inertia× angular acceleration. Therefore after integration of angular acceleration with respect to time and rearranging we find that moment of inertia I of the door is=Torque_net×opening_Time/angle_reached.

If torque_net was known, then, given the time to reach a known angle, we could calculate I. We do not however know torque_net since it includes both the torque generated by the motor 30 alone (motor_torque) and an equivalent spring torque (spring_torque).

While the motor_torque is known from motor current, spring_torque is not. To determine spring_torque the control loop switches into a constant speed mode for about 5 seconds after reaching the 45 degree position. With speed=0 motor_torque is equal to spring_torque so that torque_net is now known and I can be calculated.

The above description and mathematical development is translated in to a series of steps as follows:

1. Select a motor current that will assure that the installed door will accelerate to at least a 45 degree position giving consideration to motor characteristics, spring characteristics, net mechanical advantage of gears and other linkages between of the motor to a location of the operator on the door and the net mechanical advantage of gears and other linkages between of the spring and the location of the operator on the door.
2. Apply the selected motor current to open the door from a fully closed position to an open angle of 45 degrees and measure time to go to the 45 degree position.
3. Hold the door at 45 degrees by commanding a speed control loop to hold the speed at zero while the door is at 45.
4. Measure motor current while the door is held at 45 degrees. This motor current is then the current that results in a torque at the operator output shaft and it is exactly equal to the torque that results from a spring force divided by the gear reduction ratio when that force is referred to the operator output shaft.
5. Subtract the torque that results from the spring force (at 45 degrees) when that force is referred to the operator output shaft from the torque generated by the known motor current (at 45 degrees). The result is the net torque at the operator output shaft. This would be the torque needed to bring the door to 45 degrees in the recorded time if there was no spring in the operator. As one skilled in the art would recognize, the above subtraction assumes that the spring force as well as the motor torque remain constant throughout the opening process. While the invention maintains the motor current and hence motor torque constant the preferred embodiment calculations assume that the toques generated by spring force also remains constant though out the opening cycle. In alternate embodiments the torques generated by the spring is compensated by using an equivalent torque generated by, for example, by multiplying the torque value by a variable determined by experiment or calculated by the known door linkage geometry, eccentric cam profile, and spring constant.
6. Divide the net torque by the time to get the door to 45 degrees and the result is the door inertia.
7. This calculated value of inertia is then used in conjunction with a table defining door opening times in terms of door size and weight (since door size and weight defines it inertia, to find an allowable operating opening time and hence speed profile.

In an alternative embodiment of the Auto Tune mode, the controller 31 opens the door to 90 degrees, pauses for a few seconds at 90 degrees, calculates a force provided by a closing spring, allows the door to freely close to 45 degrees, measures the time to achieve the second position. Using the same calculations as above, the torque generated by the spring at the output shaft is known. When the torque on the output is not linear, an equivalent torque can be determined by multiplying the torque value by a variable determined by experiment or calculated by the known door linkage geometry, eccentric cam profile, and spring constant. The moment of inertia can be calculated based on the acceleration of the door and the known spring force.

The logic flow diagram for the auto tune function is shown in FIGS. 46 & 47 and is described below. Please note this FIG. 46, in addition to graphical depicting the above word descriptions of Auto tune also shows the logic for automatically setting motor drive polarity to accommodate the installed handing of door 2.

Referring to FIG. 46 we note after Auto Tune has been initiated and it is determined that door 2 is closed, the logic proceeds to decision block 652 at 650 where a test if the door has reached 45 degrees is performed. Since the logic paths at 650 are the same for both determining motor 30 polarity, the current applied to motor 30 is the same current discussed above with regard to calculation of inertia. As one skilled in the art would recognize, if the polarity of motor 30 is incorrect, the motor would rotate but the roller clutch would disengage and the door would not move. In an alternate embodiment where there is no roller clutch the door would be forced against a stop and not move. Therefore, if the door has not moved, the 10 ms timer and N parameter determine how much time the door 2 is allowed to keep trying to open. When N=20 and the door has not moved the motor direction variable DirMotor is changed. The motor then can drive the door and it continues to do so until 45 degrees. Where the door is held and 45 degrees and the variables and calculations described above are performed initialization with Auto Tune are completed.

It is noted that battery voltage is also saved at 654. As noted previously, at certain door speeds the motor 30 current may have a low duty cycle and a current measured at current sensor 333 may have certain inaccuracies. Therefore at low duty cycles motor current is determined by using motor voltage and rotor resistance in a known manner.

Figure 31A:
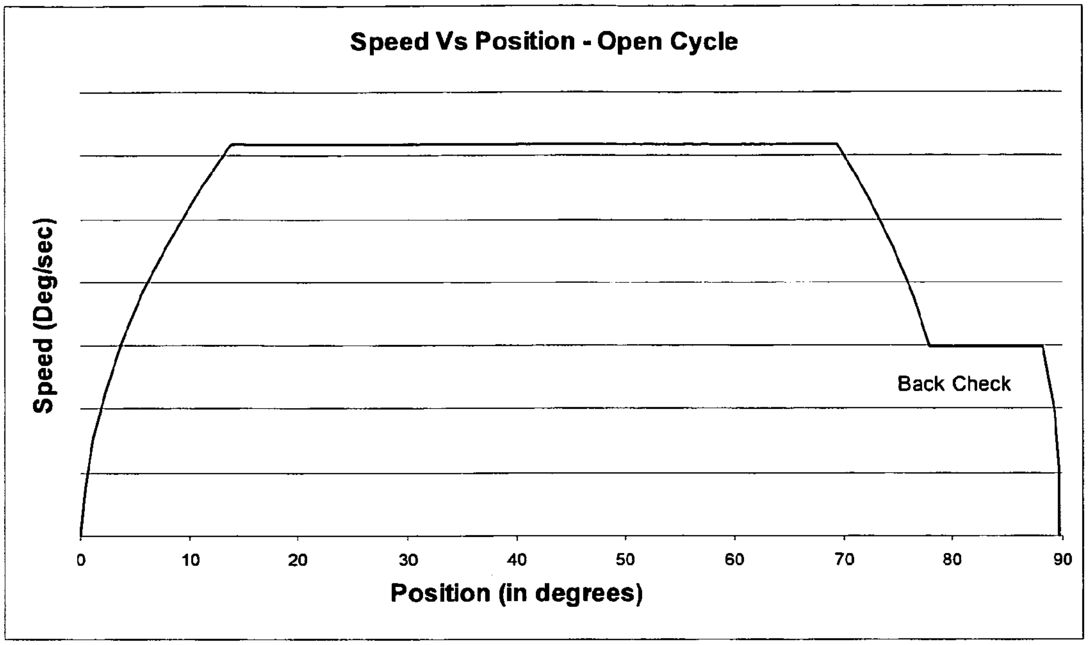
FIGS. 31A, 31B are speed vs. position profiles in accordance with the present invention.
Figure 31B:
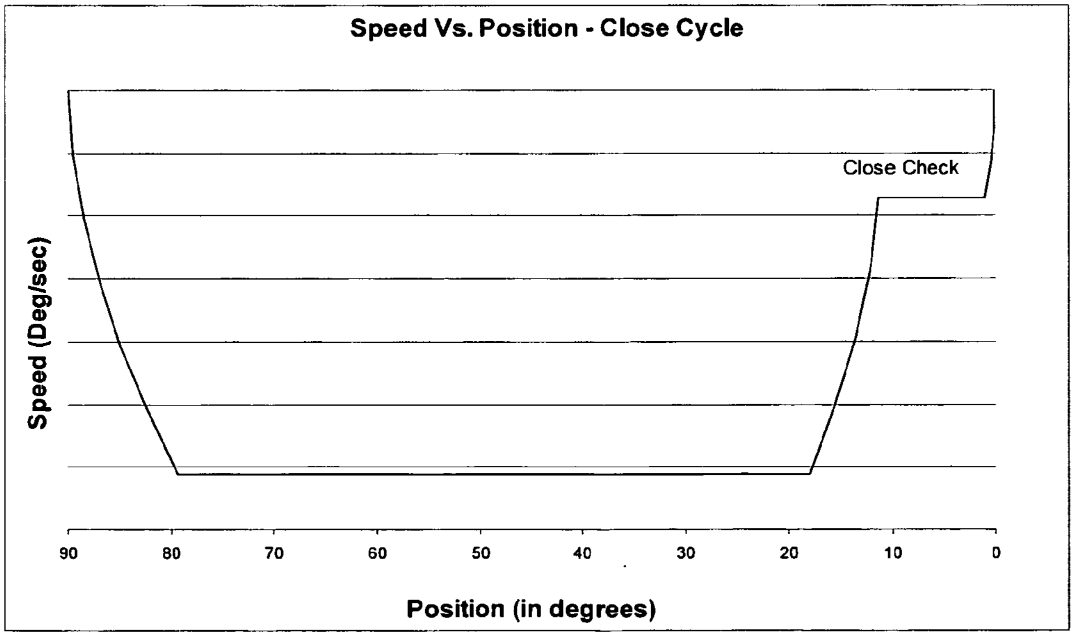
Figure 33:
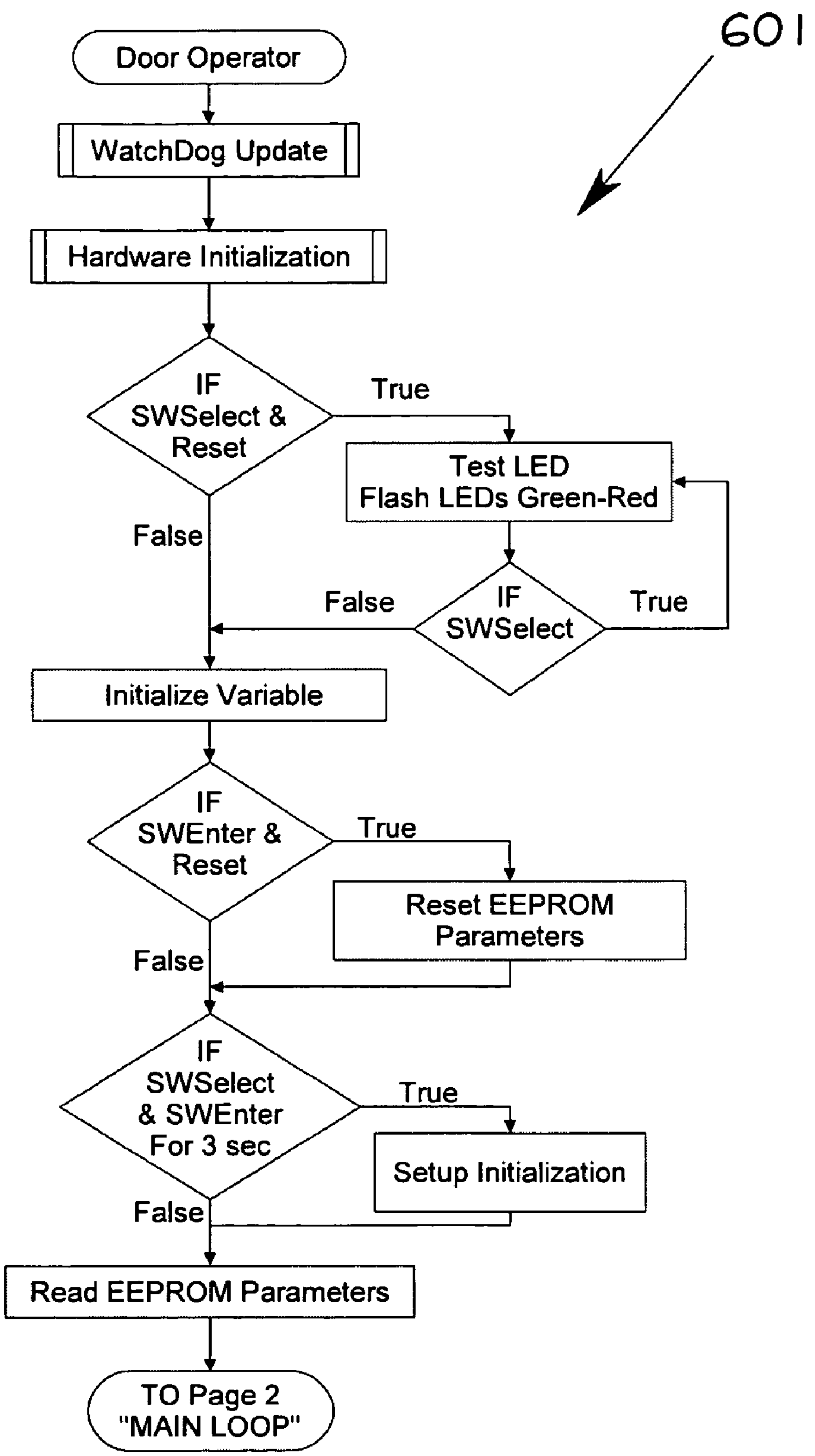

FIGS. 31A & 31B shows a complete door operating speed profile and is developed for specific door weight, given door opening and closing times, and door inertia. As discussed above, the installer need not enter door parameters for the present invention as they are automatically translated into an inertia value.

When the door starts closing a speed control reference is set at a desired closing speed. Door 2, powered by springs 33 & 37 accelerates to the desired speed at approximately the 80 degree position in FIG. 31A. When the door reaches the desired closing speed at approximately 80 degrees, the braking action of regeneration as the motor acting as a generator charges battery pack 18 the slows the door down to, and controls the door at, that closing speed. This speed is maintained until an approximately 18 degrees door angle is reached where the speed is then reduced until the door reaches approximately 10 degrees which is the door check speed. This close check speed is held substantially constant until the door reaches approximately 5 degrees where the door speed is decelerated until reaching approximately 0 speed at door closing. Door opening follows a similar same profile but in reverse and is shown in FIG. 31B.

It is noted that door acceleration on opening is independent of a desired opening speed until the door reaches the desired speed. At this point the acceleration is essentially zero as the door continues to open at constant speed. Therefore while there is no acceleration limit during opening, the acceleration is limited by the maximum safe force applied to the door to prevent injury or damage if the door were to be blocked.

Installation Programming of the Preferred Embodiments

Proper operation of the door requires knowledge of fully open and closed positions and allowable operating speeds. These parameters are established during a setup performed at Control and indicator 400. Control and indicator 400 also provides battery condition monitoring as described below.

1—Setup of the door operator is initiated by closing the door and then pressing and holding the SELECT and ENTER switches 402 and 404 respectively for three seconds. Upon release of the buttons the following occurs:

The invention enters the program mode.

The CLS (close) indicator 406 illuminates red.

LED's 408 through 414 flash green.

2—With the door still in the closed position, press the ENTER button 504 where upon the following occurs:

The CLS position indicator 406 flashes green.

The OP (open) position LED 416 illuminates red indicating that the invention is ready for input 3—Open the door to the fully open position then press the ENTER button 404 after which the following occurs:

The OP (open) position LED 416 flashes green

The AUTO TUNE indicator 420 illuminates red indicating that the AUTO TUNE process has not yet been performed.

4—The installer places the door in the closed position.

5—With the door in the closed position the installer presses the ENTER button 404 after which the following occurs:

The door opens quickly to 45 degree position and holds that position for 5 seconds The Auto Tune indicator 420 illuminates green See FIGS. 46 & 47 for program flow for set up Auto Tune functionality.

6—The installer now presses and holds ENTER button 404 for three seconds after which the following shall occur:

the AUTO TUNE indicator 420 shall extinguish the AUTO-TUNE process is completed.

Reference may be made to FIGS. 39-45 for program flow associated with "Teaching the invention a remote RF activation Switch code" and "Manual Adjustment of stored parameters" which are described below.

Teaching the Invention a Remote RF Activation Switch Code (See 102 of FIG. 20)

1—Press the "LEARN" switch 430 on Control and indicator panel 400 in FIG. 30.

The invention enters a learn mode for 10 seconds while green and red LEDs 408 & 410 mounted on controller 31, are illuminated.

2. Press the RF activation switch 102 in FIG. 20.

LEDs 408 also mounted on controller 31 shall flash green indicating that controller 31 has learned transmission codes of the particular RF activation switch 102 shipped with the invention.

Manual Adjustment of Stored Parameters

On certain occasion it is preferable to modify stored operating parameters while still keeping them in a desired range. The invention provides this capability for door opening and closing time, hold-open time, and maximum blocking force.

As one skilled in the art would recognize, door closing times and speeds are related. However since it is easier for an installer to measure time rather than speeds, and also since industry standards are usually given in terms of time, the door speeds are entered in terms of time 1—To enter PROGRAM MODE, PRESS and HOLD the "SELECT" (402) and "ENTER" (404) buttons for three seconds. The following shall occur:

The operator shall enter program mode.

LEDs 408 through 411 on the control and indicator board shall repeatedly flash green.

The "CLS" position LED (406) shall illuminate green if close position has been previously set or red if no close position has been previously set and remain illuminated.

2—To ADJUST door OPEN and CLOSE TIME perform the following:

a. PRESS the "SELECT" button (402) until the "OP & CLS TIME" LED 455 illuminates.

b. ROTATE potentiometer 435 whereby the following shall occur:

The four LEDs 408-411 shall illuminate in series. (One LED 408 illuminates indicates minimum open and close time while LEDs 408-411 illuminated indicate maximum open and close time.)

If LEDs 408-411 illuminate green, the open and close time are within safe limits.

If LEDs 408-411 illuminate red, the open and close time are outside of safe limits.

If settings are out side of safe value limits press rotate potentiometer to adjust open and close times until the LEDs light green.

Under certain circumstances, it may be acceptable for the door to exceed standard safety limits. In these cases the speed settings are determined by the installer.

3—To Adjust maximum OPEN FORCE (blocking force) perform the following:

a. PRESS the "SELECT" button 402 until the "MAX OP FORCE" LED 456 illuminates.

b. ROTATE potentiometer 435. The following shall occur:

The four LEDs 408-411 shall illuminate in series. One illuminated LED indicates minimum opening force. Four illuminated LEDs 408-411 indicate maximum opening force.

If the LEDs 408-411 illuminate green, the opening force is within safe limits.

If the LEDs 408-411 illuminate red, the opening force is outside of safe limits.

If the settings are out side of safe limits, rotate potentiometer and readjust value.

Under certain circumstances, it may be acceptable for the door to exceed standard safety limits. In these cases the speed settings are determined by the installer.

4—To Adjust ADJUST HOLD-OPEN Time Perform the Following:

a. PRESS the "SELECT" button 402 until the "HOLD OPEN" LED 457 illuminates.

b. ROTATE potentiometer 435. The following shall occur:

The four LEDs 408-411 illuminate in series. One illuminated LED 408 indicates minimum hold-open time. Four illuminated LEDs 408-411 indicate maximum hold-open time.

If LEDs 408-411 illuminate green, the hold-open time is within code.

If the LEDs 408-411 illuminate red, the hold open time is outside code,

PRESS "ENTER" 404 to select the desired value.

5—When all adjustments are complete, PRESS and HOLD the "ENTER" pushbutton 404 for three seconds and the invention will exit programming mode.

The hold open time of the door is next set by depressing the button on the RF activation switch the desired number of seconds that the door will be held open. This completes the position input of the setup.

In addition to assisting with setup of the invention, control and indicator board 400 provides an installer with a visual indication of power pack battery voltage using LEDs. When battery voltage is at or below 20VDC LEDs 408 & 410 illuminate red when the controls are activated. Above 20VDC LEDs 408 & 410 illuminate green when the controls are activated. When the door is closing the LEDs alternate to indicate to the installer the various door positions during the closing cycle.

Prior art door controllers require that an installer know door size and weight to establish safe door and open and close times and hence safe door opening and closing door speeds. Clearly a heavy door swinging at a high speed can be a hazard so values for door size and weight are needed.

As will be recognized by one skilled in the art door size and weight above establish the moment of inertia I of a door. Moreover it is the moment of inertia of a door and the speed of the door that establish the kinetic in a door. This kinetic energy is a measure of the damage a given door could do if it was blocked while moving to fast.

In typical installations the installer would use the door data to enter a chart that gave safe opening and closing time or speeds and he/she would adjust a door controls to accommodate the identified values. The table in effect translates the door size and weight into a moment of inertia value to determine safe opening and closing times. The present invention uses the inertia value to set opening and closing speed profiles to be within desired opening and closing times.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

What is claimed is:

1. A door operator for controlling operation of a door, the door operator having a motor to open the door against a spring force, said door operator further comprising:

a door position sensor for transmitting a signal indicative of door position; and a controller for:

controlling a motor current to generate a predetermined motor force to open the door to a predetermined angle;

receiving the signal from the door position sensor and determining a door position and a door speed based on the signal;

measuring the time for the door to reach the predetermined angle from a closed position;

measuring the current to hold the door at the predetermined angle;

converting the measured current to an equivalent force of the motor acting on the spring, which represents the spring force;

determining a first torque value acting on the door based on the spring force;

determining a second torque value acting on the door based on the predetermined motor force to open the door to the predetermined angle;

subtracting the first torque value from the second torque value to determine a net torque acting on the door; and calculating a door moment of inertia based on the net torque and the time for the door to reach the predetermined angle from the closed position.

2. A door operator for controlling operation of a door, the door operator having a motor to open the door against a spring force, said door operator further comprising:

a door position sensor for transmitting a signal indicative of door position; and a controller for:

opening the door to a first position at a predetermined angle;

measuring the current to hold the door at the predetermined angle;

converting the measured current to an equivalent force of the motor acting on the spring, which represents the spring force;

determining a torque value acting on the door based on the spring force;

releasing the door to a second position at a predetermined angle measuring the time for the door to reach the second position at a predetermined angle calculating a door moment of inertia based on the torque applied and the time for the door to reach the second position at a predetermined angle.

3. A door operator for controlling operation of a door, the door operator configured to operate in a manual mode wherein a user provides opening power or in a powered mode using a motor for converting electrical energy stored in a chargeable battery to open the door and to act as a braking load to control door closing speed when charging the chargeable battery in a generator mode during door closing, said operator further comprising:

a nonvolatile door position sensor for transmitting a signal indicative of door position; and a controller for:

receiving the signal from the nonvolatile door position sensor;

determining the door position and a door speed;

comparing the door speed to a desired door speed based on a door speed-position profile and generating a door speed error signal;

minimizing the door speed error signal by adjusting the braking load resulting from charging the chargeable battery using the motor as a generator.

4. The door operator as claimed in claim 3, comprising a clutch to disengage the motor during manual door opening and engage the motor on door closing when the motor can act as a generator.

5. The door operator as claimed in claim 3, wherein the nonvolatile door position sensor is a potentiometer.

6. The door operator as claimed in claim 3, wherein the door speed-position profile is based on door weight and size.

7. The door operator as claimed in claim 3, wherein the door speed-position profile is based on door weight, size and predetermined time intervals during an opening of the door and a closing of the door.

8. The door operator as claimed in claim 3, wherein the door operator is independent of external power if the door is manually opened no more than five (5) times for each battery powered opening.

9. The door operator as claimed in claim 4, wherein the clutch is adapted to engage the motor on door opening after receiving an engagement signal.

10. The door operator as claimed in claim 4, wherein the door speed-position profile is dependent upon a computation of door inertia, said computation being based on data from a dynamic test of an installed door.

* * * * *